US011919320B2

(12) United States Patent
Ellis et al.

(10) Patent No.: US 11,919,320 B2
(45) Date of Patent: Mar. 5, 2024

(54) TRANSFER PRINTER AND METHOD

(71) Applicant: VIDEOJET TECHNOLOGIES INC., Wood Dale, IL (US)

(72) Inventors: Jeremy Ellis, Nottingham (GB); Philip Hart, Nottingham (GB); Gareth Walley, Nottingham (GB)

(73) Assignee: Videojet Technologies Inc., Wood Dale, IL (US)

( * ) Notice: Subject to any disclaimer, the term of this patent is extended or adjusted under 35 U.S.C. 154(b) by 0 days.

(21) Appl. No.: 17/590,323

(22) Filed: Feb. 1, 2022

(65) Prior Publication Data

US 2022/0227121 A1 Jul. 21, 2022

Related U.S. Application Data

(63) Continuation of application No. 16/624,565, filed as application No. PCT/GB2018/051796 on Jun. 27, 2018, now Pat. No. 11,260,650.

(30) Foreign Application Priority Data

Jun. 28, 2017 (GB) ...................................... 1710350
Jun. 28, 2017 (GB) ...................................... 1710351

(51) Int. Cl.
*B41J 2/325* (2006.01)
*B41F 16/00* (2006.01)
(Continued)

(52) U.S. Cl.
CPC ........... *B41J 2/325* (2013.01); *B41F 16/0026* (2013.01); *B41J 2/36* (2013.01); *B41J 17/07* (2013.01);
(Continued)

(58) Field of Classification Search
None
See application file for complete search history.

(56) References Cited

U.S. PATENT DOCUMENTS 5,769,549 A 6/1998 Kouzai et al.
7,940,377 B1 * 5/2011 Schmitt ................ G01J 3/0208 356/3.01

(Continued)

FOREIGN PATENT DOCUMENTS

CN 1037870 A 12/1989
CN 1473110 A 2/2004

(Continued)

OTHER PUBLICATIONS

Search Report for GB1710350.8, dated Feb. 19, 2018, 2 pages.

(Continued)

*Primary Examiner* — Alejandro Valencia
(74) *Attorney, Agent, or Firm* — Delizio, Peacock, Lewin & Guerra, LLP

(57) ABSTRACT

A method for monitoring a characteristic of a printed image of a thermal transfer printer. The method comprises providing a ribbon and a substrate at a printing location of the thermal transfer printer. The method further comprises printing an image on the substrate at the printing location by transferring ink from a region of the ribbon in a printing operation, a negative image being formed on the region of ribbon. The method further comprises transporting the region of ribbon, by a ribbon transport system, from the printing location towards an imaging location along a ribbon transport path. The method further comprises when a characteristic of the ribbon transport meets a predetermined criterion, obtaining, by an image capture system, a ribbon image of the negative image. The method further comprises
(Continued)

processing said ribbon image to generate data indicative of the characteristic of the printed image.

20 Claims, 16 Drawing Sheets

(51) Int. Cl.

| | |
|---|---|
| ***B41J 2/36*** | (2006.01) |
| ***B41J 17/07*** | (2006.01) |
| ***B41J 17/10*** | (2006.01) |
| ***B41J 33/16*** | (2006.01) |
| ***B41J 33/36*** | (2006.01) |
| ***B41J 35/36*** | (2006.01) |

(52) U.S. Cl.
CPC ............... *B41J 17/10* (2013.01); *B41J 33/16* (2013.01); *B41J 33/36* (2013.01); *B41J 35/36* (2013.01)

(56) References Cited

U.S. PATENT DOCUMENTS

| | | | | |
|---|---|---|---|---|
| 9,327,498 | B1 | 5/2016 | Mantell | |
| 2005/0140768 | A1 | 6/2005 | Aspenns et al. | |
| 2006/0007295 | A1 | 1/2006 | Ueda | |
| 2007/0187633 | A1* | 8/2007 | Fisher .................... | G01N 21/05 250/576 |
| 2013/0215210 | A1* | 8/2013 | McNestry ................ | B41J 35/36 347/214 |
| 2016/0082758 | A1* | 3/2016 | Lass ......................... | B41J 35/18 347/188 |
| 2016/0165110 | A1 | 6/2016 | Weng et al. | |

FOREIGN PATENT DOCUMENTS

| | | | |
|---|---|---|---|
| CN | 1657306 | A | 5/2006 |
| CN | 101678687 | A | 3/2010 |
| CN | 102844189 | A | 12/2012 |
| CN | 103917374 | A | 7/2014 |
| CN | 103930280 | A | 7/2014 |
| CN | 105093825 | A | 11/2015 |
| CN | 105324247 | A | 2/2016 |
| EP | 0510768 | A2 | 10/1992 |
| EP | 0546303 | A2 | 6/1993 |
| GB | 2404896 | A | 2/2005 |
| GB | 2449676 | A | 12/2008 |
| GB | 2542549 | A | 3/2017 |
| JP | S6019542 | A | 1/1985 |
| JP | S6064878 | A | 4/1985 |
| JP | S60131286 | A | 7/1985 |
| JP | S61123567 | A | 6/1986 |
| JP | H02141277 | A | 5/1990 |
| JP | H02303882 | A | 12/1990 |
| JP | H07214849 | A | 8/1995 |
| JP | H07251517 | A | 10/1995 |
| JP | 2001249796 | A | 9/2001 |
| JP | 2005119065 | A | 5/2005 |
| JP | 2008272971 | A | 11/2008 |
| JP | 2012126116 | A | 7/2012 |
| JP | 2016176861 | A | 10/2016 |
| WO | 2003029013 | A1 | 4/2003 |
| WO | 2008107646 | A1 | 9/2008 |
| WO | 2011114171 | A1 | 9/2011 |
| WO | 2013025746 | A2 | 2/2013 |
| WO | 2013025749 | A1 | 2/2013 |
| WO | 2014011654 | A1 | 7/2013 |
| WO | 2016067051 | A1 | 5/2016 |
| WO | 2016067052 | A1 | 5/2016 |

OTHER PUBLICATIONS

Search Report for GB1710350.8, dated Feb. 20, 2018, 2 pages.
PCT/GB2018/051796 International Search Report and Written Opinion, dated Dec. 11, 2018, 16 pages.
Search Report for GB1710351.6, dated Feb. 20, 2018, 5 pages.
Search Report for GB1710350.8, dated Feb. 20, 2018, 5 pages.
Chinese Patent Office Action dated Dec. 21, 2022 in Chinese Patent Application No. 202210277480.0.

* cited by examiner

TRANSFER PRINTER AND METHOD

The present invention relates to a transfer printer and method of its operation. More particularly, but not exclusively, the invention relates to apparatus and methods for controlling the operation of a tape drive in a thermal transfer printer to control the movement of ribbon, for monitoring and controlling movement of a printhead relative to a printing surface against which printing is to take place, and for monitoring quality of printed images by an image capture system.

Thermal transfer printers use an ink carrying ribbon. In a printing operation, ink carried on the ribbon is transferred to a substrate which is to be printed. To effect the transfer of ink, a print head is brought into contact with the ribbon, and the ribbon is brought into contact with the substrate. The print head contains printing elements which, when heated, whilst in contact with the ribbon, cause ink to be transferred from the ribbon and onto the substrate. Ink will be transferred from regions of the ribbon which are adjacent to printing elements which are heated. An image can be printed on a substrate by selectively heating printing elements which correspond to regions of the image which require ink to be transferred, and not heating printing elements which correspond to regions of the image which require no ink to be transferred.

It is known that various factors affect print quality. Accurate control of the ribbon during movements by a tape drive, including during periods of acceleration and deceleration, and knowledge of the position of the ribbon during such movements is important in ensuring that printing is carried out in a controlled and predictable way. However, in use, there may be discrepancies between the actual position of portions of ribbon and the expected position of those portions or ribbon. Such discrepancies may be caused by a number of reasons, such as, for example incorrect ribbon tension, or incorrect movements of the ribbon by the tape drive.

Moreover, where printing is carried out incorrectly, it may be possible for incorrectly printed articles to remain undetected. By capturing images of regions of ribbon used for printing, or substrates on which printing has been carried out, it is possible to monitor the quality of printing.

However, such image capture may be unreliable if ribbon control is not performed accurately. Similarly, defects in the image capture system may provide false indications of incorrect printing, or may wrongly allow incorrectly printed substrates to pass undetected.

It is an object of some embodiments of the present invention to provide a novel method, tape drive and printer which obviates or mitigates at least some of the disadvantages set out above or inherent in existing printers and tape drives.

According to a first aspect of the invention there is provided method of operating a transfer printer configured to transfer ink from a printer ribbon to a substrate which is transported along a predetermined substrate path adjacent to the printer. The printer comprises a tape drive comprising two tape drive motors, two tape spool supports on which said spools of ribbon may be mounted, each spool being drivable by a respective one of said motors. The printer further comprises a printhead being displaceable towards and away from the predetermined substrate path and being arranged to, during printing, contact one side of the ribbon to press an opposite side of the ribbon into contact with a substrate on the predetermined substrate path, and a printing surface. The printer further comprises a controller configured to control the tape drive to transport ribbon between the first and second ribbon spools. The method comprises controlling the tape drive to perform a ribbon movement in which ribbon is transported between first and second ribbon spools along a ribbon path, the ribbon path having a first length during a first part of said ribbon movement, and a second length during a second part of said ribbon movement. A transition from the first length to the second length is caused by a displacement of the printhead with respect to the printing surface. Control of at least one of the tape drive motors is based upon data indicative of the first and second lengths.

In this way, the tape drive motors can be controlled so as to accommodate disturbances to the ribbon by the printhead during movement of the ribbon between the spools. Such control of the motors allows for ribbon to be more accurately positioned during ribbon transport operations, and for ribbon tension to be maintained more closely to an optimum level during ribbon transport operations (rather than just being regulated at periodic intervals).

The transition from the first length to the second length may be caused by a displacement of the printhead towards and away from the printing surface.

Control of the at least one of the tape drive motors may be based upon data indicative of a position of the printhead.

Data indicative of the first and second lengths may comprise a length in millimetres or a value in any other convenient units. The data indicative of the first and second lengths may comprise data indicative of a difference between the first and second lengths (e.g. a path length change). The data indicative of the first and second lengths may comprise data indicative of a position of the printhead during each of the first and second parts of said ribbon movement.

The at least one tape drive motor may be a position controlled motor. Each of the tape drive motors may be a position controlled motor. One or both of the tape drive motors may be stepper motors. Where one or both of the tape drive motors are stepper motors, the tape drive motors may be controlled by applying a series of step commands to the motors, causing the motor shaft to move by a predetermined amount. By controlling the time at which the step commands are applied to the motor, the speed of rotation can be controlled.

The at least one tape drive motor may be controlled based upon data indicative of a change in the length of the ribbon path, said data indicative of a change in the length of the ribbon path being determined based upon said data indicative of the position of the printhead.

It will be understood that movement of the printhead causes deflection of the ribbon (and thus the transition from the first to the second length). Thus, the position of the printhead may be used to generate data indicative of a change in the length of the ribbon path, which can in turn be used to control the at least one motor. That is, the motor can be controlled either directly or indirectly based upon the data indicative of the position of the printhead.

When the printhead is displaced so as to cause the ribbon to come into contact with the substrate, the controller may be configured to control the at least one tape drive motor to increase the amount of ribbon extending between the spools.

When the printhead is displaced so as to cause the ribbon to come out of contact with the substrate, the controller may be configured to control the at least one tape drive motor to reduce the amount of ribbon extending between the spools.

In this way, any increase or decrease in tension in the ribbon extended between the spools caused by the printhead being displaced can be compensated for by adjusting the speed or position of the motor. For example, when the printhead is displaced into contact with the substrate during a ribbon transport operation (e.g. during continuous printing), the speed of one or both of the motors can be adjusted to provide an increase in the amount of ribbon extending between the spools. On the other hand, when the printhead is displaced out of contact with the substrate during a ribbon transport operation, the speed of one or both of the motors can be adjusted to provide a decrease or reduction in the amount of ribbon extending between the spools.

The amount of ribbon extending between the spools may be increased or decreased at the same time as the printhead is displaced into or out of contact with the substrate. Alternatively, the amount of ribbon extending between the spools may be adjusted momentarily before or after the printhead is displaced with respect to the substrate.

Moreover, it will be understood that the printhead position may change gradually, and that the ribbon may thus be gradually deflected. Any correction to the amount of ribbon extending between the spools may also be gradually applied by the one or more motors.

Indeed, where the ribbon amount is corrected by adjusting the speed of one of both of the motors, this effect will occur gradually (i.e. the increase or decrease in ribbon length being a cumulative effect over a period during which the tape drive motor speed is adjusted with respect to an un-adjusted speed.

The increase or reduction in the amount of ribbon extending between the spools may be determined based upon the data indicative of a position of the printhead.

The printer may further comprise a printhead drive apparatus. The printhead drive apparatus may be configured to drive the printhead towards and away from the predetermined substrate path. The method may comprise controlling the printhead drive apparatus to drive the printhead towards and away from the predetermined substrate path, and generating the data indicative of a change in the length of the ribbon path based upon a property of the printhead drive apparatus.

The printer may comprise a sensor configured to generate a signal indicative of a property of the printhead drive apparatus. By use of the sensor associated with the printhead drive apparatus, it is possible to provide accurate positional information regarding the actual printhead position, thereby allowing the printhead to be accurately controlled.

The printhead drive apparatus may comprise a printhead motor. The printhead motor may be a stepper motor having an output shaft coupled to the printhead, the stepper motor being arranged to vary the position of the printhead relative to the printing surface. The stepper motor may further be arranged to control the pressure exerted by the printhead on the printing surface.

The printer may further comprise a sensor configured to generate a signal indicative of an angular position of the output shaft of the printhead motor.

The printer may further comprise a controller arranged to generate control signals for the stepper motor so as to cause a predetermined torque to be generated by the stepper motor; said control signals being at least partially based upon an output of said sensor.

By use of the sensor (e.g. a rotary encoder) associated with the output shaft of the stepper motor, it is possible to provide accurate positional information regarding the actual rotor position, thereby allowing the printhead motor to be accurately controlled.

The data indicative of the position of the printhead may be based upon the generated signal indicative of the angular position of the output shaft of the printhead motor.

When the printhead is not in contact with the printing surface (or just at the point of making contact with the printing surface), the sensor output may be used to generate data indicative of the actual printhead position. During such movements of the printhead, the printhead position will generally have a predetermined relationship with the sensor output.

The data indicative of the position of the printhead may be further based upon further data indicative of a printhead position.

When the printhead is in contact with the printing surface and pressing against the printing surface (e.g. with the printing force), data indicative of an expected contact position may be used to generate data indicative of the actual printhead position in preference to the sensor output data. While the printhead is pressed against the printing surface, it has been observed that the printhead position as determined based upon the sensor output (and the known geometry of the printer), may vary from the actual printhead position. That is, the further data indicative of the printhead positon can be used to provide an alternative indication of the actual printhead position in certain circumstances. The variation in actual position may be caused by compliance in various system components, such as, for example a belt connecting the motor to the printhead.

The further data indicative of the printhead position may be determined empirically. The further data indicative of the printhead position may be generated based upon the sensor output.

The further data indicative of the printhead position may be generated based upon a signal indicative of the angular position of the output shaft of the motor and a predetermined offset. The further data indicative of the printhead position may be generated by applying the predetermined offset to the sensor output data (or data derived therefrom).

The printhead positon may, for example, correspond to an expected contact position of the printhead and the printing surface (contact being made through the ribbon and substrate), and may be referred to a printing location.

When a predetermined condition is satisfied, the data indicative of the position of the printhead may be based upon the generated signal indicative of the angular position of the output shaft of the motor. When the predetermined condition is not satisfied, the data indicative of the position of the printhead may be based upon the further data indicative of a printhead position.

That is, the printhead position, as indicated by the sensor, may be used where appropriate.

However, when the printhead position, as indicated by the sensor exceeds a predetermined value, such as, for example when the sensor data indicates that the printhead has passed the expected contact position of the printhead and the printing surface, the further data indicative of a printhead position may be used in preference to the sensor data.

The printhead may be rotatable about a pivot and wherein the stepper motor is arranged to cause rotation of the printhead about the pivot to vary the position of the printhead relative to the printing surface.

The printer may further comprise a printhead assembly. The printhead assembly may comprise a first arm and a second arm. The first arm may be coupled to the stepper motor, and the printhead may be disposed on the second arm. The stepper motor may be arranged to cause movement of the first arm, thereby causing rotation of the second arm about the pivot, and causing the position of the printhead relative to the printing surface to vary. The stepper motor may be coupled to the first arm via a flexible linkage. The linkage may be a printhead rotation belt.

The printhead rotation belt may pass around a roller driven by the output shaft of the stepper motor such that rotation of the output shaft of the stepper motor causes movement of the printhead rotation belt, movement of the printhead rotation belt causing the rotation of the printhead about the pivot.

The printhead drive mechanism may be further configured to transporting the printhead along a track extending generally parallel to the printing surface.

The printhead drive mechanism may comprise a printhead drive belt operably connected to the printhead and a printhead carriage motor for controlling movement of the printhead drive belt; wherein movement of the printhead drive belt causes the printhead to be transported along the track extending generally parallel to the printing surface. The printhead may be mounted to a printhead carriage, the printhead carriage being configured to be the transported along the track extending generally parallel to the printing surface.

The printhead drive belt may pass around a roller driven by the printhead carriage motor such that rotation of an output shaft of the printhead carriage motor causes movement of the printhead drive belt, movement of the printhead drive belt causing the printhead to be transported along the track extending generally parallel to the printing surface.

The printhead carriage motor may be a position controlled motor. The printhead carriage motor may be a stepper motor. The printhead carriage motor may be controlled in a speed controlled manner.

The data indicative of the position of the printhead may be further based upon a signal indicative of the angular position of the output shaft of the printhead carriage motor.

The method may comprise controlling the two tape drive motors to control transport of ribbon between the first and second ribbon spools, said control being based upon data indicative of a position of the printhead.

The method may comprise, during a ribbon transport operation, controlling a first one of the tape drive motors to rotate at a first predetermined angular velocity to cause an amount of the ribbon to be paid out and a second one of the tape drive motors to rotate at a second predetermined angular velocity to cause an amount of the tape to be taken up. At least one of the first and second predetermined angular velocities may be modified during said ribbon transport operation based upon the data indicative of a position of the printhead.

In this way, the velocities of one or both of the tape drive motors can be adjusted to accommodate any deflection of the ribbon by the printhead. This provides for improved tension control and ribbon positioning. Any adjustment may be applied preferentially to one of the motors. For example, in an embodiment, an adjustment may be applied to the motor associated with the supply spool, so as to minimise any effect of the adjustment on the tension between the take up spool and the printhead, where the peel angle is critical to printing quality.

The first and second predetermined angular velocities may be further determined based upon data indicative of the diameters of the first and second ribbon spools respectively The method may comprise controlling the tape drive motors to cause a length of tape to be added to or subtracted from a tape extending between the spools, the length of tape being calculated based upon the data indicative of the first and second lengths.

A length of tape may be added when the printhead is displaced towards the printing surface. A length of tape may be subtracted when the printhead is displaced away from the printing surface. The length of tape added may equal the length of tape subtracted.

The length of tape may be added to or subtracted from the tape extending between the spools in order to maintain tension in the tape between predetermined limits. Whereas it is possible to measure and adjust for tension errors between printing cycles (e.g. when no printing is occurring), it may be beneficial to also adjust for path length changes during ongoing printing operations.

Moreover, where tension changes are caused by printhead movement, such movements will generally be reversed before a single printing cycle has completed. Thus, ribbon tension may be incorrect for a majority of a printing cycle (possibly resulting in inaccurate tape positioning, or printing image tracking), but correct (or at least less incorrect) when tension is measured between printing cycles. By adjusting for ribbon path length disturbances caused by the printhead during a printing cycle, it is therefore possible to improve the overall ribbon control, and therefore printer operation.

The method may comprise performing a printing cycle. Performing a printing cycle may comprise controlling the tape drive to perform a ribbon movement in which ribbon is transported between first and second ribbon spools along a ribbon path, and displacing the printhead relative to the printing surface. Performing a printing cycle may further comprise generating data indicative of a change in the length of the ribbon path based upon data indicative of the position of the printhead during said displacing. Performing a printing cycle may further comprise modifying a control signal for at least one of the tape drive motors to cause the amount of ribbon between the first and second ribbon spools to be adjusted by an amount based upon the data indicative of a change in the length of the ribbon path.

The change in the length of the ribbon path may be the difference between the first and second lengths.

The method may further comprise displacing the printhead towards the printing surface. The method may further comprise generating data indicative of a first change in the length of the ribbon path based upon data indicative of the position of the printhead during said displacing of the printhead towards the printing surface. The method may further comprise applying a first adjustment to the amount of ribbon between the first and second ribbon spools by energising at least one of the tape drive motors to cause the amount of ribbon between the first and second ribbon spools to be adjusted by a first amount based upon the data indicative of the first change in the length of the ribbon path.

The method may further comprise displacing the printhead away from the printing surface. The method may further comprise, generating data indicative of a second change in the length of the ribbon path based upon data indicative of the position of the printhead during said displacing of the printhead away from the printing surface. The method may further comprise applying a second adjustment to the amount of ribbon between the first and second ribbon spools by energising the tape drive motors to cause the amount of ribbon between the first and second ribbon spools to be adjusted by a second amount based upon the data indicative of the second change in the length of the ribbon path.

The method may further comprise, when the printhead is pressed against the printing surface, controlling the printhead to be energised to transfer ink from the ribbon to the substrate.

The method may further comprise moving ribbon past the printhead in a printing direction when the printhead is pressed against the printing surface. Each of the first and second adjustments may be applied during said movement of the ribbon.

According to a second aspect of the invention, there is provided a transfer printer configured to transfer ink from a printer ribbon to a substrate which is transported along a predetermined substrate path adjacent to the printer. The printer comprises a tape drive comprising two tape drive motors, two tape spool supports on which said spools of ribbon may be mounted, each spool being drivable by a respective one of said motors. The printer further comprises a printhead being displaceable towards and away from the predetermined substrate path and being arranged to, during printing, contact one side of the ribbon to press an opposite side of the ribbon into contact with a substrate on the predetermined substrate path, and a printing surface. The printer further comprises a controller configured to control the tape drive to transport ribbon between the first and second ribbon spools. The controller is further configured to control the tape drive to perform a ribbon movement in which ribbon is transported between first and second ribbon spools along a ribbon path, the ribbon path having a first length during a first part of said ribbon movement, and a second length during a second part of said ribbon movement, a transition from the first length to the second length being caused by a displacement of the printhead with respect to the printing surface; wherein control of at least one of the tape drive motors is based upon the first and second lengths.

Features described in the context of the first aspect of the invention may be combined with the second aspect of the invention.

According to a third aspect of the invention there is provided a method of controlling a motor in a tape drive to cause movement of a tape. The method comprises:

- generating a control signal for the motor to cause said motor to rotate to cause a tape movement, the control signal being generated based upon a target tape movement and a predetermined characteristic of the motor;
- receiving first data indicative of an updated target tape movement at a first plurality of times during said movement;
- receiving second data indicative of the generated control signal at a second plurality of times during said movement;
- determining a relationship between the first data and second data; and
- generating a further control signal for the motor to cause a further tape movement based upon said determined relationship.

By receiving updated first data during the tape movement relating to the target tape movement, it is possible to correct for discrepancies between the intended movement and the actual movement of the motor. Such corrections may be particularly useful where the motor is a stepper motor, and where the control signals applied to the motor are necessarily quantised.

That is, control signals applied to the stepper motor cause the motor to advance by a single step (or sub-step). The rate at which the steps are applied is controlled to attempt to achieve a target speed. However, where the target speed changes more quickly than the rate at which the motor can follow (e.g. either because the acceleration rate is too high, or because the motor is mid-way through a step when the target speed changes), small discrepancies can occur. These discrepancies may gradually accumulate, and can lead to tape tension or tape positioning errors. Thus, by comparing the target movement (which may change rapidly during use) with the control signal generated to control the motor, it is possible to identify errors (e.g. quantisation errors) and to apply a suitable correction factor.

Determining a relationship between the first data and the second data may comprise generating data indicative of a difference between the first and second data, and comparing the generated difference to a predetermined threshold.

The method may further comprise comparing the generated difference to a further predetermined threshold. Generating the further control signal for the motor to cause a further tape movement based upon said determined relationship may comprise generating a modified control signal for the motor to reduce the difference between the first data (e.g. the intended of desired actual movement) and the second data (e.g. the movement demanded by previously applied control signals).

Generating said further control signal for controlling the motor based upon said determined relationship may comprise if said determined relationship satisfies a predetermined criterion generating a first control signal; and if said determined relationship does not satisfy the predetermined criterion generating a second control signal.

For example, if the difference is above the predetermined threshold a speed scaling factor may be applied. If the difference is above the further predetermined threshold a further speed scaling factor may be applied.

Said predetermined criterion may be data indicative of a difference between the first and second data exceeding a threshold. The threshold may be a predetermined threshold.

The first control signal may cause said motor to rotate at a first angular motor speed during the further tape movement. The second control signal may cause said motor to rotate at a second angular motor speed during the further tape movement.

The first angular motor speed may be increased or decreased with respect to the actual angular motor speed during the tape movement. The second motor angular speed may be substantially equal to the actual angular motor speed during the tape movement.

Said first control signal may be based upon said target tape movement, said predetermined characteristic of the motor, and a speed scaling factor. Said second control signal may be based upon said target tape movement, and said predetermined characteristic of the motor.

Determining the relationship between the first data and the second data may comprise generating data indicative of a cumulative difference between said first data and said second data. Said cumulative difference may be a linear amount of tape.

Generating said control signal for the motor to cause the motor to rotate to cause a tape movement may comprise generating a plurality of pulses, each pulse being configured to cause the motor to rotate by a predetermined angular amount.

A time at which each one of the plurality of pulses is generated may be determined based upon a target motor speed.

The predetermined characteristic of the motor may comprise data indicative of a permitted further control signal for the motor.

The permitted further control signal for the motor may comprise a control signal to cause the motor to rotate at a permitted angular speed. The permitted angular speed may comprise a permitted angular velocity.

The predetermined characteristic of the motor may comprise data indicative of a plurality of permitted further control signals for the motor, each one of the permitted further control signals being configured to cause the motor to rotate at a respective permitted angular speed. The predetermined characteristic of the motor may comprise data indicative of a plurality of motor step durations, each step duration corresponding to a respective angular speed.

Generating said further control signal for the motor may comprise receiving data indicative of said updated target tape movement, obtaining data indicative of a permitted further control signal for the motor, based upon said data indicative of said updated target tape movement and data indicative of said control signal, and generating said control signal based upon said permitted further control signal for the motor.

The data indicative of a permitted further control signal for the motor may comprise an acceleration table for the motor. By referring to an acceleration table, the controller can obtain data indicative of a permitted further control signal, which data may indicate a permissible next motor step rate based upon the data indicative of said updated target tape movement (e.g. a target speed) and data indicative of said control signal (e.g. a current motor speed).

The predetermined characteristic of the motor may be based upon data indicative of a diameter of a spool of tape mounted upon a spool driven by the motor.

The acceleration table may be based upon data indicative of a diameter of a spool of tape mounted upon a spool driven by the motor. In this way, a permitted linear acceleration may be converted into a permitted angular acceleration for a motor driving a spool having a particular diameter.

The first control signal may be generated by applying a predetermined speed scaling factor to data indicative of the control signal during the tape movement. The data indicative of the control signal may be indicative of the motor speed during the tape movement. The scaling factor may thus cause the motor to have a different (i.e. scaled) speed during the further tape movement.

Generating said further control signal for controlling the motor based upon said determined relationship may further comprise, if said determined relationship satisfies a second predetermined criterion, the generating a third control signal.

The third control signal may cause said motor to rotate at a third angular motor speed during the further tape movement. The third angular motor speed may be increased or decreased with respect to the actual angular motor speed during the tape movement and the first angular motor speed.

The third control signal may be generated by applying a second predetermined speed scaling factor to data indicative of the actual angular motor speed during the tape movement or the first angular motor speed.

Said first data may comprise a plurality of first data items, each first data item being indicative of a target linear tape movement. Said second data may comprise a plurality of second data items, each second data item being indicative of a distance moved by the motor. Said relationship may be based upon said plurality of first data items and said plurality of second data items.

In this way, the first and second data can be updated during tape movement to reflect changing target and/or controlled motor speeds. The relationship may be updated accordingly, so as to monitor and allow action to be taken in response to the updated first and second data.

The first plurality of times may be different from the second plurality of times. The first data may be generated or updated at a different rate than the second data.

The method may further comprise receiving further first and second data items during said further tape movement, and generating a second further control signal for controlling the motor during a second further tape movement based upon said further first and second data items.

In this way, control signals for the motor can be regularly updated to reflect changes in target speed and actual (or controlled) speed. This allows changes in target speed to be responded to, and/or deviations in actual speed from the target speed (for example deviations due to motor limitations) to be accommodated. The target speed may, for example, be generated based upon a reference speed. The reference speed may, for example, be the speed of a substrate upon which printing is carried out. The target speed may be proportional to the reference speed.

Said generating the second further control signal for controlling the motor during the second further tape movement based upon said further first and second data may comprise determining a further relationship between the further first data and the further second data; and generating the second further control signal based upon said further determined relationship.

Tape may be transported between first and second tape spools along a tape path, the tape path having a first length during said tape movement. Said relationship may be further based upon data indicative of a change in the length of the tape path.

Said speed scaling factor may be generated based upon said data indicative of a change in the length of the tape path. In this way, the speed scaling factor can be modified to ensure that an appropriate response can be made by the tape drive.

Said predetermined threshold may be modified based upon said data indicative of a change in the length of the tape path. In this way, the speed switching thresholds can be modified to ensure that an appropriate response can be made by the tape drive.

Generating said control signal for the motor to cause said tape movement may be intended to cause the tape to move a predetermined distance. That is, said tape movement may comprise a predetermined distance of tape movement.

Generating said control signal for the motor to cause said tape movement and generating said further control signal for the motor to cause said further tape movement may together be intended to cause the tape to move said predetermined distance. That is, the further control signal (and the corresponding further tape movement) may not cause the tape to move any further than the control signal (and the corresponding tape movement). Rather, the further control signal may cause the speed of movement of the tape to be modified, while the total distance moved remains unchanged.

The tape drive may be a tape drive of a transfer printer. Said tape may be an inked ribbon, and the transfer printer may comprise a printhead for selectively transferring ink from the ribbon to a substrate which is transported along a predetermined path adjacent to the printer. The printhead may be displaceable towards and away from the predetermined substrate path.

The relationship may be further based upon data indicative of a position of a printhead. The relationship may thus be based upon data indicative of an actual linear tape distance moved during the tape movement and data indicative of a printhead movement. The printhead movement may be an expected printhead movement.

In this way, the tape drive can be controlled so as to accommodate disturbances to the ribbon by the printhead during movement of the ribbon between the spools. Such control of the tape drive allows for ribbon to be more accurately positioned during ribbon transport operations, and for ribbon tension to be maintained more closely to an optimum level during ribbon transport operations (rather than just being regulated at periodic intervals). In particular, by generating the relationship based upon data indicative of the positon of the printhead in addition to the data indicative of the actual angular motor speed during the predetermined tape movement, it is possible to compensate for deviations from the expected tape movement caused by both speed errors and disturbances caused by the printhead movement.

Data indicative of the printhead position may be introduced before, during and/or after printhead movements, allowing ribbon control to anticipate and/or respond quickly to any change in ribbon path length caused as a result of the printhead movement.

Said threshold may be generated based upon data indicative of a position of a printhead. Said predetermined speed scaling factor may be generated based upon data indicative of a position of a printhead. Said data indicative of a position of a printhead may comprise data indicative of a printhead movement. Said data indicative of a printhead movement may comprise data indicative of an expected printhead movement. Said data indicative of a printhead movement may comprise data indicative of a magnitude of printhead movement, and/or data indicative of a duration of printhead movement, and/or data indicative of a direction of printhead movement.

In this way, it is possible to adjust the response of the motor control algorithm based upon printhead movement (e.g. expected printhead movement) so as to optimise the speed response.

Said relationship data indicative of a position of a printhead may comprise data indicative of a change in the length of the tape path and/or may be used to generate data indicative of a change in the length of the tape path.

The first data indicative of an updated target tape movement may comprise data indicative of a movement of said substrate along said predetermined path adjacent to the printer.

According to a fourth aspect of the invention there is provided a tape drive for transporting tape between first and second tape spools along a tape path, the tape drive comprising two tape drive motors, two tape spool supports on which said spools of tape may be mounted, wherein each spool is drivable by a respective one of said motors, and a controller. The controller is arranged to generate a control signal for at least one of the tape drive motors to cause the motor to rotate to cause a tape movement, the control signal being generated based upon a target tape movement and a predetermined characteristic of the motor. The controller is further arranged to receive first data indicative of an updated target tape movement at a first plurality of times during said movement, receive second data indicative of the generated control signal at a second plurality of times during said movement, determine a relationship between the first data and second data, and generate a further control signal for the motor to cause a further tape movement based upon said determined relationship.

There is also provided a transfer printer configured to transfer ink from a printer ribbon to a substrate which is transported along a predetermined substrate path adjacent to the printer. The printer comprises a tape drive according to the fourth aspect of the invention, the tape being an inked ribbon. The printer further comprises a printhead being displaceable towards and away from the predetermined substrate path and being arranged to, during printing, contact one side of the ribbon to press an opposite side of the ribbon into contact with a substrate on the predetermined substrate path, and a printing surface.

The transfer printer may further comprise a monitor arranged to generate an output indicative of movement of the printhead relative to the printing surface, the controller being arranged to generate data indicative of a positon of the printhead based upon said output and further data indicative of a printhead position.

Features described above in the context of the first or second aspects of the invention may be combined with the third or fourth aspects of the invention, and vice versa.

A further aspect of the invention provides a transfer printer controller comprising circuitry arranged to control a transfer printer to carry out a method according to one of the first or third aspects of the invention. The circuitry may comprise a memory storing processor readable instructions and a processor configured to read and execute instructions stored in said memory, the instructions being arranged to carry out features of the methods described above.

According to a fifth aspect of the invention, there is provided a transfer printer configured to transfer ink from a printer ribbon to a substrate which is transported along a predetermined substrate path adjacent to the printer. The transfer printer comprises a tape drive for transporting ribbon between first and second ribbon spools along a ribbon path, the tape drive comprising two tape drive motors, two tape spool supports on which said spools of ribbon may be mounted, each spool being drivable by a respective one of said motors, a printhead being displaceable towards and away from the predetermined substrate path and being arranged to, during printing, contact one side of the ribbon to press an opposite side of the ribbon into contact with a substrate on the predetermined substrate path, and a printing surface, a monitor arranged to generate an output indicative of movement of the printhead relative to the printing surface; and a controller arranged to generate data indicative of a positon of the printhead based upon said output and further data indicative of a printhead position.

The controller may be further configured to control at least one of the tape drive motors to control transport of ribbon between the first and second ribbon spools, said control being based upon data indicative of a position of the printhead.

Said movement may comprise movement between a retracted position spaced apart from the printing surface and an extended position in which the printhead presses against the printing surface based upon said output.

When the printhead is in contact with the printing surface and pressing against the printing surface (e.g. with the printing force), data indicative of an expected contact position may be used to generate data indicative of the actual printhead position in preference to the sensor output data. While the printhead is pressed against the printing surface, it has been observed that the printhead position as determined based upon the sensor output (and the known geometry of the printer), may vary from the actual printhead position. That is, the data indicative of the printhead positon can be used to provide an alternative indication of the actual printhead position in certain circumstances. The variation in actual position may be caused by compliance in various system components, such as, for example a belt connecting the motor to the printhead.

The transfer printer may be a thermal transfer printer, and the printhead may be a thermal printhead.

According to a sixth aspect of the invention, there is provided a method of operating a transfer printer according to the fifth aspect of the invention.

According to a seventh aspect of the invention there is provided a method for monitoring a characteristic of a printed image of a thermal transfer printer. The method comprises providing a ribbon and a substrate at a printing location of the thermal transfer printer. The method further comprises printing an image on the substrate at the printing location by transferring ink from a region of the ribbon in a printing operation, a negative image being formed on the region of ribbon. The method further comprises transporting the region of ribbon, by a ribbon transport system, from the printing location towards an imaging location along a ribbon transport path. The method further comprises when a characteristic of the ribbon transport meets a predetermined criterion, obtaining, by an image capture system, a ribbon image of the negative image. The method further comprises processing said ribbon image to generate data indicative of the characteristic of the printed image.

It has been realised that during some ribbon transport operations imaging the ribbon may be unreliable and/or may produce noisy image data. Thus, by imaging ribbon only when the characteristic of the ribbon transport meets a predetermined criterion, it is possible to improve the reliability of image capture. For example, during the printing phase of a printing cycle, the ribbon may be moving at a relatively stable speed so as to ensure high quality printing (at least in continuous printing modes). Thus, imaging the ribbon during this phase of ribbon transport is considered more likely to produce reliable print data than during periods of rapid acceleration, deceleration and reverse.

To ensure ribbon is imaged only when the characteristic of the ribbon transport meets a predetermined criterion, obtaining a ribbon image of the negative image may comprise determining whether a characteristic of the ribbon transport meets a predetermined criterion, and in response to determining that the characteristic meets the predetermined criterion, obtaining, by an image capture system, a ribbon image of the negative image.

Said characteristic of the ribbon transport may comprise a ribbon transport speed.

When the speed is relatively stable, imaging may be performed more reliably than when the speed is rapidly varying.

Said predetermined criterion may comprise the ribbon transport speed being substantially equal to a predetermined ribbon transport speed.

It will, of course be understood that some variation in ribbon speed may occur. However, it may be possible to obtain improved imaging when the speed is substantially constant (e.g. when the ribbon is not accelerating or decelerating rapidly).

Said predetermined criterion may comprise a magnitude of ribbon acceleration being less than a predetermined ribbon acceleration threshold. For example, it may be determined that imaging can be reliably carried out when the ribbon is travelling at a predetermined speed (i.e. with relatively little acceleration/deceleration), or when any acceleration or deceleration of the ribbon is below a predetermined threshold. It will be appreciated that even during periods when the ribbon speed is substantially constant there may be some variation in ribbon speed. For example, during printing, the printer maybe configured to control the ribbon speed based upon the speed of a substrate upon which printing is to be carried out. As such, changes in substrate speed may result in changes to ribbon speed. However, typically, the rate of acceleration or deceleration of the substrate will be less severe than the acceleration or deceleration that can be performed by the ribbon transport system when positioning the ribbon for subsequent printing operations. Thus, by determining whether a characteristic of the ribbon transport meets a predetermined criterion, the predetermined criterion comprising the ribbon acceleration or deceleration being less than a predetermined ribbon acceleration threshold, and imaging the ribbon only during it is possible to reliably image the ribbon.

Said predetermined criterion may comprise the ribbon transport direction being equal to a predetermined ribbon transport direction.

For example, imaging may be performed preferably when the ribbon is advancing in a direction in which printing is carried out, rather than in a reverse direction.

The method may further comprise transporting the region of ribbon, by the ribbon transport system, past the imaging location a plurality of times, and obtaining, by the image capture system, said image of the negative image at a predetermined one of said plurality of times.

For example, whereas a region of ribbon may pass the imaging location for a first time during a post-printing deceleration phase, substantially all regions of ribbon will again pass the imaging location during a printing operation (the printing operation being a subsequent printing operation than the one which caused the negative image to be formed on the ribbon). By ignoring a first passage of ribbon (which, in an example, occurs during a deceleration) and capturing image data during a subsequent passage of ribbon, the quality of the obtaining image data can be improved.

Said predetermined one of said plurality of times may be one of said plurality of times other than a first one of said plurality.

Obtaining the ribbon image may comprise obtaining a plurality of one-dimensional images of said ribbon at an imaging location.

In this way, a two-dimensional image can be assembled from a plurality of one-dimensional image rows.

The plurality of one-dimensional images of said ribbon at the imaging location may be obtained as said ribbon moves past said imaging location.

Obtaining a ribbon image of the negative image may comprise obtaining a plurality of partial images of a corresponding plurality of parts of the negative image, and generating a ribbon image based upon said plurality of partial images.

That is, the ribbon image may correspond to a complete printed image (e.g. a printed image on a single substrate of region of substrate). However, the ribbon image may be assembled from several partial images captured at different times.

Each of said plurality of partial images may comprise a plurality of one-dimensional images, each one-dimensional image comprising a plurality of data items, each data item being indicative of a radiation intensity at a respective one of a plurality of capture regions, each of the plurality of capture regions corresponding to a respective one of a plurality of regions of the imaging location.

The capture regions may each correspond to a pixel of a sensor. The regions of the imaging location may each correspond to a particular position across the width of the ribbon transport path. For example, the imaging location may comprise an imaging line which extends in a direction perpendicular to the direction of ribbon movement along the ribbon transport path.

Each pixel of the sensor may be configured to image a corresponding region on the imaging line.

Each of the partial images themselves may comprise rows, each of which is captured as a particular region of ribbon passes the capture device.

The method may comprise obtaining a first one of said plurality of partial images during a first ribbon movement and obtaining a second one of said plurality of partial images during a second ribbon movement, wherein the ribbon transport direction is reversed between said first and second ribbon movements.

The ribbon transport direction may be reversed more than once between said first and second ribbon movements, for example, such that the ribbon transport direction is the same during each of the capture of the first and second partial images.

Said first and second ones of said plurality of partial images may be obtained when the ribbon transport direction is equal to said predetermined ribbon transport direction. The method may comprise determining whether the ribbon transport direction is equal to said predetermined ribbon transport direction, and in response to determining that the ribbon transport direction is equal to said predetermined ribbon transport direction, obtaining said first and second ones of said plurality of partial images.

Said first and second ones of said plurality of partial images may be obtained when the ribbon transport speed is substantially equal to said predetermined ribbon transport speed. The method may comprise determining whether the ribbon transport speed is substantially equal to said predetermined ribbon transport speed, and in response to determining that the ribbon transport speed is substantially equal to said predetermined ribbon transport speed, obtaining said first and second ones of said plurality of partial images.

Said ribbon image may be obtained when the printhead is printing using a further region of ribbon. Determining whether a characteristic of the ribbon transport meets a predetermined criterion may comprise determining whether the printhead is printing using a further region of ribbon.

During printing, the ribbon speed may be substantially constant, allowing imaging to be performed reliably.

Said first and second ones of said plurality of partial images may be obtained when the magnitude of ribbon acceleration is less than the predetermined ribbon acceleration threshold. The method may comprise determining whether the magnitude of ribbon acceleration is less than the predetermined ribbon acceleration threshold, and in response to said determining, obtaining said first and second ones of said plurality of partial images.

According to an eighth aspect of the invention there is provided a method for monitoring a characteristic of a printed image of a transfer printer. The method comprises providing a ribbon and a substrate at a printing location of the transfer printer. The method further comprises printing an image on the substrate at the printing location by transferring ink from a region of the ribbon in a printing operation, a negative image being formed on the ribbon. The method further comprises obtaining data indicative of the position of a printhead of the transfer printer during said printing, obtaining data indicative of the image that is intended to be printed onto the substrate, and obtaining, by an image capture system, a ribbon image of the negative image. The method further comprises determining a relationship between said ribbon image and said data indicative of the image that is intended to be printed onto the substrate based upon said data indicative of the position of the printhead, and processing said ribbon image and said data indicative of the image that is intended to be printed onto the substrate to generate data indicative of the characteristic of the printed image.

Determining a relationship between said ribbon image and said data indicative of the image that is intended to be printed onto the substrate based upon said data indicative of the position of the printhead may comprise generating data indicating a correspondence between a region of the ribbon and data captured by said image capture system.

The image capture system may be operated to capture the ribbon image based upon said data indicative of the position of the printhead during said printing.

For example, the image capture system may be activated when an appropriate portion of ribbon is located at an imaging location of the image capture system.

Alternatively, image data may be captured and the data indicative of the position of the printhead during said printing used after capture to identify parts of the image data which correspond to parts of the negative image.

The data indicative of the position of the printhead may be used to track the negative image on the ribbon as it moves from the printing location to an imaging location at which the image capture system is arranged to capture the ribbon image.

The printhead position may move during operation (e.g. during intermittent printing operations, or to effect different printhead pressures). Thus, the relative offset between the printing location and the imaging location can change from an initial offset.

Printhead position data may be generated as described in the context of different aspects of the invention (for example by use of a sensor associated with a printhead drive assembly.

The transfer printer may comprise a printhead drive assembly for varying the position of the printhead relative to a printing surface, and a sensor associated with the printhead drive assembly. The data indicative of the position of the printhead during the printing may be generated by the sensor. The printhead drive assembly may comprise a printhead motor. The sensor may be a rotary encoder associated with an output shaft of the printhead motor.

The method may comprise transporting the region of ribbon, by a ribbon transport system, from the printing location towards an imaging location along a ribbon transport path.

Determining the relationship between said ribbon image and said data indicative of the image that is intended to be printed onto the substrate may be further based upon data indicative of an amount of ribbon moved by the ribbon transport system.

By monitoring the distance moved by the ribbon, it is possible to monitor the movement of ribbon as it moves towards the image capture location, and, when the region of ribbon has arrived at the image capture location, capture image data.

Determining the relationship between said ribbon image and said data indicative of the image that is intended to be printed onto the substrate may be further based upon data indicative of distance between said printing location and said imaging location.

Said data indicative of an amount of ribbon moved by the ribbon transport system may be generated by a sensor associated with a portion of the ribbon transport system. The sensor may be a rotary encoder.

The sensor may be associated with a motor, said motor being arranged to cause a spool of ribbon to rotate.

The data indicative of an amount of ribbon moved by the ribbon transport system may be determined based upon data indicative of a diameter of a spool of ribbon driven by said motor.

Processing said ribbon image and said data indicative of the image that is intended to be printed onto the substrate to generate data indicative of the characteristic of the printed image may be based upon adjustment data, said adjustment data being based upon predetermined spatial characteristics and spatial data. The adjustment data may be generated as described below in the context of further aspects of the invention.

The eighth aspect of the invention may further comprise features described below in the context of other aspects of the invention.

According to a ninth aspect of the invention there is provided a method for calibrating an image capture system arranged to capture images from a ribbon of a thermal transfer printer. The method comprises providing a ribbon at a printing location of the thermal transfer printer, imparting a pattern on a portion of the ribbon, and transporting the portion of ribbon, by a ribbon transport system, from the printing location towards an imaging location along a ribbon transport path. The method further comprises generating data indicative of an amount of ribbon moved by the ribbon transport system. The method further comprises determining a characteristic of the image capture system, said characteristic comprising a spatial distribution of radiation intensity, identifying a predetermined feature in the characteristic, said feature corresponding to a feature of said pattern, and generating data indicative of distance between said printing location and said imaging location based upon said data indicative of an amount of ribbon moved by the ribbon transport system and said identification.

In this way, an offset between the printing location and the imaging location is determined. This allows subsequent imaging to be carried out at a known location relative to the printing location, such that images captured by the image capture system can be accurately compared against expected images which can be derived from the data provided to the printhead for printing using the ribbon. This process can allow for small variations in each system (for example, due to mechanical tolerances) to be compensated for into subsequent operations.

The pattern may be a predetermined pattern.

The characteristic may comprise a plurality of data items, each data item being indicative of radiation intensity at a respective one of a plurality of capture regions, each of the plurality of capture regions corresponding to a respective one of a plurality of regions of the imaging location.

The method may comprise determining a plurality of characteristics of the image capture system at a corresponding plurality of times.

The method may comprise determining one of said plurality of times at which the feature is identified.

The method may comprise determining the first of said plurality of times at which the feature is identified. In this way, the time at which the feature arrives at the image capture location may be determined.

The method may comprise generating data indicative of an amount of ribbon moved by the ribbon transport system at each of said plurality of times.

By monitoring the distance moved by the ribbon at each of the plurality of times, it is possible to monitor for the arrival of the feature at the image capture location, and, when it is identified, determined the distance moved at that time.

Generating data indicative of distance between said printing location and said imaging location may comprise identifying data indicative of an amount of ribbon moved by the ribbon transport system at said one of said plurality of times.

Said feature of said pattern may be a leading edge of the pattern. The leading edge may be a feature of the pattern which first reaches the imaging location when the ribbon is moved along the ribbon path in a ribbon transport direction.

Imparting said pattern on the portion of the ribbon may comprise printing a corresponding pattern on a substrate provided adjacent to said ribbon. Said printing may comprise causing ink to be transferred from the region of the ribbon to the substrate, a negative image of the pattern being formed on the ribbon. The negative image of the pattern may be detected by the image capture system.

Said data indicative of an amount of ribbon moved by the ribbon transport system may be generated by a sensor associated with a portion of the ribbon transport system. The sensor may be a rotary encoder. The sensor may be associated with a motor, said motor being arranged to cause a spool of ribbon to rotate. The data indicative of the distance between said printing location and said imaging location may be further determined based upon data indicative of a diameter of a spool of ribbon driven by said motor.

Identifying said predetermined feature corresponding to a feature of said pattern in the characteristic may comprise determining a first expected value of said characteristic and a second expected value of said characteristic. Said first and second expected values may be based upon a dimension (e.g. a width) of the ribbon. Said first expected value may be indicative of an expected characteristic when ink is present across the full ribbon width. Said second expected value may be indicative of an expected characteristic when ink has been transferred from a portion of the ribbon to the substrate such that a negative image of the pattern is on the portion of the ribbon. Identifying said predetermined feature may comprise determining a position of said feature based upon said spatial distribution of radiation intensity, said first expected value and said second expected value.

It will be understood that the second expected value will typically be higher than the first expected value. A threshold level may be determined based on the first and second expected values. The threshold level may then be used to identify the position of the leading edge of the printed pattern on the ribbon in the direction of ribbon movement. Thus, rather than examining precisely the region of ribbon in which the calibration pattern is expected to appear, this technique may allow an aggregate or total received radiation intensity to be used to identify approximately where the calibration pattern is located on the ribbon as the ribbon is transported past the imaging location.

According to a tenth aspect of the invention there is provided a method for calibrating an image capture system arranged to capture images from a ribbon of a thermal transfer printer. The method comprises providing a ribbon at a printing location of the thermal transfer printer, imparting a predetermined pattern on the ribbon at the printing location, the predetermined pattern having at least one feature having predetermined spatial characteristics, and transporting the ribbon, by a ribbon transport system, from the printing location towards an imaging location along a ribbon transport path. The method further comprises determining a characteristic of the image capture system, said characteristic comprising a spatial distribution of radiation intensity, said spatial distribution comprising a feature corresponding to said predetermined pattern on the ribbon, generating spatial data relating to said feature based upon said characteristic, and generating adjustment data based upon said predetermined spatial characteristics and said spatial data.

The characteristic of the image capture system may be determined by imaging the ribbon at the imaging location. The imaging location may be downstream from the printing location in the direction of ribbon transport.

The predetermined spatial characteristics may comprise a predetermined dimension in a first direction.

The first direction may be a direction perpendicular to the direction of ribbon transport. A predetermined portion of said predetermined pattern may be used to generate the spatial data. For example, a width of the predetermined pattern may be used to generate an apparent dimension. The width at a predetermined location within the pattern may be determined. For example, in order to avoid possible image noise, a width a predetermined distance along the predetermined pattern may be considered.

The predetermined pattern may be a rectangle; the rectangle may be aligned with the direction of ribbon transport. In this way, the rectangle has a uniform width in the direction of transport, and this even if the width is determined at a variety of locations, the determined width should be the same. The predetermined pattern may comprise a calibration pattern.

A dimension of the predetermined pattern may be determined based upon a characteristic of the ribbon. The dimension may be based upon a dimension of the ribbon, such as, for example a dimension of the ribbon in a direction perpendicular to the direction of ribbon transport. For example, where the pattern is a rectangle, the width of the rectangle may be selected based upon the width of the ribbon used for printing. In an embodiment, the rectangle may extend for a predetermined portion of the ribbon width.

The predetermined pattern may comprise a plurality of features. Said plurality of features may be discontinuous. For example, the pattern may comprise several printed sub-regions which are separated by regions of non-printed ribbon.

Alternatively, or additionally, it may be that certain regions of a predetermined pattern are not printed, for example as a result of a defective printhead. As such, in some embodiments, when the ribbon is imaged at the imaging location, account may be taken for an expected deviation between the predetermined pattern and the imaged pattern.

Generating said spatial data relating to said feature may comprise identifying an apparent dimension of said feature in the first direction based upon said characteristic.

Said adjustment data may comprise a scaling factor, said scaling factor being generated based upon said predetermined dimension and said apparent dimension.

The scaling factor may be a dimensional scaling factor which can be applied the apparent dimension or the predetermined dimension to generate the other of the apparent dimension or the predetermined dimension. In this way, the scaling factor allows expected and captured images to be compared so as to identify differences and/or similarities.

The predetermined spatial characteristics may comprise a predetermined position in a first direction.

Generating said spatial data relating to said feature may comprise identifying an apparent position of said feature in the first direction based upon said characteristic.

The method according to the tenth aspect may be carried out infrequently, such as for example, once before each print job, each time a new ribbon is installed in a printer, or each time a printer is powered on. Alternatively, the method may be carried out at more frequent intervals, such as, for example, once before the printing of each image. The method may thus advantageously allow the system to compensate for ribbon drift across the printhead during the printing process. In such an arrangement, the predetermined pattern may comprise an image to be printed on a substrate (i.e. and is not necessarily a dedicated calibration pattern).

Further or alternatively, the first direction may comprise a direction parallel to the direction of ribbon transport. The feature corresponding to said predetermined pattern on the ribbon may comprise a leading edge and a trailing edge of said at least one feature of the pattern along the direction of ribbon transport. The spatial data may comprise an apparent length of said at least one feature of the pattern along the direction of ribbon transport. The predetermined spatial characteristics may comprise a predetermined length of said at least one feature of the pattern along the direction of ribbon transport; and the scaling factor may be a dimensional scaling factor along the direction of ribbon transport.

Said adjustment data may comprise a position factor, said position factor being generated based upon said predetermined position and said apparent position.

The position factor may be a positional offset, or pixel position at which the pattern is expected to begin. The position factor may be a positional offset which can be applied the apparent position or the predetermined position to generate the other of the apparent position or the predetermined position. In this way, the positional factor allows expected and captured images to be compared so as to identify differences and/or similarities.

The characteristic may comprise a plurality of data items, each data item being indicative of radiation intensity at a respective one of a plurality of capture regions, each of the plurality of capture regions corresponding to a respective one of a plurality of regions of the imaging location.

Generating spatial data relating to said feature may comprise identifying a subset of said data items which correspond to said predetermined pattern on the ribbon.

Identifying said subset may comprise identifying a subset of said data items which satisfy a predetermined criterion, such as, for example, an intensity threshold criterion. Generating spatial data may comprise determining a number of data items that satisfy the predetermined criterion. Generating spatial data may comprise determining a position of one or more of the data items that satisfy the predetermined criterion within said plurality. Each of said of regions of the image capture location may have a predetermined dimension. Each of said of regions of the image capture location may have a predetermined position. Each of said of regions of the image capture location may have a predetermined positional relationship with said printing location.

The method may further comprise performing a method according to the ninth aspect of the invention.

According to an eleventh aspect of the invention there is provided a method for controlling an operation of transfer printer based upon a characteristic of an image capture system arranged to capture images from a ribbon of the transfer printer, the image capture system comprising a radiation emitter and a radiation detector. The method comprises receiving a signal indicative that a ribbon has been removed from an imaging location of the image capture system. The method further comprises determining a first characteristic of the image capture system, said first characteristic comprising a spatial distribution of radiation intensity. The method further comprises generating first data indicative of a characteristic of a predetermined plurality of parts of a path of radiation between the radiation emitter and the radiation detector based upon said first characteristic. The method further comprises identifying a second characteristic of the image capture system based upon said first data, and controlling an operation of the printer based upon said identified second characteristic.

In this way, is possible to perform a diagnostic test on the image capture system so as to identify the second characteristic (which may, for example, indicate that either of the emitter or detector are dirty or obstructed) and control the printer accordingly. This may be used to prevent operation where the image capture system is not working properly due to the radiation path being obstructed.

The signal indicative that a ribbon has been removed from an imaging location of the image capture system may comprise a signal indicative that a ribbon cassette has been removed from the printer. The ribbon cassette may be a cassette comprising spool supports upon which ribbon is wound. Alternatively, the signal indicative that a ribbon has been removed from an imaging location of the image capture system may comprise a signal indicative that ribbon is not present at the imaging location.

Identifying a second characteristic may comprise identifying one of a predetermined set of characteristics based upon said first data.

Identifying said second characteristic may comprise generating a relationship between said first data and one or more predetermined identifiers.

Said one or more predetermined identifiers may be selected from the group consisting of: an identifier indicating that the image capture system is ready for use; an identifier indicating that the image capture system is not ready for use; an identifier indicating that the image capture requires some maintenance.

An identifier indicating that the image capture system is not ready for use may be indicative that an object is obstructing a plurality of parts of the radiation path.

An identifier indicating that the image capture system is not ready for use may be indicative that a plurality objects are blocking a respective plurality of parts of the radiation path.

An identifier indicating that the image capture system requires some maintenance may be indicative that a plurality objects are blocking a respective plurality of parts of the radiation path. Said maintenance may be a cleaning operation.

Identifying said second characteristic may comprise determining if said relationship satisfies a predetermined condition.

Identifying said second characteristic may comprise generating a plurality of relationships between said first data and one or more predetermined identifiers at a corresponding plurality of times.

By generating the relationship a plurality of times, it is possible to check if an indication of a particular characteristic is simply a transient artefact, or if it is persistent (and thus indicative of a real characteristic).

Identifying said second characteristic may comprise determining if a plurality of said relationships satisfy said predetermined condition.

The plurality of said relationships may be a consecutive plurality. That is, consecutive ones of the relationships may be examined to determine if the predetermined condition is satisfied at a plurality (e.g. three) of times.

Controlling an operation of the printer may comprise generating a user warning. The user warning may be an audible and/or a visible warning.

Said first data may comprise an indication of an obscured or unobscured status of said part of said path.

Said first data may comprise a plurality of first data items, each of said plurality of first data items corresponding to a respective one of the plurality of parts of the path of radiation between the radiation emitter and the radiation detector.

In this way, it is possible to identify second characteristics by examining patterns of obscured and unobscured pixels within the first characteristic. The second characteristic may, for example, be identified by a predetermined number of contiguous obscured pixels, or a predetermined ratio of obscured to unobscured pixels within a predetermined part of the first characteristic (which may, for example, correspond to a predetermined plurality of the parts of the path).

The method may further comprise identifying said second characteristic of the image capture system based upon said first characteristic. That is, the second characteristic may be identified on the basis of a full width image scan (e.g. an average intensity value), rather the first data, which may, for example, be indicative of a status of each pixel)

Said path of radiation between the radiation emitter and the radiation detector may comprise a path from said radiation emitter, via a capture location, and to the radiation detector.

The radiation emitter may comprise a plurality of emitter elements. The emitter elements may be light emitting diodes. The radiation detector may comprise a plurality of detector elements. The radiation detector may comprise a photodetector array. The photodetector array may comprise a one-dimensional photodetector array.

According to a twelfth aspect of the invention there is provided a method for calibrating an image capture system arranged to capture images from a ribbon of a thermal transfer printer. The method comprises determining a first characteristic of an image capture system, said first characteristic comprising a spatial distribution of radiation intensity. The method further comprises obtaining a second characteristic of the image capture system, said second characteristic comprising a modified spatial distribution of radiation intensity, a second part of the second characteristic having a first relationship with the first characteristic, and a first part of the second characteristic having a second relationship with the first characteristic, the first part being indicative of a property of the image capture system. The method further comprises adjusting the second part of the second characteristic based upon the first characteristic, and said first part of the second characteristic.

By determining a first characteristic of the image capture system (e.g. an intensity scan when no ribbon is present) and obtaining a second characteristic (e.g. an intensity scan when a ribbon is present) it is possible to use both characteristics, and properties of known relationships between the two characteristics, to adjust the second characteristic, for example, to provide equivalent data within the parts of the second characteristic which correspond to parts of the imaging location where there is no ribbon.

That is, the first characteristic can include data indicative of a background level of radiation, and thus allow the image capture system to be normalised for inherent variations in radiation intensity. The second characteristic, on the other hand, can include data indicative of a background level of radiation when ribbon is present, and thus allows the image capture system to be normalised for the expected level of radiation when ribbon is present. However, where the ribbon does not cover the entire imaging location, the parts of the second characteristic where ribbon data is missing can be populated by using corresponding parts of the first characteristic, adjusted in intensity such that they are equivalent to the parts of the second characteristic where ribbon data is present.

In this way, a useful background characteristic can be obtained for the full imaging location, allowing for intensity normalisation to be performed to take into account system properties (e.g. emitter and detector non-linearities) and ribbon transmission properties.

Adjusting the second part of the second characteristic based upon the first characteristic, and said first part of the second characteristic may comprise obtaining a second part of the first characteristic corresponding to the second part of the second characteristic, generating an adjustment factor based upon the first part of the second characteristic, applying said adjustment factor to said second part of the first characteristic, and generating said second part of the said second characteristic based upon said adjusted second part of the first characteristic.

The image capture system may comprise a capture location and an imaging location. Radiation intensity at the image capture location may be indicative of a property of the imaging location.

The spatial distribution of radiation intensity and/or the modified spatial distribution of radiation intensity may comprise data indicative of a radiation intensity at a plurality of capture regions of the capture location.

The radiation intensity at each one of the plurality of capture regions of the capture location may be indicative of a property at a corresponding one of a plurality of regions of the imaging location.

The second characteristic may comprise a background spatial distribution of radiation intensity.

The first characteristic may comprise a spatial distribution of radiation intensity at a first radiation emission intensity. The second characteristic may comprise a background spatial distribution of radiation intensity at a second radiation emission intensity. The second radiation emission intensity may be greater than the first radiation emission intensity.

The first characteristic may comprise a spatial distribution of radiation intensity in a first ribbon condition. The first ribbon condition may comprise a ribbon being removed from the printer (that is, no ribbon being present at an imaging location of the printer).

The second characteristic may comprise a spatial distribution of radiation intensity in a second ribbon condition. The second ribbon condition may comprise a ribbon being inserted into the printer (that is, a ribbon being present at an imaging location of the printer). By obtaining different spatial distribution of radiation intensities with and without a ribbon present, it is possible to normalise the expected intensity levels of radiation due to system non-linearities, and ribbon transmission characteristics.

The first radiation emission intensity (i.e. when the ribbon is absent) may be lower than the second intensity (i.e. when the ribbon is present). In this way, when the ribbon is absent, and does not, therefore, absorb a portion of the radiation, the sensors are not saturated. Moreover, the first radiation emission intensity may be selected so as to simulate the intensity received at the sensor when ribbon is present.

The first relationship may be indicative of a ribbon not being present at a first region of an imaging location.

The second relationship may be indicative of a ribbon being present at a second region of an imaging location.

Even when a ribbon is present at the imaging location, it may not extend to cover the entire imaging location. Thus, some parts of the second characteristic (e.g. the second part) may have a spatial distribution which is indicative of the ribbon not being present at the first region of the imaging location. However, other parts of the second characteristic (e.g. the first part) may have a spatial distribution which is indicative of the ribbon not being present at the second region of the imaging location.

The first and second relationships may each be a ratio of radiation intensity between the respective first and first parts of the first and second characteristics.

The first characteristic may comprise a plurality of first data items, each first data item being indicative of radiation intensity at a respective one of a plurality of capture regions, each of the plurality of capture regions corresponding to a respective one of a plurality of regions of the imaging location.

The second characteristic may comprise a plurality of second data items, each second data item being indicative of radiation intensity at a respective one of a plurality of capture regions, each of the plurality of capture regions corresponding to a respective one of a plurality of regions of the imaging location.

Adjusting said second characteristic may comprise, for each of said plurality of capture regions, if the second data item indicates that ribbon is not present at the respective one of the plurality of regions of the imaging location, adjusting the respective second data item based upon a corresponding first data item of the first characteristic and at least one second data item corresponding to a region of the imaging location where ribbon is indicated as being present.

The method may further comprise obtaining, by the image capture system, said first characteristic, providing a ribbon at at least one of the regions of the imaging location, obtaining, by the image capture system, said second characteristic, and adjusting the second part of the said second characteristic.

According to a thirteenth aspect of the invention there is provided a method for monitoring a characteristic of a printed image of a thermal transfer printer. The method comprises providing a ribbon and a substrate at a printing location of the thermal transfer printer. The method further comprises printing an image on the substrate at the printing location by transferring ink from a region of the ribbon in a printing operation, a negative image being formed on the ribbon. The method further comprises obtaining first data indicative of the image that is intended to be printed onto the substrate. The method further comprises generating second data indicative of an expected negative image based upon said first data and predetermined spatial adjustment data. The method further comprises obtaining, by an image capture system, a ribbon image of the negative image. The method further comprises processing said ribbon image and said second data to generate data indicative of the characteristic of the printed image. By obtaining first data indicative of the image that is intended to be printed onto the substrate, it is possible to use this data to as the basis for comparison with a captured image. However, it will be understood that some scaling and/or repositioning may be necessary to allow the first data and the captured image data (i.e. the ribbon image) to be properly compared.

However, rather than spatially adjusting the image data (which may, for example be obtained from the circuitry controlling the print head), rather than the captured image data, the chances of image processing errors and artefacts degrading the captured image quality (which may already be limiting factor in reliably assessing printing quality) are reduced. That is, pixel boundaries will be adjusted in any scaling or re-positioning operation. It will be understood that any such processing may cause a loss of fidelity, and this processing is therefore avoided, where possible, on the image data.

The spatial adjustment data may be obtained by a method described in earlier aspects of the invention.

The method may further comprise generating an adjusted ribbon image by adjusting an intensity distribution of said ribbon image. Said processing of said ribbon image may be based upon said adjusted ribbon image. Adjusting an intensity distribution of said ribbon image may be based upon a predetermined intensity characteristic.

The predetermined intensity characteristic may be a background intensity characteristic. This allows for intensity normalisation to be performed to take into account system properties (e.g. emitter and detector non-linearities) and ribbon transmission properties.

In this way, the intensity of the ribbon image may be adjusted based upon normalisation data (e.g. background data), so as to take into account the predetermined intensity characteristic of the image capture system. The predetermined intensity characteristic may, for example, comprise the second characteristic of the image capture system generated in the first aspect of the invention.

The first data may have a first resolution and said second data may have a second resolution, said first resolution being higher than said second resolution.

The expected print data may initially have a higher resolution than the image capture data. Thus, the first data may be adjusted so as to have a lower resolution, for example a lower resolution which is substantially the same as the captured image data.

The method may further comprise transporting the ribbon, by a ribbon transport system from the printing location to an imaging location along a ribbon transport path. The method may further comprise generating data indicative of an amount of ribbon moved by the ribbon transport system.

By monitoring the transport of ribbon, it is possible accurately track portions of printed ribbon, thereby allowing corresponding portions of ribbon and expected image data to be compared.

Said data indicative of an amount of ribbon moved by the ribbon transport system may be generated by a sensor, for example as described with reference to earlier aspects of the invention.

According to a further aspect of the invention there is provided a transfer printer configured to transfer ink from a printer ribbon to a substrate which is transported along a predetermined substrate path adjacent to the printer. The printer comprises a tape drive for transporting ribbon between first and second ribbon spools along a ribbon path. The printer further comprises a printhead being displaceable towards and away from the predetermined substrate path and being arranged to, during printing, contact one side of the ribbon to press an opposite side of the ribbon into contact with a substrate on the predetermined substrate path, and a printing surface. The printer further comprises an image capture system configured to capture images of the ribbon at an imaging location and a controller arranged to perform a method according to any one of the above described aspects of the invention.

The tape drive may comprise two tape drive motors and two tape spool supports on which said spools of ribbon may be mounted, each spool being drivable by a respective one of said motors.

The transfer printer may be a thermal transfer printer, and the printhead may be a thermal printhead.

The transfer printer may further comprise a monitor arranged to generate an output indicative of movement of the printhead relative to the printing surface.

The image capture system may comprise a radiation detector. The radiation detector may be an electromagnetic sensor. The radiation detector may be arranged to generate data indicative of a property of the ribbon and/or the image capture system. The radiation detector may comprise an image sensor. The radiation detector may comprise a camera.

The image capture system may further comprise a radiation emitter, a radiation path being formed between said radiation emitter and the radiation detector.

The radiation emitter may emit visible light. The radiation emitter may comprise an array of radiation emitting elements, such as, for example, light emitting diodes. The image capture system may be arranged to generate data indicative of a characteristic of a predetermined plurality of parts of a path of radiation between the radiation emitter and the radiation detector. The characteristic may comprise data indicative of a transmittance of reflectance of material present at the imaging location.

The image capture system may be configured to generate data indicative of a characteristic of the image capture system, said characteristic comprising a spatial distribution of radiation intensity.

The image capture system may comprise a capture location. Radiation intensity at the image capture location may be indicative of a property of the imaging location.

The spatial distribution of radiation intensity may comprise data indicative of a radiation intensity at a plurality of capture regions of the capture location.

According to a further aspect of the invention there is provided an image capture system arranged to performed methods according to one or more earlier aspects of the invention.

Methods described above can be implemented in any convenient form. As such aspects of the invention also provide computer programs comprising computer readable instructions which can be executed by a processor associated with a tape drive, and/or a transfer printer so as to cause a tape drive and/or a printhead of the transfer printer to be controlled in the manner described above. Such computer programs can be stored on appropriate carrier media which may be tangible carrier media (e.g. disks) or intangible carrier media (e.g. communications signals). Aspects may also be implemented using suitable apparatus which may take the form of programmable computers running computer programs arranged to implement the invention.

Any feature described in the context of one aspect of the invention can be applied to other aspects of the invention.

Embodiments of the invention will now be described, by way of example, with reference to the accompanying drawings, in which.

Figure 1:
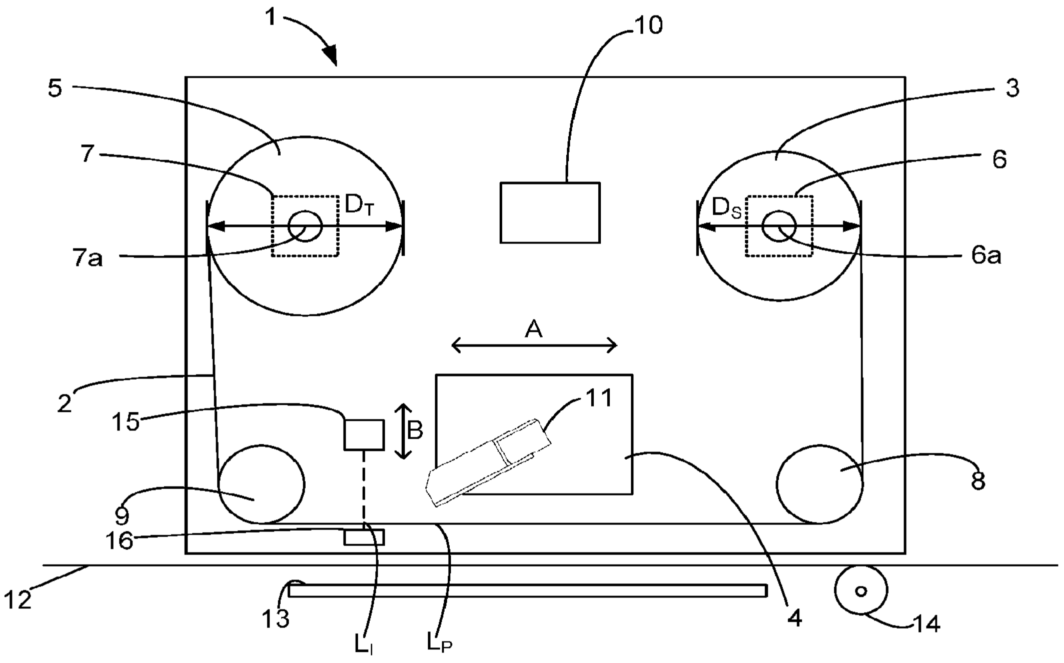
FIG. 1 is a schematic illustration of a printer in accordance with the present invention.
Figure 7A:
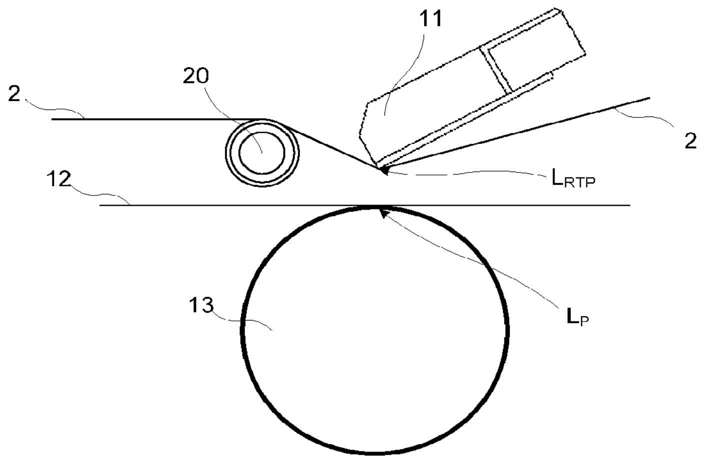
Figure 7B:
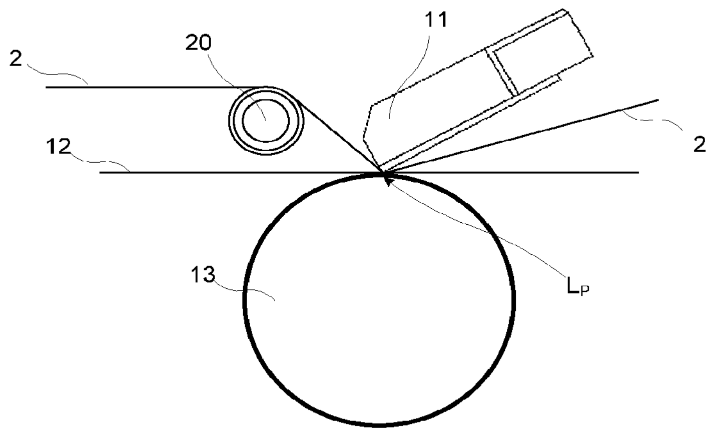
Figure 7C:
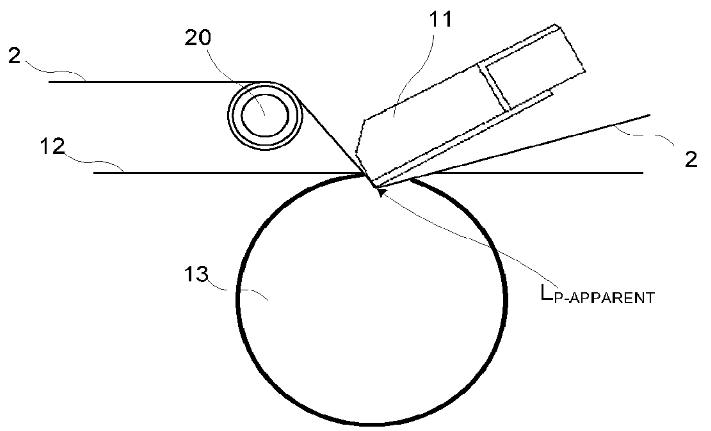
Figure 8:
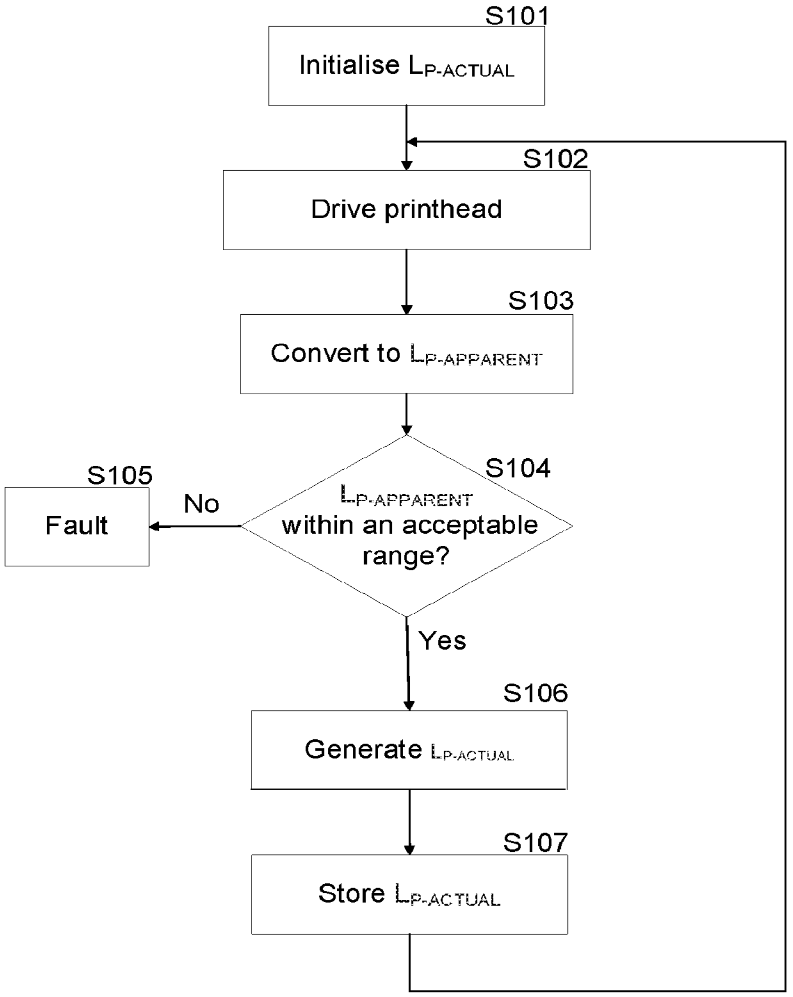
Figure 9:
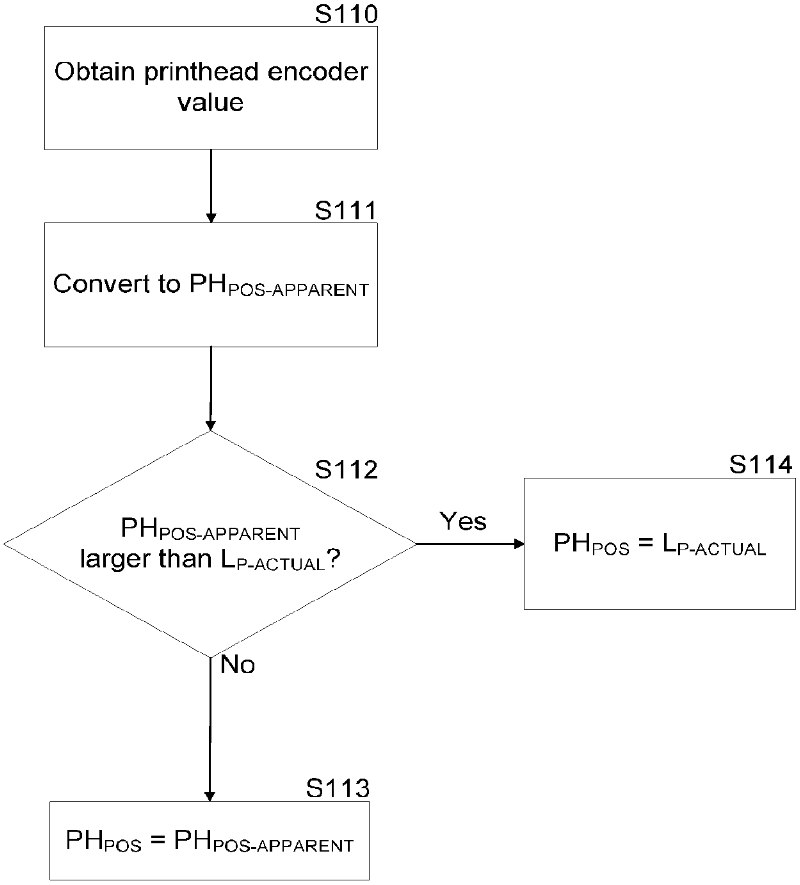
Figure 10:
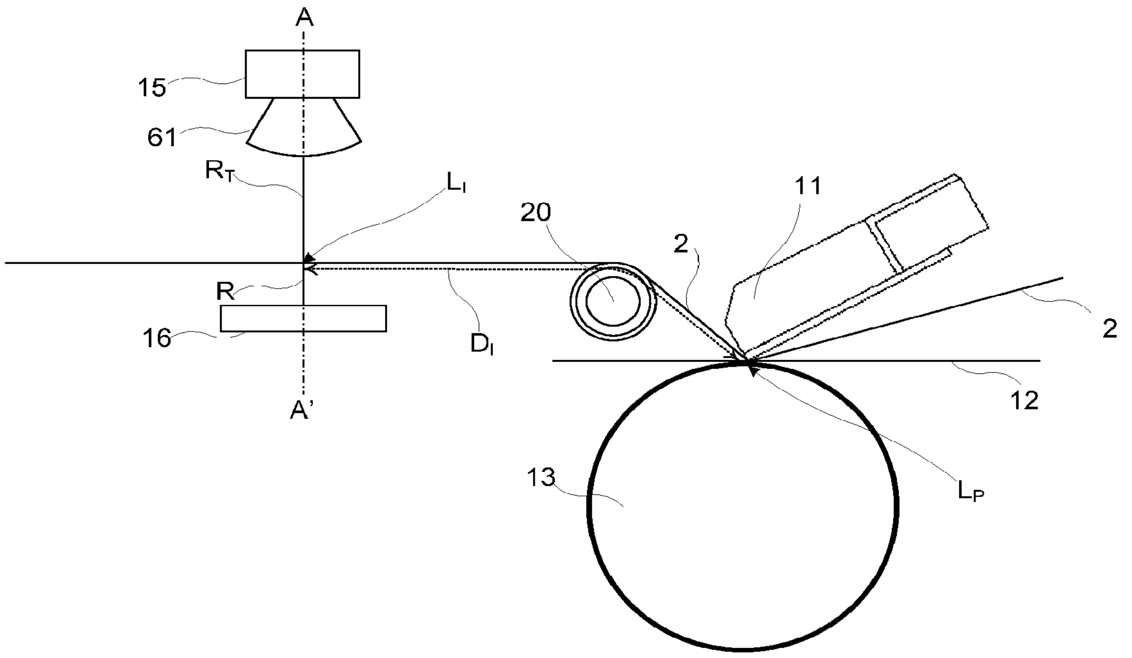
Figure 11:
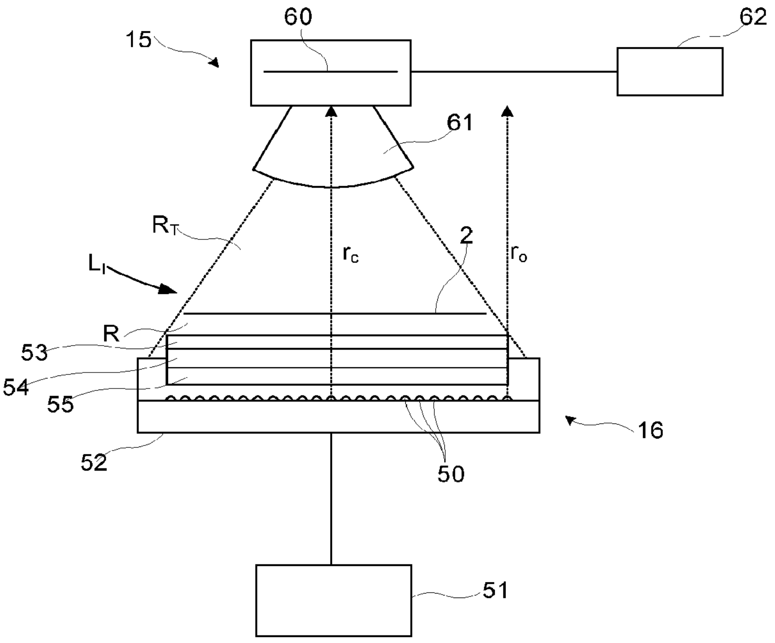
Figure 12A:
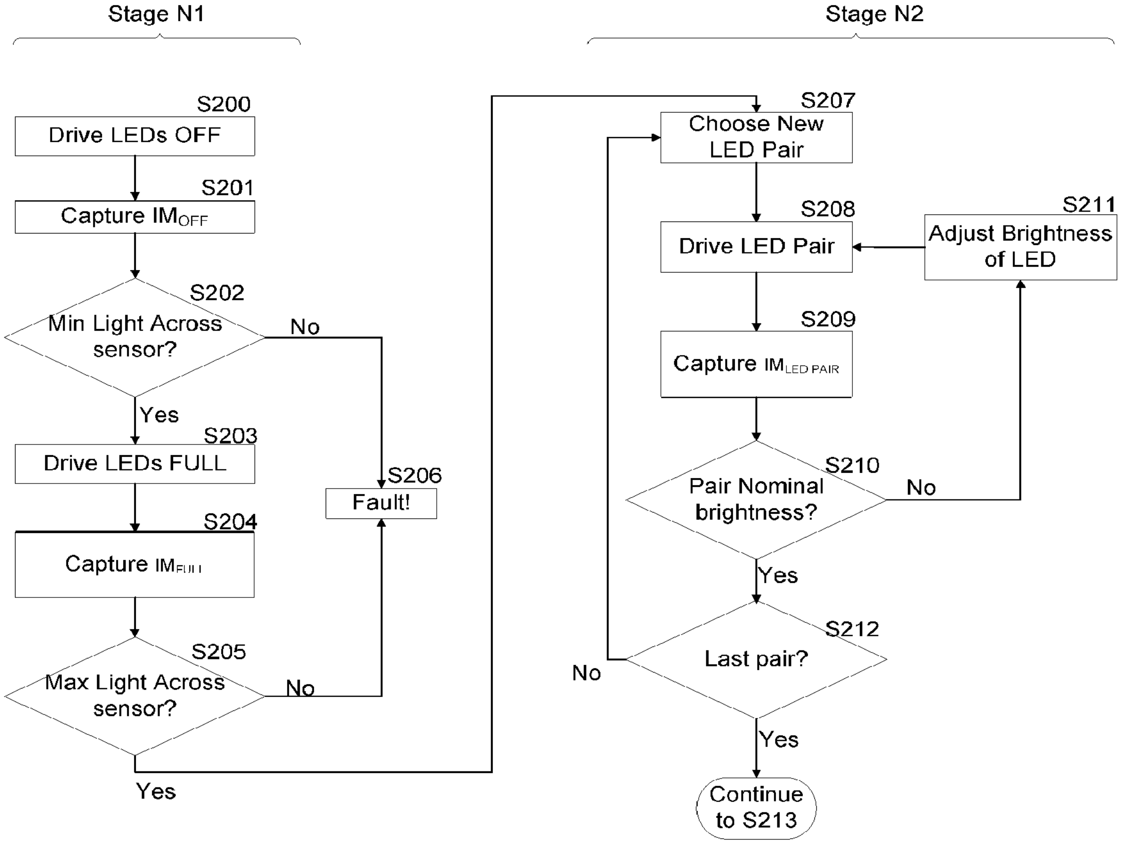
Figure 12B:
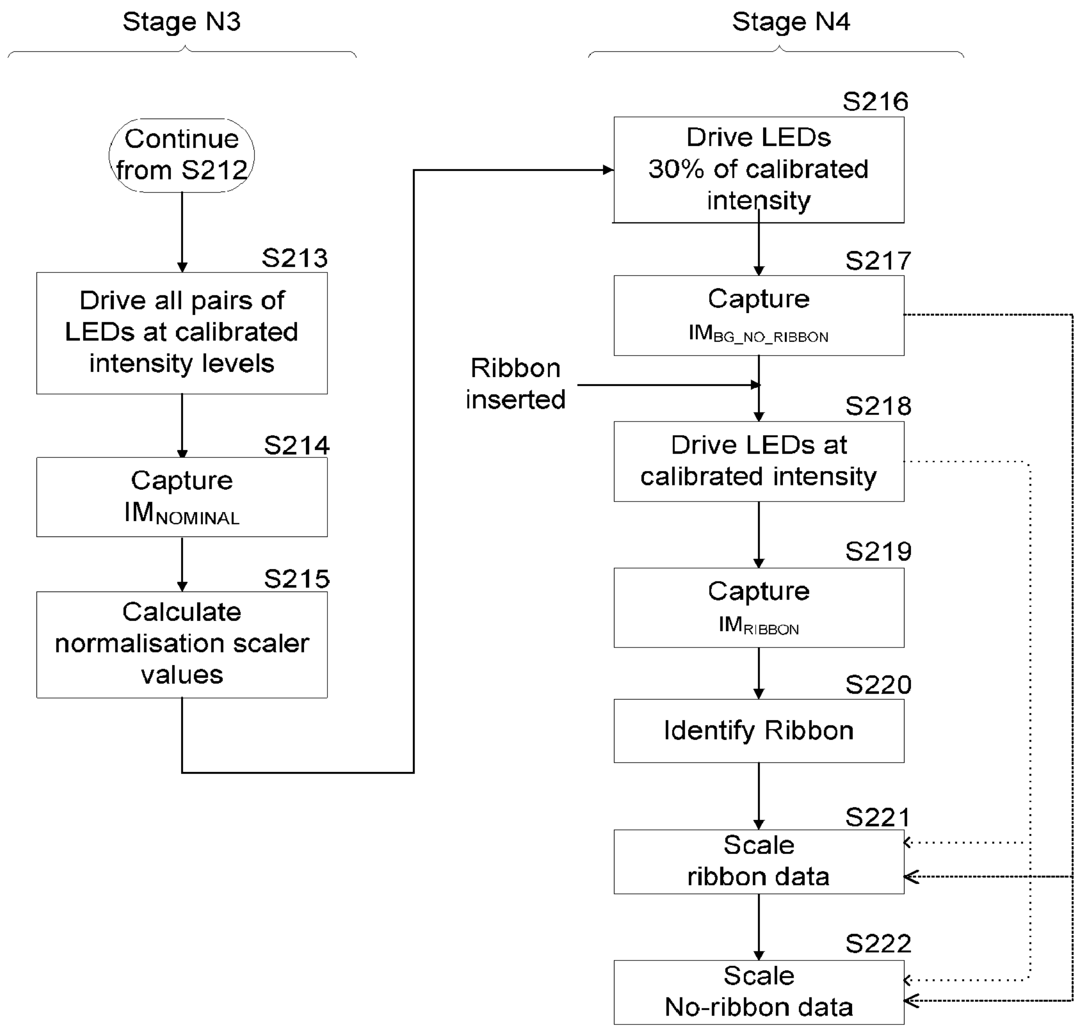
Figure 13:
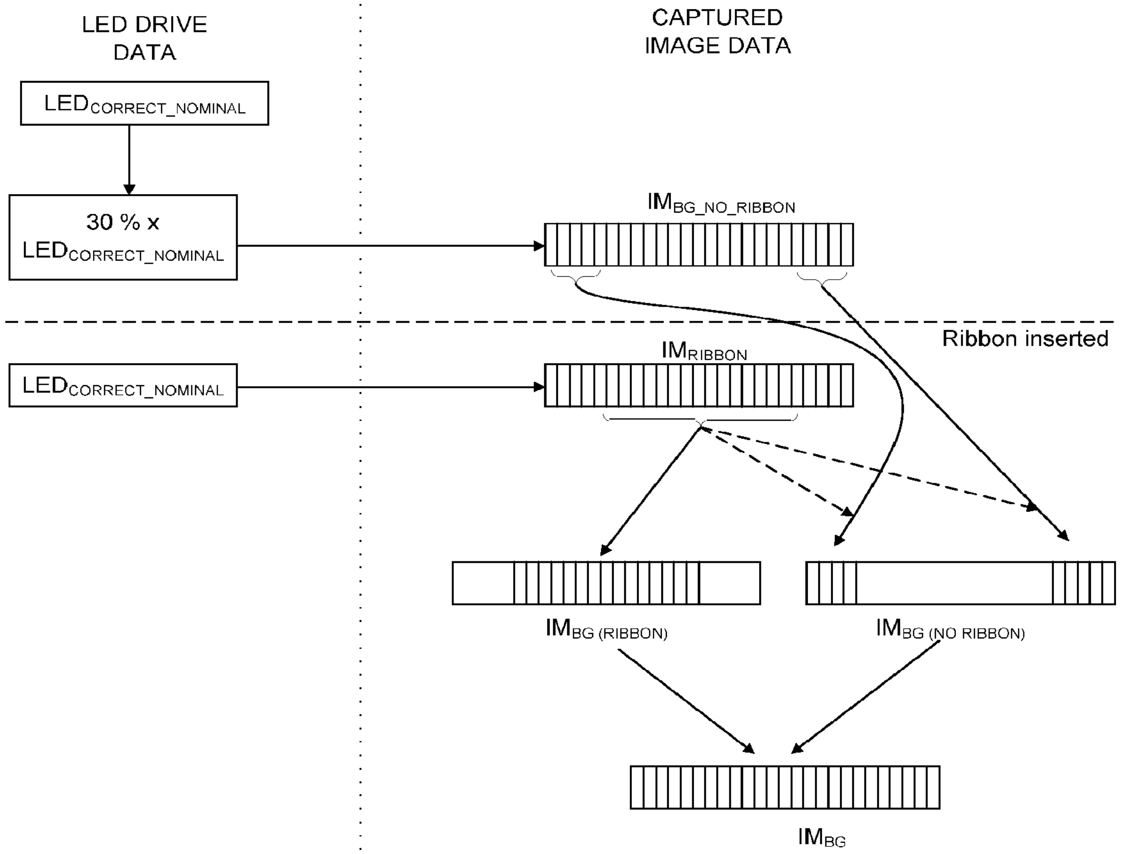
Figure 14:
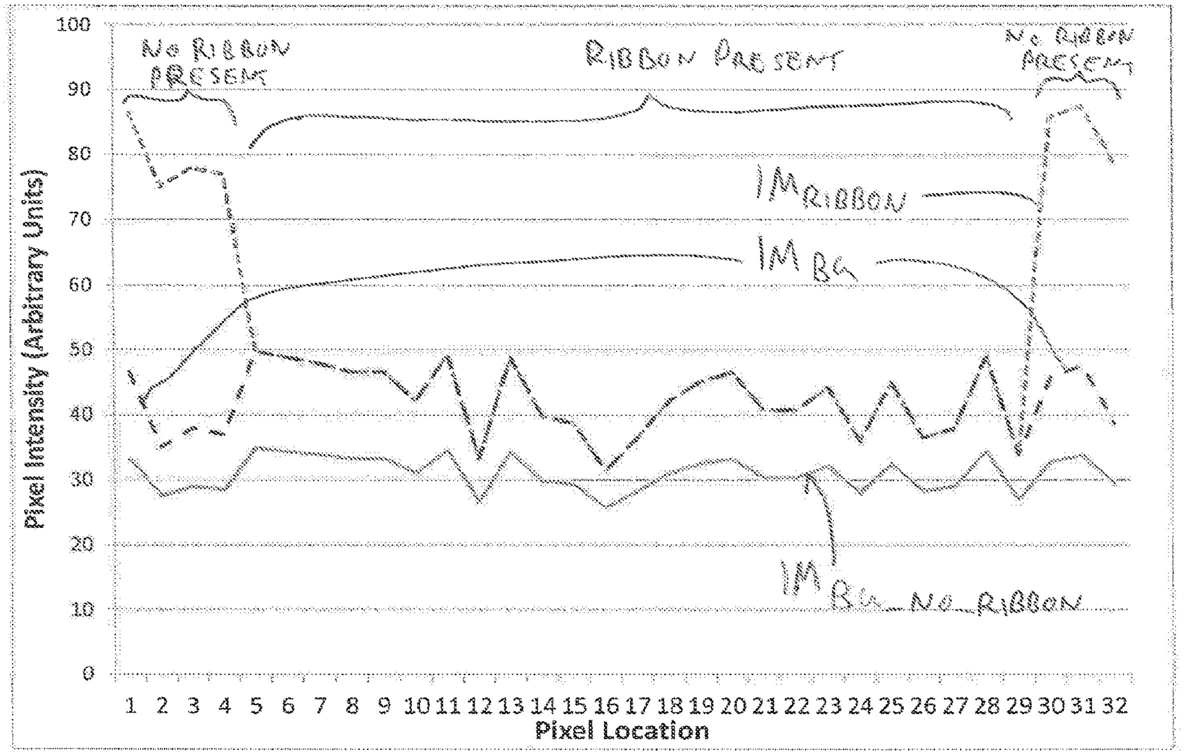
Figure 15:
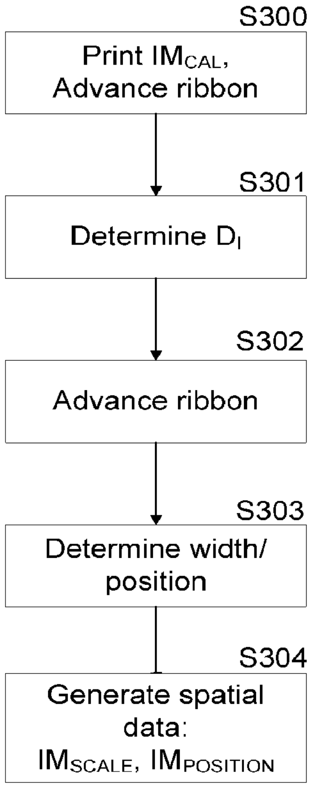
Figure 16:
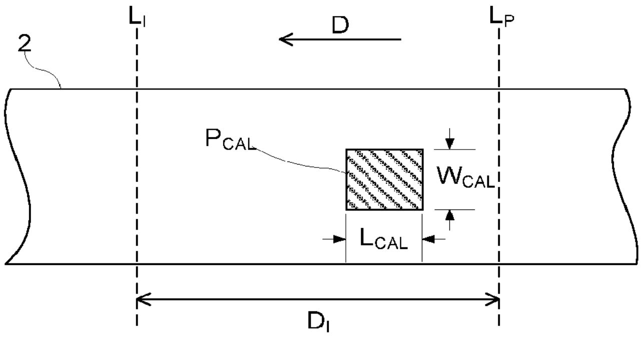
Figure 17:
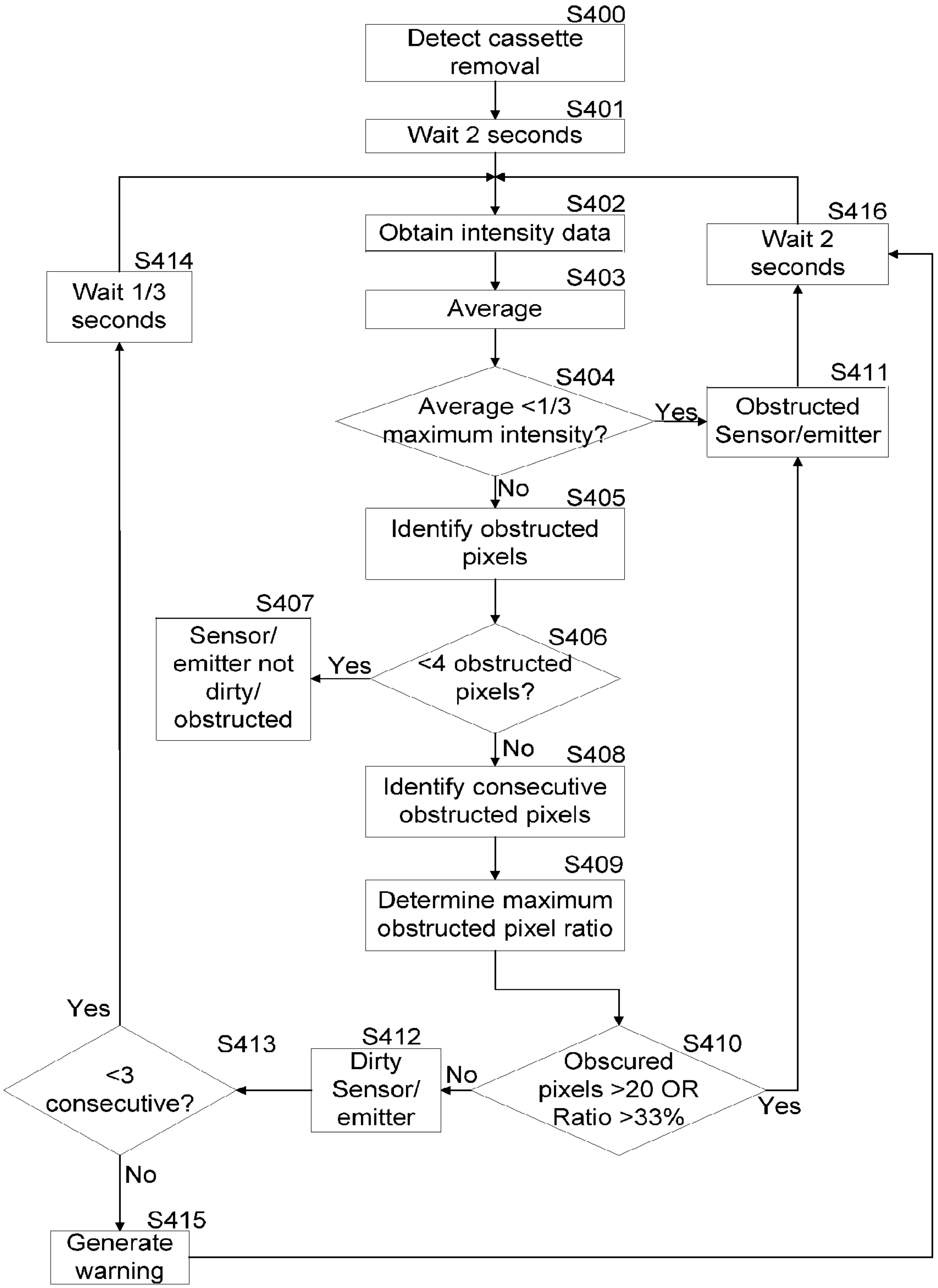
Figure 18:
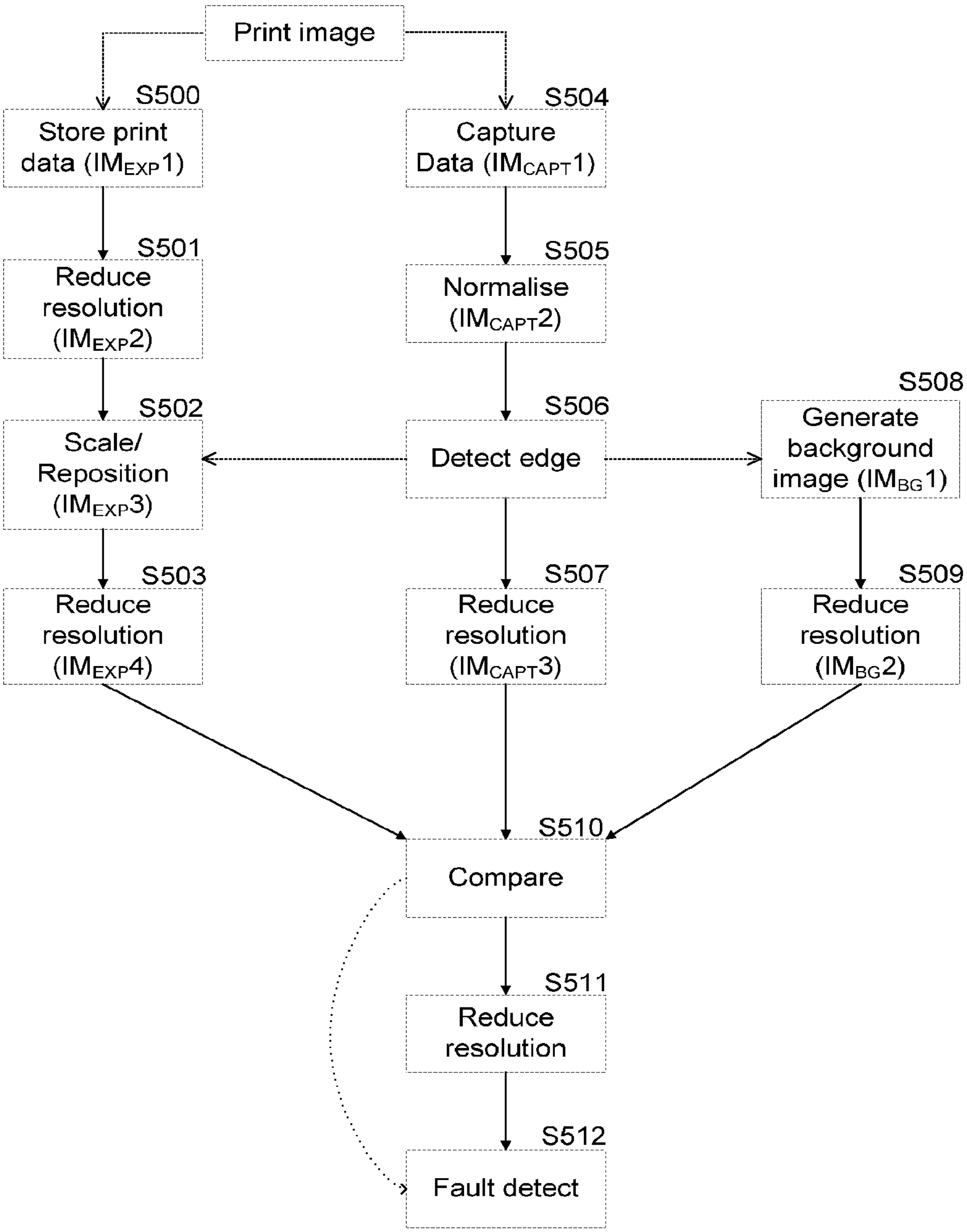
Figure 19:
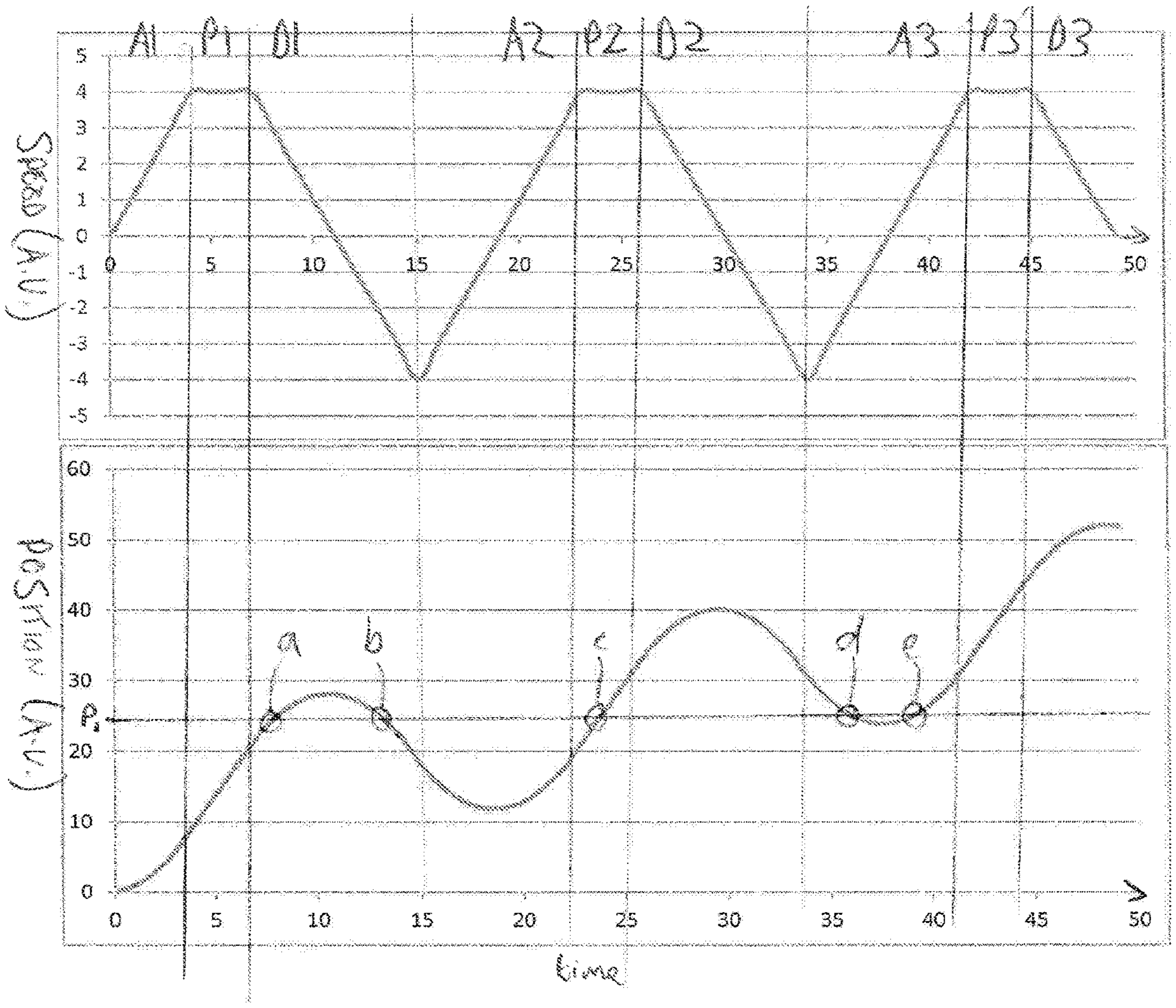

FIGS. 7*a* to 7*c* are schematic illustrations of part of the printer of FIG. 1 in various configurations;

FIG. 8 is a schematic illustration of processing performed by a controller of the printer of FIG. 1;

FIG. 9 is a schematic illustration of processing performed by a controller of the printer of FIG. 1;

FIG. 10 is a schematic illustration of part of the printer of FIG. 1, including an imaging system;

FIG. 11 is a schematic illustration of an imaging system associated with the printer of FIG. 1;

FIGS. 12A and 12B are schematic illustrations of processing performed by a controller of the printer of FIG. 1;

FIG. 13 is a schematic illustration of data associated with the imaging system of FIG. 11;

FIG. 14 is a schematic illustration of data associated with the imaging system of FIG. 11;

FIG. 15 is a schematic illustration of processing performed by a controller of the printer of FIG. 1;

FIG. 16 is a schematic illustration of part of a ribbon used by the printer of FIG. 1;

FIG. 17 is a schematic illustration of processing performed by a controller of the printer of FIG. 1;

FIG. 18 is a schematic illustration of processing performed by a controller of the printer of FIG. 1; and FIG. 19 is a schematic illustration of speed and position data associated with the tape drive of the printer of FIG. 1.

Referring to FIG. 1, there is illustrated a thermal transfer printer 1 in which ink carrying ribbon 2 is provided on a ribbon supply spool 3, passes a printhead assembly 4 and is taken up by a ribbon take-up spool 5. The ribbon supply spool 3 is driven by a stepper motor 6 while the ribbon take-up spool is driven by a stepper motor 7. In the illustrated embodiment the ribbon supply spool 3 is mounted on an output shaft 6*a* of its stepper motor 6 while the ribbon take-up spool 5 is mounted on an output shaft 7*a* of its stepper motor 7. Generally (but not necessarily) the spools 3, 5 are mounted on a cassette which can be readily mounted on the printer 1. The stepper motors 6, 7 may be arranged so as to operate in push-pull mode whereby the stepper motor 6 rotates the ribbon supply spool 3 to pay out ribbon while the stepper motor 7 rotates the ribbon take-up spool 5 so as to take up ribbon. In such an arrangement, tension in the ribbon may be determined by control of the motors. Such an arrangement for transferring tape between spools of a thermal transfer printer is described in our earlier U.S. Pat. No. 7,150,572, the contents of which are incorporated herein by reference.

During ribbon movement, ribbon paid out by the ribbon supply spool 3 passes a guide roller 8 before passing the printhead assembly 4 and a further guide roller 9 before being taken up by the ribbon take up spool 5. The motors 6, 7 are controlled by a controller 10. An encoder may be provided to generate a signal indicative of the position of the output shaft of one or both of the motors 6, 7. In an embodiment, an encoder 35 is provided to monitor the rotation of the take-up spool motor 7.

The printhead assembly 4 comprises a printhead 11 which presses the ribbon 2, and a substrate 12 against a printing surface 13 to effect printing. The location at which the ribbon 2 is pressed against the printing surface 13 by the printhead assembly 4 defines a printing location $L_P$. The printhead 11 is a thermal transfer printhead comprising a plurality of printing elements, each arranged to remove a pixel of ink from the ribbon 2 and to deposit the removed pixel of ink on the substrate 12.

The printhead assembly 4 is moveable in a direction generally parallel to the direction of travel of the ribbon 2 and the substrate 12 past the printhead assembly 4, as shown by an arrow A. Thus, the printing location $L_P$ varies in accordance with the movement of the printhead assembly 4 in the direction A. Further, at least a portion of the printhead assembly 4 is moveable towards and away from the substrate 12, so as to cause the ribbon 2 (when passing the printhead 11) to move into and out of contact with the substrate 12, as shown by arrow B.

An encoder 14 may be provided which generates data indicative of the speed of movement of the substrate 12 at the printing location $L_P$. The printer 1 further comprises a camera 15 and a light source 16 arranged on opposing sides of the ribbon path. The camera 15 and the light source 16 are each rigidly mounted to the base plate 24 of the printer 1. Thus the camera 15 and the light source 16 do not move with respect to the base plate 24 or other fixed components of the printer 1.

Figure 2:
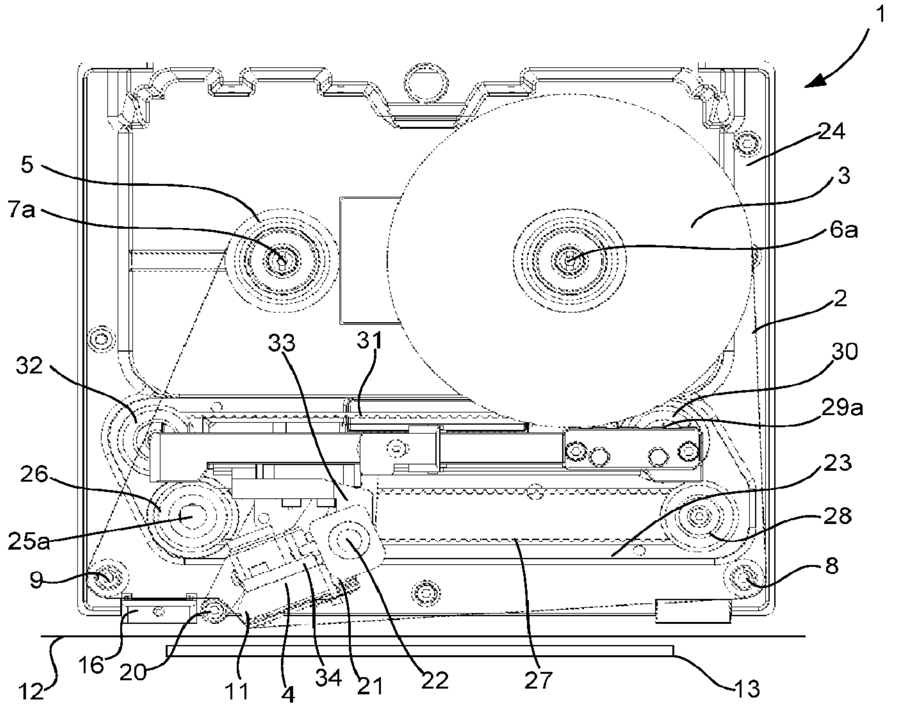
FIG. 2 is an illustration showing the printer of FIG. 1 in further detail.
Figure 3:
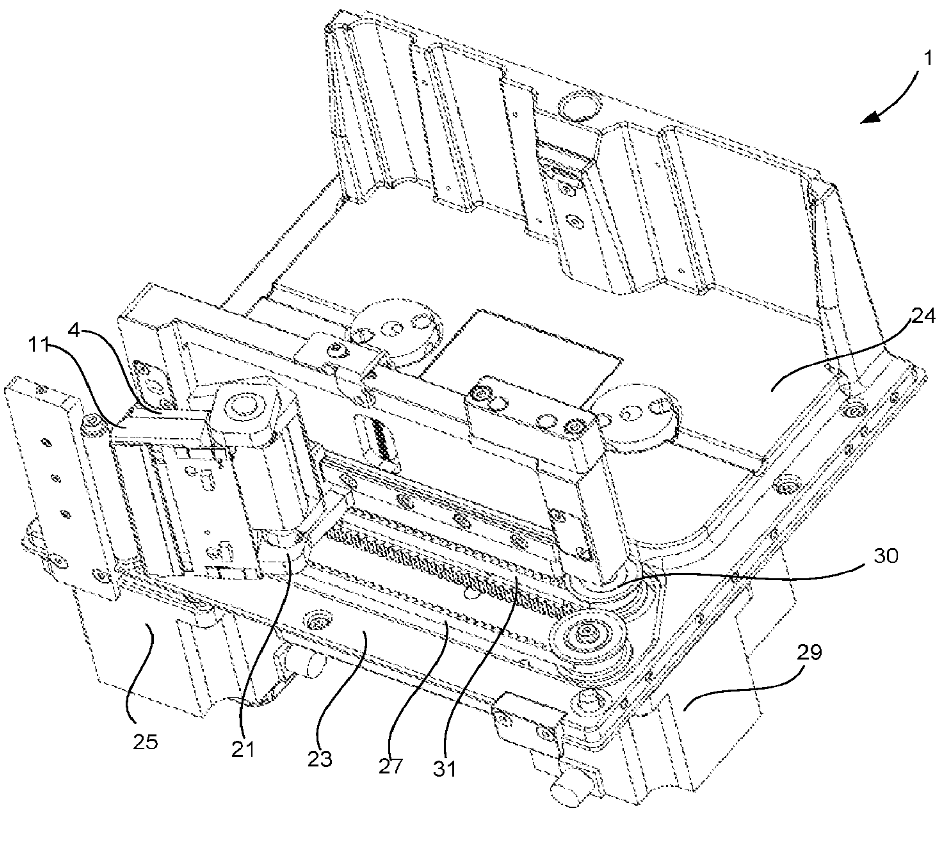
FIG. 3 is a perspective illustration showing the printer of FIG. 1 in further detail.

Referring now to FIGS. 2 and 3, the printer 1 is described in more detail. The printhead assembly 4 further comprises a guide roller 20, around which the ribbon 2 passes between the roller 9, and the printhead 11. The printhead assembly 4 is pivotally mounted to a printhead carriage 21 for rotation about a pivot 22 thereby allowing the printhead 11 to be moved towards or away from the printing surface 13. The printhead carriage 21 is displaceable along a linear track 23, which is fixed in position relative to a base plate 24 of the printer 1.

The position of the printhead carriage 21 in the direction of ribbon movement (and hence position of the printhead assembly 4) is controlled by a carriage motor 25 (see FIG. 3). The carriage motor 25 is located behind the base plate 24 and drives a pulley wheel 26 that is mounted on an output shaft 25*a* of the carriage motor 25. The pulley wheel 26 in turn drives a printhead drive belt 27 extending around a further pulley wheel 28. The printhead carriage 21 is secured to the printhead drive belt 27. Thus rotation of the pulley wheel 26 in the clockwise direction drives printhead carriage 21 and hence the printhead assembly 4 to the left in FIG. 2 whereas rotation of the pulley wheel 26 in the counter-clockwise direction in FIG. 2 drives the printhead assembly 4 to the right in FIG. 2.

The movement of the printhead 11 towards and away from the printing surface 13 (and hence the pressure of the printhead against the ribbon 2, the substrate 12, and the printing surface 13) is controlled by a motor 29. The motor 29 is also located behind the base plate 24 (see FIG. 3) and drives a pulley wheel 30 that is mounted on an output shaft 29*a* of the motor 29. Movement of the printhead assembly 4 is controlled by appropriate control of the motors 25, 29 by the controller 10.

Figure 4:
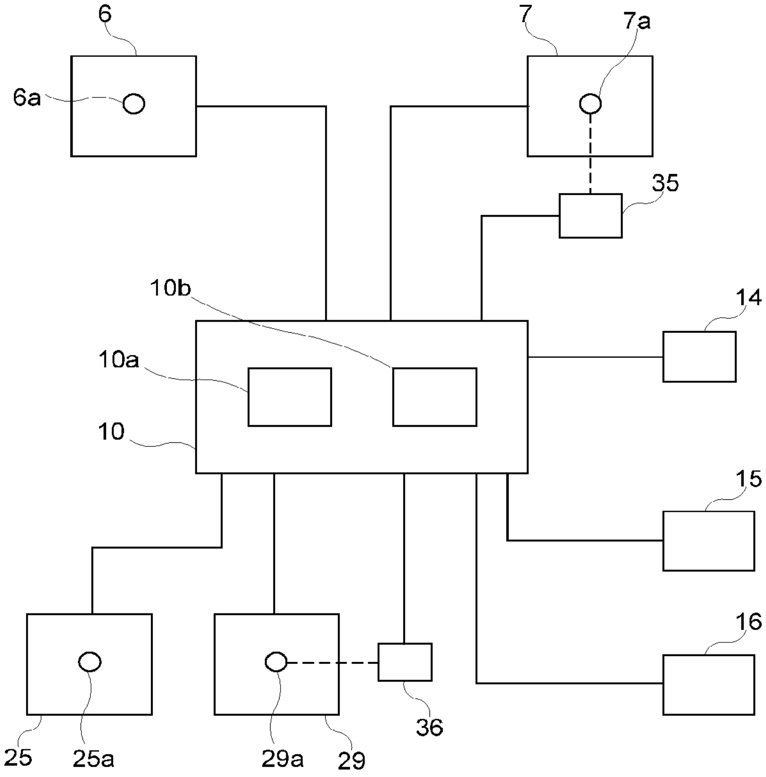
FIG. 4 is a schematic illustration of a controller arranged to control components of the printer of FIG. 1.

FIG. 4 is a schematic illustration of components involved in the control of the printer 1, including ribbon movement, printhead movements, and also image capture by the camera 15. The controller 10 comprises a processor 10*a* and a memory 10*b*. The processor 10*a* reads instructions from the memory 10*b*. The processor 10*a* also stores data in and retrieves data from the memory 10*b*. The motors 6, 7, 25, 29 are controlled by control signals generated by the controller 10. The controller 10 receives signals from the encoder 35, which signals are indicative of rotational movement of the motor 7. The controller also receives signals from the encoder 14, which signals are indicative of linear movement of the substrate 12 past the printer 1. The controller 10 also receives capture data from the camera 15 and controls the light source 16.

The motor 29 may be a stepper motor, and may be controlled in a closed loop manner by virtue of an encoder 36 which is associated with the motor shaft 29*a*. The encoder 36 may provide an output indicative of the angular position of the output shaft 29*a* of the motor 29. Such an output may be used to enable precise control of the motor 29, for example by controlling the stator field of the motor to have a predetermined angular relationship with respect to the motor shaft 29*a*.

The pulley wheel 30 in turn drives a printhead rotation belt 31 extending around a further pulley wheel 32. The printhead assembly 4 comprises a first arm 33, and a second arm 34, which are arranged to pivot about the pivot 22. The first arm 33 is connected to the printhead rotation belt 31, such that when the printhead rotation belt 31 moves the first arm 33 is also caused to move. The printhead assembly 4 is attached to the second arm 34. Assuming that the pivot 22 remains stationary (i.e. that the printhead carriage 21 does not move), it will be appreciated that movement of the printhead rotation belt 31, causes movement of the first arm 33, and a corresponding movement of the second arm 34 about the pivot 22, and hence the printhead assembly 4 (and printhead 11). Thus, rotation of the pulley wheel 30 in the clockwise direction drives the first arm 33 in to the left in FIG. 2, causing the second arm 34 to move in a generally downward direction, and the printhead assembly 4 to move towards the printing surface 13. On the other hand, rotation of the pulley wheel 30 in the counter-clockwise direction in FIG. 2 causes the printhead assembly 4 to move away from the printing surface 13.

The belts 27, 31 may be considered to be a form of flexible linkage. However, the term flexible linkage is not intended to imply that the belts behave elastically. That is, the belts 27, 31 are relatively inelastic in a direction generally parallel to the direction of travel of the ribbon 2 and the substrate 12 past the printhead assembly 4 (i.e. the direction which extends between the pulley wheel 30 and the further pulley wheel 32). It will be appreciated, of course, that the belts 27, 31 will flex in a direction perpendicular to the direction of travel of the ribbon 2 and the substrate 12 past the printhead assembly 4, so as to allow the belts 27, 31 to move around the pulleys 26, 28, 30, 32. Further, the printhead rotation belt 31 will flex in a direction perpendicular to the direction of travel of the ribbon 2 and the substrate 12 past the printhead assembly 4, so as to allow for the arc of movement of the first 33 arm about the pivot 22.

However, in general, it will be understood that the relative inelasticity ensures that any rotation of the pulley wheel 30 caused by the motor 29 is substantially transmitted to, and causes movement of, the first arm 33, and hence the printhead 11. The belts 27, 31 may, for example, be polyurethane timing belts with steel reinforcement. For example, the belts 27, 31 may be AT3 GEN III Synchroflex Timing Belts manufactured by BRECOflex CO., L.L.C., New Jersey, United States.

The arc of movement of the printhead 11 with respect to the pivot 22 is determined by the location of the printhead 11 relative to the pivot 22. The extent of movement of the printhead 11 is determined by the relative lengths of the first and second arms 33, 34, and the distance moved by the printhead rotation belt 31. Thus, by controlling the motor 29 to cause the motor shaft 29*a* (and hence pulley wheel 30) to move through a predetermined angular distance, the printhead 11 can be moved by a corresponding predetermined distance towards or away from the printing surface 13.

It will further be appreciated that a force applied to the first arm 33 by the printhead rotation belt 31 will be transmitted to the second arm 34 and the printhead 11. Thus, if movement of the printhead 11 is opposed by it coming into contact with a surface (such as, for example, the printing surface 13), then the force exerted by the printhead 11 on the printing surface 13 will be determined by the force exerted on the first arm 33 by the printhead rotation belt 31—albeit with adjustment for the geometry of the first and second arms 33, 34. Further, the force exerted on the first arm 33 by the printhead rotation belt 31 is in turn determined by the torque applied to the printhead rotation belt 31 by the motor 29 (via pulley wheel 30).

Thus, by controlling the motor 29 to output a predetermined torque, a corresponding predetermined force (and corresponding pressure) can be established between the printhead 11 and the printing surface 13. That is, the motor 29 can be controlled to move the printhead 11 towards and away from the printing surface 13, and thus to determine the pressure which the printhead applies to the printing surface 13. The control of the applied pressure is important as it is a factor which affects the quality of printing. Of course, in some embodiments, the motor 29 may also be controlled in a conventional way (e.g. an open-loop position-controlled way).

It is also noted that the position of the printhead 11 with respect to the printing surface 13 is also affected by the motor 25. That is, given the relationship between the motor 25 and the printhead assembly 4 (i.e. the coupling of the motor 25, via the belt 27, to the printhead carriage 21), movement of the motor 25 also has an impact on the position of the printhead relative to the printing surface 13.

The motor 25 may also be a stepper motor, and may be controlled in a conventional (i.e. open-loop) manner. Of course, the motors 25, 29 may be other forms of motor (e.g. DC servo motors) which can be controlled in a suitable manner to control the position of the printhead 11 and printhead assembly 4.

In a printing operation, ink carried on the ribbon 2 is transferred to the substrate 12 which is to be printed on. To effect the transfer of ink, the print head 11 is brought into contact with the ribbon 2. The ribbon 2 is also brought into contact with the substrate 12. The printhead 11 is caused to move towards the ribbon 2 by movement of the print head assembly 4, under control of the controller 10. The print head 11 comprises printing elements arranged in a one-dimensional linear array, which, when heated, whilst in contact with the ribbon 2, cause ink to be transferred from the ribbon 2 and onto the substrate 12. Ink will be transferred from regions of the ribbon 2 which correspond to (i.e. are aligned with) printing elements which are heated. The array of printing elements can be used to effect printing of an image on to the substrate 12 by selectively heating printing elements which correspond to regions of the image which require ink to be transferred, and not heating printing elements which require no ink to be transferred.

There are generally two modes in which the printer of FIGS. 1 to 3 can be used, which are sometimes referred to as a "continuous" mode and an "intermittent" mode. In both modes of operation, the apparatus performs a regularly repeated series of printing cycles, each cycle including a printing phase during which ink is transferred to the substrate 12, and a further non-printing phase during which the printer is prepared for the printing phase of the next cycle.

In continuous printing, during the printing phase the print head 11 is brought into contact with the ribbon 2, the other side of which is in contact with the substrate 12 onto which an image is to be printed. The print head 11 is held stationary during this process—the term “stationary” is used in the context of continuous printing to indicate that although the print head will be moved into and out of contact with the ribbon, it will not move relative to the ribbon path in the direction in which ribbon is advanced along that path. Both the substrate 12 and ribbon 2 are transported past the print head, generally but not necessarily at the same speed.

Generally only relatively small lengths of the substrate 12 which is transported past the printhead 11 are to be printed upon and therefore to avoid gross wastage of ribbon it is necessary to reverse the direction of travel of the ribbon between printing cycles. Thus in a typical printing process in which the substrate is traveling at a constant velocity, the print head is extended into contact with the ribbon only when the print head 11 is adjacent regions of the substrate 12 to be printed. Immediately before extension of the print head 11, the ribbon 2 must be accelerated up to for example the speed of travel of the substrate 12. The ribbon speed is then generally maintained at a speed which is based upon the speed of the substrate (e.g. equal to, or proportional to the speed of the substrate 12) during the printing phase and, after the printing phase has been completed, the ribbon 2 must be decelerated and then driven in the reverse direction so that the used region of the ribbon is on the upstream side of the print head 11.

As the next region of the substrate to be printed approaches, the ribbon 2 is then accelerated back up to the normal printing speed and the ribbon 2 is positioned so that an unused portion of the ribbon 2 close to the previously used region of the ribbon is located between the print head 11 and the substrate 12 when the print head 11 is advanced to the printing location $L_P$. It is therefore desirable that the supply spool motor 6 and the take-up spool motor 7 can be controlled to accurately locate the ribbon so as to avoid a printing operation being conducted when a previously used portion of the ribbon is interposed between the print head 11 and the substrate 12.

In intermittent printing, a substrate is advanced past the printhead 11 in a stepwise manner such that during the printing phase of each cycle the substrate 12 and generally but not necessarily the ribbon 2 are stationary. Relative movement between the substrate 12, the ribbon 2 and the printhead 11 are achieved by displacing the printhead 11 relative to the substrate and ribbon. Between the printing phases of successive cycles, the substrate 12 is advanced so as to present the next region to be printed beneath the print head and the ribbon 2 is advanced so that an unused section of ribbon is located between the printhead 11 and the substrate 12.

Once again accurate transport of the ribbon 2 is necessary to ensure that unused ribbon is always located between the substrate 12 and printhead 11 at a time that the printhead 11 is advanced to conduct a printing operation. It will be appreciated that where the intermittent mode is used, the printhead assembly 4 is caused to move along the linear track 23 so as to allow its displacement along the ribbon path.

In each of the aforementioned modes, during the transfer of tape from the supply spool 3 to the take up spool 5, both the supply spool motor 6 and the take-up spool motor 7 are energised in the same rotational direction. That is, the supply spool motor 6 is energised to turn the supply spool 3 to pay out an amount of tape while the take-up spool motor 7 is energised to turn the take-up spool 5 to take-up an amount of tape. The motors 6, 7 can therefore be said to operate in “push-pull” mode, with both motors being operated in a position (or speed) controlled manner. Where tension in the tape is to be maintained, it is important that the linear quantity of tape paid out by the supply spool is essentially equal to the linear quantity of tape taken up by the take-up spool. Additionally, as noted above it is desirable to transport a predetermined linear distance of tape between spools. This requires knowledge of the diameters of the spools given that the drive is applied to the spools and the linear length of tape transferred by a given rotational movement of the spools will vary in dependence upon the spool diameters. This knowledge can be obtained and updated in a variety of ways, several of which is are described in our earlier U.S. Pat. No. 7,150,572.

As described above, during continuous printing operations, the ribbon 2 is controlled based upon the speed of the substrate 12 moving past the printhead 11. For example, data indicative of the speed of movement of the substrate 12 may be obtained from the encoder 14. Such data may be referred to as a substrate speed. During continuous printing, the supply and take up spool 3, 5 are caused to rotate by the motors 6, 7 so as to cause the ribbon 2 at the printing location $L_P$ to move at a linear speed which is substantially equal, or at least based upon, the substrate speed. For example, as described in our earlier patent application WO2016/067052 the ribbon speed may be controlled so as to be a percentage (e.g. 96%) of the substrate speed.

The speed of the ribbon 2 at the printhead 11 during printing in continuous mode may be referred to as a ribbon speed.

During ribbon movements, each of the motors 6, 7 are controlled by the controller so as to move at an angular speed which causes ribbon to be advance at a predetermined linear speed past the printhead 11. Where the motors 6, 7 are stepper motors, the control of the motors to move at a predetermined angular speed results in the each of the motors being controlled to advance at a predetermined step rate.

It will be understood that, as is well known in the field of motor control, the stepper motors 6,7 may be controlled to advance in increments which correspond to full steps at the native resolution of the motor (e.g. 1.8 degrees per step, or 200 steps per full revolution), or sub-steps (e.g. half-, quarter-, or micro-steps). By controlling the motors to advance in micro-step increments, it is possible to control the angular position of the output shaft of the motor far more accurately than in full-step operation, thereby allowing more refined control of the ribbon movement. However, even where micro-stepping is used, the motors 6, 7 are each controlled by reference to a set of discrete output angular positions. In the following description, where reference is made to motors being advanced by ‘steps’, or ‘steps’ being applied to a motor, it will be understood that the motor may be advanced by an amount that corresponds to a full-step, a half-step, a quarter-step or a micro-step (e.g. an eighth-step), depending on the configuration.

In order to achieve relatively smooth rotation of the motors, and the rapid accelerations and decelerations that are required in a printer tape drive, the motors are controlled by specifying times at which steps should be applied. The times at which these steps are applied may be determined based upon acceleration tables which are stored in a memory associated with the controller 10. The acceleration tables may contain data indicative of a set of motor speeds, and/or rates (which correspond to angular speeds) at which steps should be applied to the motors. In an embodiment the acceleration tables contain data indicative of a delay between motor steps for each of a set of motor speeds.

Moreover, the acceleration tables define transitions between step rates (which correspond to speeds) which can be achieved while operating within the operational limits of the motors. That is, a stepper motor may stall if accelerations or decelerations are attempted to be applied which require torques to be applied which are greater than the motor capabilities (whilst taking into account the inertia of spools of ribbon driven by the motors). As such, the acceleration tables contain data which is indicative of the maximum safe acceleration rates which can be applied to a motor.

The acceleration tables may be based upon data indicative of the maximum angular acceleration rate for each motor, and may, for example, be re-calculated for each printing cycle so as to take into account current spool diameters values. That is, at the time of use (i.e. during a printing cycle) each acceleration table may already have been re-calculated based upon current spool diameter values so as to contain step rate data for a particular motor in a particular winding condition operating at various linear ribbon speeds. Thus, no adjustment for spool diameter is needed at the time at which the acceleration tables are accessed. Of course, it will be appreciated that the adjustment for spool diameter could be made at run-time if preferred. Alternatively, the acceleration tables could be updated at a different rate, for example, after each time a predetermined length (e.g. 750 mm) of ribbon has been transferred between the spools.

Further, the acceleration tables for each motor in a printer (taking into account the current diameter of spools of tape mounted on those motors) may be generated so as to generally correspond to one another. For example, rather than an acceleration table for a motor driving a first spool having small diameter (and therefore small linear distance per step) being generated which allows a significantly different acceleration profile than a corresponding acceleration table for a motor driving a second spool of the same printer which has a large diameter (and therefore larger linear distance per step), the acceleration tables for the two motors may be generated such that the maximum linear acceleration rates are generally consistent for the two motors.

For example, a global maximum linear acceleration value (e.g. 25 m/s$^2$) may be used to generate the acceleration tables for both motors at all spool diameters. Such a maximum linear acceleration value may be selected based upon a rate at which a motor driving a spool having a maximum allowable spool diameter can be safely accelerated and decelerated without causing the motor to stall.

It will, however, be appreciated that even if acceleration tables generated for both of the motors 6, 7 provide a common maximum linear acceleration, for any particular actual motor speed, and a desired new ribbon speed, the two motors may have to respond to the speed demand differently. That is, given the different step sizes (in terms of linear distance of tape moved per step), the acceleration table for each motor will contain different speed entries, with different allowable speed steps based upon the current spool diameters.

In use, where the desired ribbon speed changes, the updated desired ribbon speed is then converted into motor step rates by looking up the most suitable (and achievable) step rate in the relevant acceleration table. In particular, a modified step rate is determined with reference to the acceleration tables, the modified step rate being a step rate which is as close to the desired step rate as can be achieved without exceeding an allowable acceleration. Steps are then applied to each of the motors at the modified (i.e. achievable) step rates. Where the closest achievable step rate to a desired step rate (e.g. as determined based upon the desired ribbon speed) is below the desired step rate, the step rate will be updated again at the next refresh cycle (i.e. after a next step has been applied), so as to allow the motor to be accelerated towards the desired speed over two (or more) steps.

For example, in a configuration in which a supply spool diameter is 50 mm, and a take up spool diameter is 100 mm, a maximum permitted acceleration rate is 25 m/s$^2$ and in which the motors 6, 7 are each controlled in a $\frac{1}{8}^{th}$ step manner, the acceleration table for each motor may include entries as shown in Table 1.

TABLE 1

Extract of exemplary acceleration tables

| Index | Speed |
|---|---|
| Supply Spool (Spool diameter: 50 mm) | |
| 1 | 70.06 |
| 2 | 99.08 |
| 3 | 121.35 |
| 4 | 140.12 |
| 5 | 156.66 |
| 6 | 171.62 |
| 7 | 185.37 |
| 8 | 198.17 |
| 9 | 210.19 |
| 10 | 221.56 |
| 11 | 232.37 |
| 12 | 242.70 |
| . . . | . . . |
| Take-up Spool (Spool diameter: 100 mm) | |
| 1 | 99.08 |
| 2 | 140.12 |
| 3 | 171.62 |
| 4 | 198.17 |
| 5 | 221.56 |
| 6 | 242.70 |
| 7 | 262.15 |
| 8 | 280.25 |
| 9 | 297.25 |
| 10 | 313.33 |
| 11 | 328.62 |
| 12 | 343.23 |
| . . . | . . . |

Each entry in each of the tables is representative of a linear ribbon speed. The speeds are calculated as the linear speed that is reached at the circumference of the spool by moving the motor a single step, with the spool being accelerated at the maximum permissible acceleration during that step, starting either a stationary position (entry 1), or the previous speed entry (entries 2 and onwards). For each current spool speed, and a desired spool speed, the tables can be consulted to determine an allowable next speed. It is not permitted to make more than a single speed jump in the table in a single step, so if a desired speed change exceeds the permitted change, the desired speed change is applied over two (or more) steps.

Assuming that both spools are in motion with a current ribbon speed of 200 mm/s, the supply spool motor, driving a supply spool with a diameter of 50 mm, can be driven at a maximum speed of 210.19 mm/s for the next step (entry 9). This is on the basis that the closest table entry below the current speed is 198.17 mm/s (entry 8).

It is noted that where a deceleration is required, the closest table entry above the current speed will be used as the starting point, so as to ensure that the maximum acceleration rate is not exceeded.

The take up spool motor, driving a take-up spool with a diameter of 100 mm, and currently rotating at 200 mm/s also a closest table entry below the current speed of 198.17 mm/s (entry 4) can be driven at a maximum next speed of 221.56 mm/s (entry 5).

Thus, in this example, if a new desired ribbon speed is 220 mm/s, the supply spool will not be able to achieve that speed in the next step, whereas the take up spool motor can achieve (and exceed) that speed.

The next step applied to the motors will cause each motor to accelerate, but will cause the supply spool motor to accelerate to 210.19 mm/s (entry 9), whereas the take up spool motor will be caused to accelerate to the desired speed of 220 mm/s. However, the subsequent step for the supply spool will allow the speed to increase from 210.19 mm/s (entry 9) to up to 221.56 mm/s (entry 10). As such, a speed of 220 mm/s will be selected and, after two steps, the supply spool motor will also be at the desired speed.

It is noted that the two steps required to be applied to the supply spool motor to reach the desired speed will be completed at around the same time as the single step required by the take-up spool motor has been completed. This is because the supply spool diameter is 50 mm, as compared to a take-up spool diameter of 100 mm, which results in a 2:1 step ratio for the same linear distance moved.

Of course, it will be appreciated that the times at which steps are applied, and the step duration, will vary between the motors in dependence upon the spool diameters. Thus, during ongoing motor operations, the current speed, the next desired speed and permitted maximum and minimum speeds are continually changing for each motor, at different rates.

In general terms, for each step performed, the controller may identify the step rate above and below the current rate in the relevant table. These rates are used as upper and lower limits for the next step. If a subsequent speed target is above the upper limit, the upper limit is used, and if a subsequent speed target is below the lower limit, the lower limit is used. If the subsequent speed target within the allowable range, the target speed is used. If the current speed corresponds to an entry in the relevant acceleration table, the allowable speed range may be a full step above or below the current speed.

In this way, during ribbon transport operations, i.e. when attempting to drive the motors 6, 7 in accordance with a desired motion profile, it will be understood that the controller 10 will make frequent reference to the acceleration tables, and will continually update the rate at which steps are applied to the motors 6, 7 to attempt to ensure that the ribbon is moved as closely as possible to a desired speed as can be achieved within the limitations of the printer.

In some embodiments the ribbon may be required to be advanced at a ribbon speed which is based upon a substrate speed (e.g. at a speed which is proportional to the substrate speed). In such an arrangement, the substrate speed may be referred to as a master speed. Changes in substrate speed (for example, which may be monitored by the encoder 14) may result in an updated desired ribbon speed being determined. The updated desired ribbon speed is then converted into motor step rates by looking up the most suitable (and achievable) step rate in the relevant acceleration table as described above.

Figure 5:
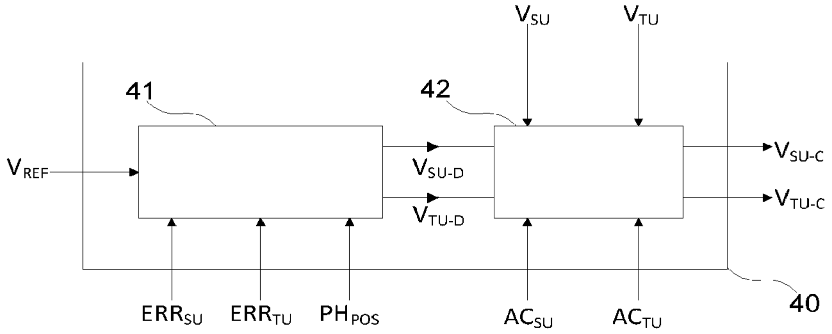
FIG. 5 is a schematic illustration of processing performed by a controller of the printer of FIG. 1.

The use of acceleration tables in this way is now described with reference to FIG. 5. The processing described may, for example, be performed by the controller 10. A ribbon feed controller 40 receives, as an input data indicative of a reference speed $V_{REF}$. The reference speed $V_{REF}$ may be based on the speed of the substrate 12, as received from the encoder 14.

The input $V_{REF}$ is passed to a ribbon feed correction block 41, where the reference speed is adjusted to generate a desired supply spool speed $V_{SU}$-D and a desired take-up spool speed $V_{TU}$. For example, as described briefly above, the spool speeds may be calculated to be a percentage (e.g. 96%) of the substrate speed. Of course, the desired ribbon speed may be a different percentage (e.g. 100%) of the substrate speed.

Alternatively, the desired ribbon speed may be generated based upon a different reference speed, such as, for example, an internally generated reference speed (i.e. not the encoder data). In some embodiments, an internally generated reference speed is used during some ribbon movements, while an external reference (e.g. the substrate speed) is used during other ribbon movement. For example, in an embodiment an internally generated reference is used during deceleration, and ribbon rewind operations, with the substrate speed being used during the acceleration and printing phases of continuous printing operations. In some embodiments, the internally generated reference speed may also be used during ribbon acceleration. The reference speed $V_{REF}$ upon which the ribbon speed is based may be referred to as the "master" speed.

Further, in some embodiments the ribbon movement may be controlled based upon substrate movement in different ways. For example, it is been realised that, in some instances, an image printed by the printer on the substrate having a first length may result in a negative image having a different length being formed on the ribbon. For example, a printed image of 70 mm in length may result in a negative image of 69 mm being formed. Thus the ribbon may be controlled during and between printing operations such that the portion of unused ribbon between adjacent negative images is minimised.

For example, when attempting to place adjacent 70 mm long images at an offset of 70.5 mm (thereby allowing a 0.5 mm gap), an actual gap of 1.5 mm may be observed between adjacent negative images. Thus, the ribbon movement may be adjusted such that images are attempted to be placed at an offset of 69.5 mm, thereby allowing an actual gap of 0.5 mm, and reducing the wastage of ribbon by 1 mm for every 70 mm of printed image.

It will also be understood that during such ribbon movements the ribbon advance speed may be controlled to be less than the nominal substrate speed so as to ensure that the ribbon is moved at an appropriate speed during printing. Further, in some embodiments, ribbon movements may be controlled such that significantly less ribbon is used than the length of each printed image, and the ribbon speed may be adjusted accordingly. For example, in 'slip' printing, the ribbon may be advanced a distance which corresponds to, for example, half of the length of an image printed on a substrate during each printing cycle. In such an arrangement, the ribbon may be advanced, during printing, at approximately half the substrate speed.

Of course, different scaling factors may be used as appropriate. Any such adjustment of scaling factor may be made empirically, for example by monitoring the actual dimensions of negative ribbon images. Without wishing to be bound by theory, it is believed that the mismatch between negative image length and printing image length may be a result of the 'ironing' of ribbon between the printhead and the printing surface during printing.

It will be understood that image scaling performed in order to allow comparison between the expected printed image and captured images (as described in more detail below) may also apply a scaling factor to compensate for this effect.

The desired spool speeds $V_{TU-D}$ $V_{SU-D}$ are passed to a spool speed block 42, which also receives as inputs the current take-up spool speed $V_{TU}$ and the current supply spool speed $V_{SU}$. The spool speed block 42 obtains, from a memory location, appropriate acceleration tables $AC_{TU}$, $AC_{SU}$ for the take-up and supply spools (which have previously been generated based upon knowledge of the current spool diameters).

Based upon the acceleration tables $AC_{TU}$, $AC_{SU}$, the current speeds $V_{TU}$, $V_{SU}$, and the desired spool speeds $V_{TU-D}$ $V_{SU-D}$, the spool speed block 42 generates a commanded supply spool speed $V_{SU-c}$ and a commanded take-up spool speed $V_{TU-C}$ as described above in more detail.

It will, of course, be appreciated that during ongoing operations the desired speed may change rapidly, and in a way which is beyond the capabilities of the motors 6, 7. In such circumstances the ribbon speed (as controlled by the spool speeds) may be adjusted in response to changes in substrate speed. However, there may be a lag between an updated substrate speed being detected, and an updated ribbon speed being achieved. Thus, while the actual ribbon speed is not equal to the desired spool speeds speed, the distance moved by the ribbon will not match the desired distance (which may, for example, be derived from the distance moved by the substrate).

Moreover, even where any requested changes are well within the capabilities of the motors 6, 7, where the ribbon speed is adjusted in response to changes in substrate speed, there may be a lag between an updated substrate speed being detected, and an updated ribbon speed being achieved.

Further, as described above, one motor may be able respond more quickly to a desired speed change than the other motor, resulting in discrepancies in the amount of ribbon fed by the two motors.

Any discrepancy between the actual speed of a motor and the desired speed will result in the amount of ribbon fed by that motor deviating from the expected (or desired) amount. Thus, during each tape transport operation, the controller monitors the actual cumulative distance fed by each of the motors (for example by recording the number of steps applied to each motor). This monitored cumulative distance may be used to improve the control of the motors. For example, where motion is controlled with reference to substrate movement (e.g. by use of the encoder 14), the cumulative distance moved by the substrate 12 may be monitored and regarded as the "master" distance. Cumulative distances moved by each of the spools may also be monitored and compared to the "master" distance. If either of the monitored spool distances deviates by more than a predetermined amount from the master distance, an appropriate correction can be made.

Further, as the desired speed changes during operation, the different step rates of the two motors (i.e. due to there being different spool sizes) result in the same speed change having a different effect on different motors. For example, a first motor having a high step rate (i.e. a small spool diameter) may "see" a temporary speed fluctuation which is not "seen" by a second motor having a lower step rate (i.e. a large spool diameter, and thus a lower speed refresh rate.

More generally, the different step rates (due to different spool diameters) result in there being different effective sampling rates of the desired speed for each of the motors, and therefore different speed errors, resulting in different accumulated distance errors. Where a desired speed fluctuates rapidly (e.g. due to a noisy substrate encoder signal), this can have a significant cumulative effect where one motor can track the noise, whereas another cannot.

For example during a substrate movement of 100 mm, the take-up spool 5 may be recorded as taking up 100.1 mm of ribbon, and the supply spool 3 may be recorded as paying out 99.7 mm of ribbon. In this case, the total ribbon paid out is less than that taken up by 0.4 mm, which will result in there being an increase in ribbon tension.

Figures 6, 6A, 6B, 6C:
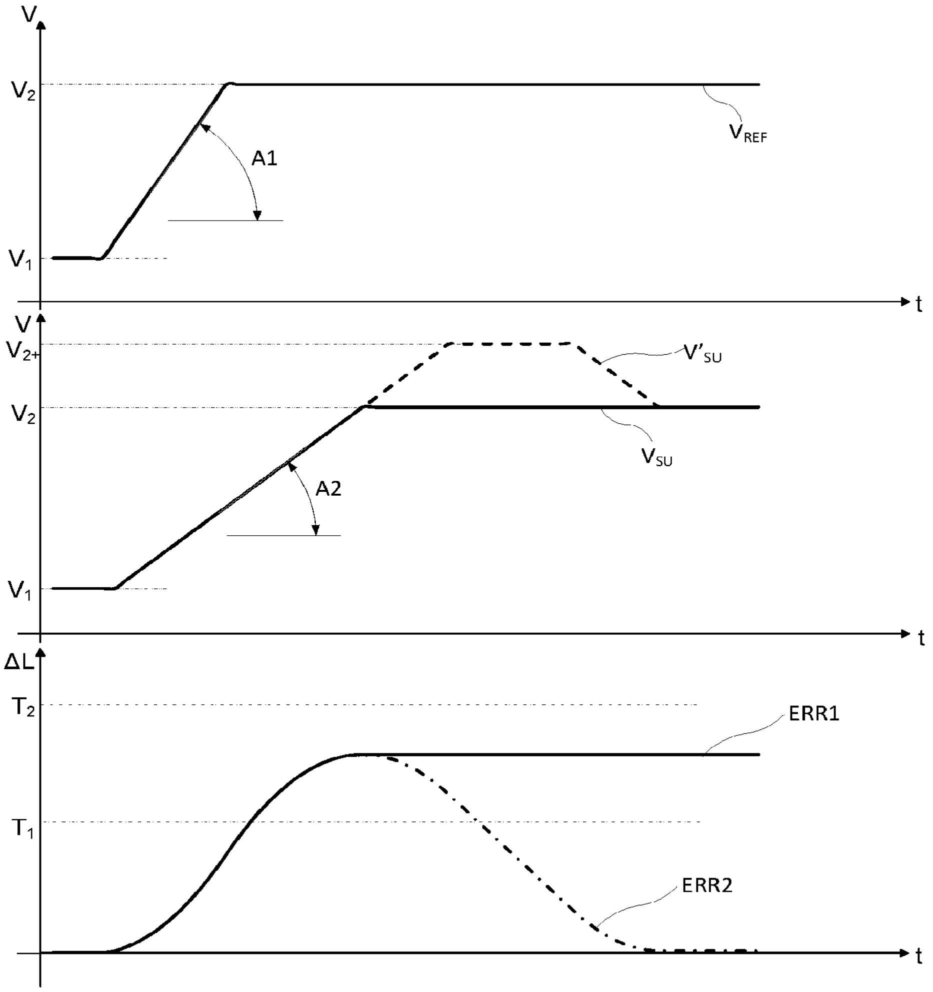
FIG. 6 is a schematic illustration of velocity and position data relating to a substrate and spool of ribbon of the printer of FIG. 1.

FIG. 6*a* illustrates an exemplary motion profile in which the speed of the substrate $V_{REF}$ is shown accelerating from a first speed V1 to a second speed V2 at a rate of acceleration A1. The vertical axis represents speed, while the horizontal axis represents time. The linear speed $V_{SU}$ of the supply spool motor 3 is shown in FIG. 6*b*, in which the vertical axis represents speed, while the horizontal axis represents time. Shortly after the substrate speed begins to increase, the supply spool speed $V_{SU}$ also begins to increase. However, the supply spool motor 3 cannot accelerate at the rate A1, and thus the rate of increase A2 in the supply spool speed $V_{SU}$ is less than that of the substrate speed $V_{REF}$.

FIG. 6*c*, in which the vertical axis represents cumulative position error, and the horizontal axis represents time, shows the cumulative position error ERR1 of the supply spool motor 6 during the acceleration of the supply spool 3 and substrate 12.

In order to mitigate any negative effects associated with these errors in feed distances, corrections can be applied to the motor control signals during ongoing ribbon movements (but during the same print cycle) in order to correct the feed errors.

For example, the controller 10 may be arranged to monitor the cumulative distances fed and compare to the master distance, and, if the differences exceeds a predetermined threshold, apply a correction. The correction may, for example, take the form of an increase or decrease in the target speed of the spool concerned. Thus, rather than correcting the distance instantaneously (which could potentially cause an abrupt change in ribbon tension and/or ribbon positioning), a speed scaling factor is applied to the relevant motor. Moreover, abrupt speed changes may not be within the physical capabilities of the motors.

For example, a first distance error threshold T1 of ±0.1 mm may be provided. If the cumulative error exceeds this threshold T1, a first speed scaling factor S1 of 0.5% (positive or negative as required) may be applied. A similar process may be performed independently for each of the spools 3, 5.

Further, if required, additional thresholds and corrections may be applied. For example a second threshold T2 of ±0.33 mm may be provided, and if this threshold is exceeded, a second speed scaling factor S2 of 1.8% applied, and so on. As greater errors are identified, corrections of greater magnitude may be required.

The threshold (or thresholds) may be selected so as to maintain tension within predetermined limits. That is, a particular threshold may correspond to a tension deviation from a nominal ribbon tension that is known to provide reliable printing performance and tape drive operation. Moreover, the threshold (or thresholds) may be selected so as to allow the inevitable and transient errors in motor positioning to occur without correction. In particular, the different motor step rates (due to different spool diameters)

result in there being an inevitable difference in apparent instantaneous relative motor shaft position throughout a ribbon movement operation.

For example, while one motor may apply three steps, the other may apply one step for the same linear distance moved. In this situation, during the stepping process, the apparent position error between the motors will fluctuate. However, this position error will cancel itself out over several steps, assuming that the motors are moving substantially the same distance. If the threshold was set at a level which was triggered during every stepping cycle, corrections may be applied too quickly, and oscillations may occur.

Of course, while the apparent motor shaft position may change immediately after each step command is issued, in practice, the shaft position will change more gradually, and may effectively be in continuous motion, rather than moving abruptly between stationary positions.

The effect of such corrections is illustrated in FIGS. 6*b* and 6*c*. As shown in FIG. 6*c*, a first error threshold T1 is exceeded by the cumulative error ERR1 during the acceleration. In response, the speed of the supply spool is increased to reduce the cumulative error.

In addition to the profile showing the speed of the supply spool $V_{SU}$ in FIG. 6*b*, a modified speed profile $V_{SU}'$ is also shown as a dashed line. In the modified speed profile $V_{SU}'$, rather than the acceleration (at the maximum rate A2) stopping when the speed V2 is reached, the spool is accelerated (at the maximum rate A2) for longer, to a speed V2+ which is 2% greater than the speed V2. The modified cumulative error ERR2 is shown in FIG. 6*c*. Rather than remaining fixed after the acceleration has been completed (as does ERR1), the modified cumulative error ERR2 is reduced due to the effect of increasing the spool speed to V2+, until the error falls below the threshold T1. The increased spool speed V2+ is thus maintained until the error has been reduced, at which time the spool speed $V_{SU}$ is reduced to the speed of the substrate V2.

In some embodiments the scaling factors may be removed as soon as the error value falls below the relevant threshold level. In alternative embodiments, one or more additional switch-off threshold levels may be provided. For example, where a first threshold T1 is set at ±0.1 mm, a first turn-off threshold TO1 may be set at ±0.08 mm. Similarly, where a second threshold T2 is set at ±0.33 mm, a second turn-off threshold TO2 (which triggers the switch from second speed scaling factor S2 to the first speed scaling factor S1) may be set at ±0.12 mm.

The take-up spool can be controlled in a similar way. Further, the desired spool speeds can be calculated independently of the substrate speed (e.g. where the substrate speed is not provided as an input, or during intermittent printing operations). Furthermore, in some embodiments, the spool speeds can, during part of a printing cycle, be generated based upon the substrate speed (e.g. during printing), and at other times (e.g. during ribbon acceleration, deceleration, and positioning; rewind) be generated based upon a predetermined motion profile. In some embodiments, one of the motors is controlled based upon the current speed of the other motor (which is used as the reference speed $V_{REF}$). That is, either of the supply or take-up spool motor can operate as the "master" motor, with the other motor acting as a "slave".

The control described above with reference to FIG. 6 may be performed by the ribbon feed controller 40. In particular, in order to reduce any negative consequences associated with the error in ribbon positioning and tension control, data indicative of the cumulative position errors for the supply spool $ERR_{SU}$ and the take-up spool $ERR_{TU}$, may be provided to the feed correction block 41. In this way, the accumulation of position (and associated tension) errors as a result of small speed errors, and in particular small speed errors which may each only apply for only a very short time, can be reduced.

It will be appreciated, however, that even where the linear quantity of ribbon paid out and taken up by the spools 3, 5 is accurately controlled to be equal (for example, by controlling the spool speeds as described above), any change in the ribbon path length can cause variations in ribbon tension. For example, during printing operations, the printhead 11 is caused to deflect the ribbon 2 into and out of contact with the substrate 12. The distance moved by the printhead between a retracted position (which may be referred to as a ready to print location $L_{RTP}$) and an extended position (when the printhead 11 is pressed against the printing surface, also referred to as a printing location $L_P$) may be around 2 mm, and may vary between different printer configurations and installations. As such, the ribbon path length may be caused to vary during printing operations by an amount which has a material effect of the tension in the ribbon. Moreover, the deflection of the ribbon 2 by the printhead 11 may result in the portion of ribbon 2 which is printed on at the printing location $L_P$ being different to the portion of ribbon 2 intended or expected to be printed on.

As such, and in order to further reduce any negative consequences associated with the error in ribbon positioning and tension control, data indicative of the increase (or decrease) of ribbon path length may be provided to the feed correction block 41. Such data may be referred to a printhead position data $PH_{POS}$.

Such data may be used to apply a further correction to the desired supply and take up spool speeds $V_{SU\text{-}D}$, $V_{TU\text{-}D}$. For example the desired supply and take up spool speeds $V_{SU\text{-}D}$, $V_{TU\text{-}D}$ may be scaled by a further factor such that an adjusted feed speed is determined for each spool. Alternatively, the printhead position data $PH_{POS}$ may be added to either one or both of the position errors for the supply spool $ERR_{SU}$ and the take-up spool $ERR_{TU}$. That is, the stored data indicating the cumulative error may be adjusted in anticipation of an expected printhead movement. On other words, an anticipated path length error may be injected into one or more of the error accumulators. In this way, the processing described above (e.g. using a threshold value and speed scaling factor) may be used to accommodate printhead movements.

Further, in some embodiments, one or more of the threshold values and/or speed scaling factors may be modified in order to respond quickly to an expected disturbance. For example, the speed scaling factor S2 associated with the second threshold level T2 may be increased based upon the ribbon path length error to be injected. The scaling factor adjustment may, for example, be calculated based upon the magnitude of the path length adjustment to be made, the current ribbon target speed, and the anticipated time it will take the printhead to complete the movement. Further, the T2 off level TO2 may be adjusted prevent any overshoot. For example, if the speed scaling factor is increased, the likelihood of overshoot is increased. Therefore, the threshold at which the speed scaling factor is reduced may also be increased, so as to lessen any overshoot (i.e. so that the speed scaling reverts to the first speed scaling factor S1 more quickly).

For example, where the speed scaling factor S2 is large (e.g. 50%), and the ribbon speed is also significant (e.g. 400 mm/s), when reverting from the second threshold to the first threshold, the motor may need to rapidly accelerate or decelerate when the turn off threshold TO2 is crossed. However, if this threshold TO2 is set at the level described above (e.g. 0.12 mm error) the adjustment will require a change of speed from a 50% scaled speed, to a 0.5% scaled speed. Moreover, with only 0.12 mm of error needing to be corrected at this stage, it is unlikely that a motor will be able to accelerate or decelerate quickly enough to reach the new target speed before an error has accumulated in the opposite direction. Thus, the second turn off threshold TO2 may be increased so as to provide a longer period in which the correction can be effected.

It will be understood that the speed scaler factors S1, S2 and threshold levels T1, T2 may initially be configured to respond to the gradual accumulation of errors in distance that occur during normal ribbon feeding operations. Since these errors are generally fairly small in magnitude, and occur relatively slowly, the feed correction block 41 may react with small corrections over a relatively long period of time. In particular, it is not ordinarily expected or intended that there are sudden large changes in the ribbon speed during printing, as this could affect the print quality, and lead to print sizing defects.

However, these concerns do not apply when the printhead is being withdrawn, since the printhead cannot be printing at this time. Moreover, the scaling factors used to respond to gradual error accumulations may not be large enough to correct the error introduced by the printhead movement before the ribbon feed has completed. Thus, one or more of the speed scaling factors (e.g. the second speed scaling factor S2) may be adjusted to correct the path length error that is about to be introduced in approximately the amount of time that the printhead movement is expected to take.

In some embodiments, the second threshold T2 is reduced to the extent that it is the same as the first threshold T1. In such an arrangement, the second speed scaling factor S2 is applied as soon as the first threshold T1 (and second threshold T2) is reached. This may be preferred where any path length adjustment is small (e.g. where there is a small gap between the ready to print position and the printing position). For example, if no T2 adjustment was made, an error which is just below the second threshold T2 level (e.g. 0.3 mm) may only be corrected by a small (e.g. 0.5%) speed scaling factor, and may thus take some considerable time to be corrected. However, where the second speed scaling factor S2 is adjusted based upon the required correction (e.g. the magnitude of the error $ERR_{SU}$), the second threshold may also be reduced to allow the second speed scaling factor S2 to be applied more quickly. In an embodiment, if an anticipated path length change would cause an effort between the first and second threshold T1, T2, the second threshold may be adjusted to fall between the anticipated error, and T1.

More generally, it is noted that the path length disturbances which result from step timing errors (which gradually accumulate) are different in nature to those which result from printhead movements (which apply almost instantaneously). Thus, the response to each type of path length change may be optimised for each disturbance while still using the same underlying control algorithm.

It is further noted that the speed scaling factors and thresholds may be adjusted only in the direction of the correction that is required. For example, for a printhead retraction movement (which requires ribbon to be removed from the path to avoid slack ribbon), only the second threshold and speed scaling factor for ribbon removal are adjusted. Of course, the opposite may apply during a printhead extension movements.

In some embodiments, the data indicative of the printhead position $PH_{POS}$ may be used only to the adjust control of the supply spool motor 3. Such control may be considered to reduce the likelihood of rapid tension changes being caused between the take up spool 5 and the printhead 11, which could have a detrimental effect on ribbon peel angle, and therefore print quality.

It will, of course, be appreciated that during each printing operation the printhead will be brought into contact with, and then out of contact with the printing surface. Thus, positive and negative adjustments may be made to ribbon path length (e.g. via adjustments to the position errors for the supply spool $ERR_{SU}$) during a single printing cycle.

Moreover, given the high speed at which steps may be applied to the motors 6, 7 (e.g. at stepping rates of up to several, or even several tens of, kilohertz), it is possible that printhead movements will be ongoing for more than a single step. That is, a printhead movement may span several motor steps. Indeed, in some embodiments, a printhead movement may take around 10 ms, which may, for example, span 500 tape drive motor steps.

As such, in some circumstances, the printhead position data $PH_{POS}$ may be modified across several steps, so as to provide accurate and up to date information regarding the actual ribbon path length at every point in time (rather than assuming that the printhead movement is instantaneous). In this way, any speed adjustment made by the ribbon feed correction block 41 may be distributed over several motor steps.

However, in a preferred embodiment, it is assumed that the printhead movement is instantaneous, on the basis that the maximum acceleration for the motors 6, 7 may limit the rate at which the tape drive can respond, and thus the response to the printhead position movement will effectively be distributed over several steps by the limited acceleration. In such an arrangement, the path length error is injected to the error accumulator as soon as the printhead movement begins.

If the path length error was added gradually (for example based upon detected printhead positon), it is possibly that there would be a significant delay during the initial part of the printhead movement whilst the error value accumulated, thereby delaying any corrective response. If is noted, however, that if the ribbon motors provided were capable of higher acceleration rates, and thus able to respond to an error more quickly, it may be preferred to for the path length adjustment block to use the printhead position data directly (rather than anticipating the path length change).

The printhead position data $PH_{POS}$ may be generated in any convenient way. For example, the printhead position data $PH_{POS}$ may be generated with reference to the motor 29 which controls the movement of the printhead 11. In particular, the printhead position data $PH_{POS}$ may be generated by monitoring steps applied by the motor 29. Alternatively, the printhead movement data may be generated with reference to the encoder 36 associated with the motor 29. For example, it may be assumed that any movement of the motor shaft 29*a* will correspond to a movement of the printhead 11.

Further, as noted above, given the relationship between the motor 25 and the printhead assembly (i.e. the coupling of the motor 25, via the belt 27 to the printhead carriage 21), movement of the motor 25 also has an impact on the position of the printhead relative to the printing surface.

Thus, in general terms it will be understood that at any point in time, the position of the printhead 11 can be determined by reference to the motor 29, and the motor 25. That is, for a given angular position of the motor shafts 25*a*, 29*a*, there is a predictable angle of the arms 33, 34, and thus a predictable position of the printhead 11 with respect to the body of the printer 1.

However, in use, the position of the printing surface 13 with respect to the body of the printer 1 may vary. It some prior part printers, it is known for a nominal platen separation to be programmed by a user during printer configuration. However, such a process may be inherently unreliable. Moreover, even if the initial platen separation was accurate, configuration changes may occur, resulting in the nominal separation becoming inaccurate.

It is desirable, therefore, for a number of reasons to provide a more accurate indication of the gap between the printhead 11 and the printing surface 13 when the printhead 11 is in the ready to print location $L_{RTP}$ to the printer controller 10. Such data may be used as described above to adjust the control of the motors 6, 7, controlling the movement of ribbon between the spools. Alternatively, or additionally, such data may be used to allow more accurate tracking of regions of ribbon which are used for printing. A process by which accurate estimates of platen gap and printhead position during printing operations will now be described.

It is possible to monitor the point at which the printhead makes contact with a printing surface by monitoring the power supplied to a motor driving the printhead (and thus the torque applied by that motor). However, it is been realised that there may be errors between the position of the printhead 11 as determined purely by reference to the point at which in the printhead 11 makes contact with the printing surface as indicated by the motor controlling that movement, and the actual deflection of the ribbon 2 during printing operations. For example, calculating the printing location $L_P$ on the basis of the position of motor shaft 29*a* alone can lead to an overestimate of the extension of the printhead 11. It is understood that the various belts and mechanical linkages, as well as the inherent compliance within the printing surface (e.g. a print roller) can contribute such errors.

As such, it has been realised that by applying a negative offset to the apparent printhead position, a more accurate representation of the ribbon deflection can be achieved. The offset may be empirically determined to provide robust detection of the printing location $L_P$. Moreover, the offset may vary depending upon the printing force and other configuration changes (e.g. a change in print roller).

Various positions of the printhead can be understood by reference to FIGS. 7*a* to 7*c*.

FIG. 7*a* shows schematically the printhead 11 in a ready to print location $L_{RTP}$, spaced apart from the printing surface 13 (in this case a platen roller). It can be seen that the ribbon 2 is in contact with the printhead 11, and is guided at the downstream edge of the printhead by the roller 20. However, the printhead 11 is spaced apart from the printing location $L_P$.

FIG. 7*b* shows the printhead 11 in a position where it has been moved towards the printing surface 13, and is just at the point of making contact with the printing surface 13 at the printing location $L_P$. However, in this configuration, very little force is being applied to the printing surface 13 by the printhead 11.

FIG. 7*c* shows the apparent position $PH_{POS\text{-}APPARENT}$ of the printhead 11 as indicated by the encoder 36 associated with the motor 29. It can be seen that the apparent position of the tip of the printhead 11 is beyond the surface of the printing surface 13. In fact, the actual position of the printhead 11 will be in contact with the printing surface 13 substantially at the printing location $L_P$, and making firm contact with the printing surface 13 such that there may be some deflection of the printing surface 13. However, as discussed briefly above, there may also be deflections in other components of the printer which contribute to a difference between the apparent ($PH_{POS\text{-}APPARENT}$) and actual ($PH_{POS}$) printhead positions during printing.

A process by which printhead position data $PH_{POS}$ is generated will now be described with reference to FIG. 8.

At step S101, a data item indicative of the actual printing location $L_P$_ACTUAL is initialised. Processing passes to step S102 where the printhead 11 is driven towards the printing surface 13 by the motor 29. During this movement, the motor 25 is held stationary, so as to prevent any movement of the carriage 21 in a direction parallel to the printing surface 13 along the linear track 23. During this movement of the printhead the motor 29 may be controlled to deliver a maximum torque which corresponds to a predetermined printing force being exerted on the printing surface 13.

During the movement of the printhead at step S102, the encoder 36 associated with the motor 29 is monitored. Once the encoder output value $PH_{ENC}$ stops changing, indicating that an equilibrium (i.e. substantially stationary) position has been reached, with the predetermined printing force being exerted on the printing surface 13 by the printhead 11, processing passes to step S103.

It will be understood that the encoder 36 may rarely be totally stationary. As such, a low pulse rate may be detected, and considered to be indicative of an equilibrium position being reached. Moreover, a processing delay may be inserted before the encoder output is monitored at step S102, so as to allow for any system latency (e.g. a delay after a move command is generated and before the encoder value begins to change).

At step S103, the encoder value $PH_{ENC}$ when the equilibrium position is reached is stored as an apparent printing location $L_{P\text{-}APPARENT}$. The apparent printing location $L_{P\text{-}APPARENT}$ is an encoder position which indicates the apparent position of the printing location.

It will be understood that the apparent printing location (in terms of a physical position with reference to other components of the printer) may subsequently be generated with reference to the known angular position of the output shaft 25*a* of the motor (as indicated by the encoder data $PH_{ENC}/L_{P\text{-}APPARENT}$) and the known geometry of the printer (e.g. the position of the belts 27, 31, the length and alignment of the arms 33, 34 etc.). This conversion may be performed at any convenient time as required, for example, with reference to a lookup table containing known relationships between encoder values and actual printhead positions.

Processing then passes to steps S104, where the apparent printing location $L_{P\text{-}APPARENT}$ is compared to reference data so as to determine if the apparent printing location $L_{P\text{-}APPARENT}$ is within an a acceptable range (e.g. a platen separations of 0 mm to 5 mm). Of course, where the apparent printing location $L_{P\text{-}APPARENT}$ is an encoder value, data indicating an acceptable range may be provided in terms of encoder values corresponding to acceptable physical positions. If the value is not in an acceptable range, a fault is raised to the user at step S105.

Provided this apparent printing location $L_{P\text{-}APPARENT}$ is within an acceptable range, processing passes to step S106, where a predetermined offset value $PH_{OFF}$ is subtracted from the apparent printing location $L_{P\text{-}APPARENT}$. That is, an offset is applied such that the apparent printing location $L_{P\text{-}APPARENT}$ as determined by the angular position of the encoder 36 (and therefore motor shaft 29*a*) is adjusted so as to correspond to an earlier position in the movement of the printhead 11 towards the printing surface 13. The offset value $PH_{OFF}$ may be a number of encoder pulses. The resulting position may be referred to as an actual printing location $L_{P\text{-}ACTUAL}$.

It will be understood that as the printhead 11 makes contact with the printing surface 13, the printing surface 13 may be compressed. Moreover, the belts 27, 31 may flex in a direction perpendicular to the direction of travel of the ribbon 2 and the substrate 12. Such flexion will result in some rotation of the motor 29*a* not being transferred to movement of the printhead. Moreover, once contact has been made between the printhead 11 and the printing surface 13, the portion of ribbon at the printing location $L_P$ will be somewhat restricted in its movement due to the friction forces between the various surfaces.

It is been observed that by applying an empirically determined offset to the apparent printing location $L_{P\text{-}APPARENT}$ when the motor 29 stops rotating to generate the actual printing location $L_{P\text{-}ACTUAL}$ data, it is possible to obtain a more accurate indication of the actual location of the printing location $L_P$, which more accurately reflects the actual ribbon deflection during printing operations.

Once the actual printing location $L_{P\text{-}ACTUAL}$ has been determined, processing passes to step S107 where this data is stored for subsequent use.

The processing of steps S102 to S107 is repeated for each subsequent printhead movement (e.g. during printing operations) and, for each movement of the printhead into contact with the printing surface 13, the actual printing location $L_{P\text{-}ACTUAL}$ is updated. For example, rather than simply relying upon a single measurement, in use the actual printing location data $L_{P\text{-}ACTUAL}$ may be based upon an average of a plurality (e.g. ten) of previous printhead movements. In this way, any changes in printing location $L_P$ during ongoing printing operations can be monitored.

During printing operations, a number of uses may be made of the actual printing location data $L_{P\text{-}ACTUAL}$. For example, the actual printing location $L_{P\text{-}ACTUAL}$ may be passed to the ribbon feed controller 40 as printhead position data $PH_{POS}$ (as described above with reference to FIG. 5) so as to allow for compensation for any change in ribbon path length as a result of printhead movement, such as, for example, printhead movement towards and away from the printing surface. The actual change path length (i.e. a distance in mm) may be generated from the printhead position data $PH_{POS}$ by reference to a lookup table stored in memory. The lookup table may include path length values for the ready to printer position $L_{RTP}$ and the actual printing location position $L_{P\text{-}ACTUAL}$ with encoder values (i.e. $PH_{POS}$ data) being used to index the lookup table. For each printhead position change, a corresponding change in path length can thus be calculated.

However, it will be understood that during movement of the printhead the printhead position will vary, and will not, therefore, be equal to the actual printing location $L_{P\text{-}ACTUAL}$ at all times.

Processing performed by the controller 10 to generate an appropriate printhead position $PH_{POS}$ to provide to the ribbon feed controller 40 is now described with reference to FIG. 9.

At step S110, current printhead encoder value $PH_{ENC}$ is obtained. Processing passes to step S111 where the value is converted to an apparent printhead position $PH_{POS\text{-}APPARENT}$. In an embodiment, the apparent printhead position $PH_{POS\text{-}APPARENT}$ is simply an encoder value. Alternatively, in other embodiments the apparent printhead position $PH_{POS\text{-}APPARENT}$ may be a physical position and may be generated with reference to a lookup table storing positional information, or by processing of the current encoder value $PH_{ENC}$ and known geometry data. However, in the described embodiment, the conversion from encoder values to actual distances is performed at a different processing step (e.g. within the ribbon feed controller 40).

It is noted that, at the point at which the encoder output value $PH_{ENC}$ stops changing, the apparent printhead position $PH_{POS\text{-}APPARENT}$ value will be equal to the apparent printing location $L_{P\text{-}APPARENT}$ value generated at step S106. However, whereas the apparent printing location $L_{P\text{-}APPARENT}$ value represents a single location, the apparent printhead position $PH_{POS}$-APPARENT value is a continually varying quantity.

Processing then passes to step S112 where the apparent printhead position $PH_{POS\text{-}APPARENT}$ is compared with the currently stored actual printing location $L_{P\text{-}ACTUAL}$ (as generated in step S107). If the current apparent printhead position $PH_{POS\text{-}APPARENT}$ is smaller than the stored actual printing location $L_{P\text{-}ACTUAL}$ value, then the current position data item is used as the data indicative of printhead position $PH_{POS}$. That is, if the apparent printhead position $PH_{POS\text{-}APPARENT}$ indicates that the printhead 11 has not yet reached the printing location $L_P$, then processing passes to step S113 where the apparent printhead position $PH_{POS\text{-}APPARENT}$ is used in subsequent processing as the data indicative of printhead position $PH_{POS}$.

On the other hand, if the apparent printhead position $PH_{POS}$-APPARENT is greater than the stored actual printing location $L_{P\text{-}ACTUAL}$, then processing passes to step S114 where the stored actual printing location $L_{P\text{-}ACTUAL}$ is used as the data indicative of printhead position $PH_{POS}$.

In this way, an estimate of the actual printing location $L_{P\text{-}ACTUAL}$ is obtained and maintained during ongoing printing operations. This actual printing location $L_{P\text{-}ACTUAL}$ corresponds to an encoder value indicative of a platen separation (the platen separation being a distance to be moved by the printhead between the ready to print location $L_{RTP}$ and the printing location $L_P$). Moreover, by using an offset value, allowance is made for various system compliances that could otherwise cause a discrepancy between the apparent printing location $L_{P\text{-}APPARENT}$ and the actual printing location $L_{P\text{-}ACTUAL}$.

Further, during ongoing movements of the printhead, the lesser of the apparent printhead position $PH_{POS\text{-}APPARENT}$ and the actual printing location $L_{P\text{-}ACTUAL}$ is passed to ribbon feed controller 40 (or other function within the printer controller 10) as the indicative printhead position $PH_{POS}$. This allows the actual data to be used where the printhead is in a free space position (i.e. where it is not in contact with the printing surface 13) but uses the more robust offset and averaged printhead location data $L_{P\text{-}ACTUAL}$ when it is pressed against the printing surface 13.

In this way, accurate and robust data is provided to the various functions of the printer controller 10 as required, allowing accurate ribbon control and more accurate tracking of regions of ribbon which are used for printing.

Operation of the camera 15 and light source 16 will now be described in more detail with reference to FIG. 10. The camera 15 and the light source 16 may, together, be referred to as an image capture system. The light source 16 is arranged to emit a beam R of radiation which is incident upon the ribbon 2 adjacent to the light source 16. A portion of the radiation incident upon the ribbon 2 is transmitted through the ribbon, while some radiation may also pass around sides of the ribbon 2. The beam of radiation passing from the ribbon 2 to fall upon the camera 15 may be referred to as a transmitted beam $R_T$ (although as noted above, some of this radiation may not have passed through the ribbon 2). The location at which the ribbon 2 intersects the beam R between the camera 15 and the light source 16 defines an imaging location $L_I$ (also shown in FIG. 1).

The camera 15 and light source 16 are arranged at a position which is downstream in the ribbon path from the location of the printhead assembly 4. That is, ribbon 2 which is paid out by the supply spool 3, passes the guide roller 8, then the printhead 11 (where it may be used for printing operations at the printing location $L_P$), before passing around the guide roller 20. The ribbon 2 then passes between the camera 15 and light source 16 (at the imaging location $L_I$). Finally, the ribbon 2 passes the guide roller 9, and is taken up by the take up spool 5.

Thus, any portion of ribbon which passes between the light source 16 and the camera 15 at the imaging location $L_I$, has, in normal operation, already passed the printing location $L_P$. It will, of course, be appreciated that in use portions of ribbon may be advanced from the supply spool 3 to the take up spool 5 and then re-wound in the opposite direction, for example, so as to ensure a particular portion of unused ribbon is presented at the printing location for a printing operation without wasting ribbon. However, overall, ribbon is generally advanced from the supply spool 3 to the take up spool 5 in a first direction, the printhead 11 (and the printing location $L_P$) being upstream of the camera 15 (and the imaging location $L_I$). The separation between the printing location $L_P$ and the imaging location $L_I$ may be referred to as an imaging distance $D_I$.

In use, the camera may be used to examine the ribbon 2, for example to identify properties of the ribbon (e.g. to identify where portions of ink have been removed from the ribbon). The identified properties of the ribbon may be used to control printer operation. For example, the negative image of ink which has been removed from the ribbon may be compared with data indicative of an expected negative image (which may be based upon an image intended to be printed on a substrate), and printing faults identified. Such processing is described in our earlier application WO 2013/025746, which is herein incorporated by reference.

It will be appreciated that variations may occur in imaging quality when using the camera 15 and light source 16. For example, variations in background image intensity may reduce the captured image quality. Similarly, in order to provide for robust detection of printing defects, portions of ribbon which are printed on should be tracked accurately through the printer 1. Moreover, knowledge of the relative location of the printing location $L_P$ and the imaging location $L_I$ (and hence the imaging distance $D_I$) during printing may be used (in combination with the tracking of portions of ribbon along the ribbon path) in order to allow accurate image registration, and thus a robust comparison to be made between printed images and expected images.

Several techniques which provide improvements in ribbon tracking, image capture quality and image processing, are now described in more detail.

FIG. 11 shows a schematic cross-section view along a line A-A' (shown in FIG. 10) of the camera 15 and light source 16, as seen from the left hand side of FIG. 10, looking to the right along the ribbon feed path.

The light source 16 comprises a plurality of individual light emitting diodes (LEDs) 50. The LEDs 50 are arranged in a linear array, which extends across the width of the ribbon 2 in a direction substantially perpendicular to the direction of ribbon and substrate movement. Ribbon widths may typically 60 mm, although 110 mm and 30 mm ribbon (or indeed other ribbon widths) may also be used. As such the light source is configured to extend beyond the extent of the widest ribbon expected to be installed in the printer 1. In the described embodiment, the light source 16 is around 65 mm in length. It will be understood that if a ribbon wider than 60 mm is used, a wider light source may be required.

In an embodiment, the light source comprises 28 LEDs 50. The LEDs are driven by an LED driver 51. The LED driver S1 may comprise a plurality of separate LED drive circuits (not shown), each circuit being configured to drive one or more of the LEDs 50. The LEDs 50 may, for example, be driven in pairs, with each drive circuit being configured to drive a pair of LEDs 50. The LED driver S1 is controlled by the controller 10. The LED driver S1 may be provided by a TLC5941 16-channel LED driver manufactured by Texas Instruments Inc, Texas, USA. The LEDs may be selected to have an emission wavelength (or distribution) which is convenient for detection by the camera 15. In an embodiment, the LEDs may emit radiation at a wavelength of 633 nm.

The light source 16 further comprises a light box 52 within which the LEDs 50 are housed. The face of the light box 52 which faces the ribbon 2 (and the camera 15) is covered with a window, which allows the radiation emitted from the LEDs to pass to the ribbon 2. The window may comprise a transparent panel 53 and a diffuser layer 54. The diffuser layer may be arranged to homogenize and directionally shape the radiation emitted by the LEDs, while also providing a high transmission efficiency. For example, the diffuser film may be a light shaping diffuser film manufactured by Luminit LLC, of Torrance, California, USA. The film may have a thickness of 0.25 mm, and may provide a diffusion angle of 40 degrees by 1 degree. In particular, the diffuser film may cause incident radiation to be diffused by around 40 degrees in a direction parallel to the direction in which the LED array extends, and by around 1 degree in a direction parallel to the movement of ribbon past the imaging location. This ensures that the radiation emitted by the LEDs remains principally directed towards the camera 15 in the direction parallel to the movement of ribbon past the imaging location without being diffused so as to miss the camera. However, in the direction parallel to the LED array, the 40 degree diffusion reduces the intensity variation across the full width of the camera. That is, without the diffuser, each LED may create an intensity peak, with a deep trough being formed between adjacent peaks. The diffuser smooths the intensity distribution across the width of the LED array. In an embodiment, two similar 40 degree by 1 degree films are used, one on top of the other.

The light source 16 may further comprise a transparent plastic rod 55, which is provided directly between the LEDs 50 and the diffuser layer, and acts as a lens to direct the radiation output by the LEDs towards the diffuser 54.

The camera 15 comprises a sensor 60 having a plurality of pixels (not shown). In an embodiment, the sensor 60 comprises 256 pixels arranged in a one-dimensional linear array. The pixel array extends in a direction substantially parallel to the linear array of LEDs 50 in the light source 16. Radiation incident upon the camera is focused and directed towards the sensor 60 by a lens assembly 61. The lens assembly 61 provides a wide angle field of view, allowing radiation to be captured from the full width of the light source 16.

In the embodiment described above, the lens assembly 61 allows radiation to be captured from the full 60 mm width of the ribbon 2. Thus, each pixel of the sensor 60 corresponds to approximately 0.23 mm at the ribbon surface. Assuming that printing is carried out at a resolution of 300 dots per inch, then each image pixel corresponds to around 2.5 pixels printed on the ribbon 2. In some embodiments, the camera field of view may be wider than the ribbon. For example the field of view may be 63 mm, allowing ribbon edges to be detected.

As noted above with reference to the light source 16, if wider ribbons are used, a camera having a wider field of view may be required. Alternatively, a plurality of cameras and lens assemblies may be provided, each having a field of view which covers a portion of the imaging location. In such an arrangement, image data obtained from each of the cameras may be merged into a single image for subsequent processing.

Signals indicative of the radiation intensity incident upon each of the pixels of the sensor 60 are passed to an image capture block 62. The signals indicative of the radiation intensity incident upon each of the pixels of the sensor 60 may collectively be referred to as a characteristic of the image capture system and/or a spatial distribution of radiation intensity. The image capture block 62 may comprise software and/or hardware elements (including analog and/or digital electronic components). For example, the image capture block 62 may comprise amplifiers for amplifying the received signals, analog to digital convertors for converting analog intensity signals to digital data values, and a processing for processing the digital data.

In an embodiment the sensor 60 comprises a 256 element linear photodiode sensor array having integral charge amplifier circuitry such as, for example, the TSL1402R as manufactured by Texas Advanced Optoelectronic Solutions Inc, of Plano, Texas. The sensor may produce two analog outputs (each relating to 128 sensor elements), which are passed to respective ADC chips (e.g. AD 7278, manufactured by Anaog Devices Inc, of Norwood, Massachusetts). The ADC chips may each provide a 128-bit serial data output via an SPI interface, each having 8-bits of intensity data per pixel of the sensor.

Before images are captured by the camera, the camera 15 and the light source 16 may be normalised and/or calibrated so as to provide improved image capture. For example, it will be appreciated that non-uniformities in the illumination intensity across the width of the image may result in the camera 15 having different sensitivities to ribbon properties at different locations across the width of the ribbon.

A normalisation process is described with reference to FIGS. 12A and 12B. The normalisation process includes four distinct stages. These are a hardware test N1, brightness profile calibration N2, pixel normalisation N3 and background radiation profile capture N4.

It is noted that, in the following processing, where it is described that an intensity image is captured, a plurality of images may be captured from the capture block 62, and an average value determined for each pixel. The average values may then be processed as described (rather than processing the data obtained in a single capture). Similarly, the term image may be understood to refer to a one-dimensional array of intensity values. Such an array may alternatively be referred to as a characteristic of the image capture system, or a spatial distribution of radiation intensity.

At a first processing step S200 of the hardware test N1, performed when there is no ribbon cassette installed in the printer, the LEDs 50 are all driven to an 'off' state.

Processing then passes to step S201 where the image capture block 62 is operated to capture a full width intensity distribution $IM_{OFF}$ from the image sensor 60. The captured intensity distribution $IM_{OFF}$ comprises a respective data item indicative of the radiation intensity incident upon each of the 256 pixels.

Processing then passes to step S202, where it is determined if the radiation intensity incident upon the sensor 60 (as captured in $IM_{OFF}$) is below a minimum threshold level. If the radiation intensity is below the threshold, processing passes to step S203. At step S203 the LEDs 50 are all driven to an 'on' state, with maximum drive intensity.

Processing then passes to step S204 where the image capture block 62 is operated to capture a full width intensity distribution $IM_{FULL}$ from the image sensor 60. The captured intensity distribution $IM_{FULL}$ comprises a respective data item indicative of the radiation intensity incident upon each of the 256 pixels.

Processing then passes to step S205, where it is determined if the radiation intensity incident upon the sensor 60 (as captured in $IM_{FULL}$) is above a maximum threshold level. If the radiation intensity is above the threshold, the hardware test N1 is complete.

However, if the radiation intensity is below the maximum threshold, this is indicative of an error condition, and a fault condition is raised at step S206. Similarly, at step S202, if the minimum threshold is exceeded, this is also indicative of an error condition, and processing passes to step S206 where a fault condition is raised. If a fault condition is raised at step S206, the normalisation process is terminated.

If the hardware test has been successful, processing passes from step S205 to the brightness profile calibration N2, and processing step S207, which is also performed when there is no ribbon cassette installed in the printer.

At step S207 a first pair of LEDs 50 are selected. Processing passes to step S208 where the selected pair of LEDs 50 are illuminated at a drive intensity which corresponds to 50% of the maximum drive intensity.

Processing then passes to step S209 where the image capture block 62 is operated to capture a full width intensity distribution $IM_{LED\_PAIR}$ from the image sensor 60. The captured intensity distribution $IM_{LED\_PAIR}$ comprises a respective data item indicative of the radiation intensity incident upon each of the 256 pixels as a result of the half-intensity illumination of the selected LED pair.

Processing then passes to step S210, where it is determined if the peak radiation intensity incident upon the sensor 60 (as captured in intensity distribution $IM_{LED\_PAIR}$) is equal to a nominal brightness level. The peak radiation intensity may be the average intensity across a primary illumination region for the selected LED pair. The primary illumination region may comprise a subset of the sensor pixels which are closest to the LED pair. For example, the intensity of the brightest pixel (or average across a small group of pixels) across the full intensity distribution $IM_{LED\_PAIR}$ may be determined to be the peak radiation intensity.

The nominal brightness level may, for example correspond to around 72% of the maximum detectable intensity. This is based upon the realisation that each LED pair will primarily illuminate a predetermined region of the sensor, but will also contribute to the illumination of adjacent regions to some extent. Thus, if a nominal peak intensity of 72% is detected at the primary illumination region, when all pairs of LEDs are illuminated simultaneously, each illumination region will be illuminated at approximately the maximum detectable intensity.

If the peak radiation intensity is not equal to the nominal level, processing passes to step S211, where the brightness level is adjusted for the selected pair. The adjustment may, for example, use a binary chop algorithm to adjust the drive level. Processing then returns to step S208, where the selected pair of LEDs 50 are now illuminated at the adjusted drive intensity.

Processing continues in this way, by repeating steps S208 to S211, until the selected LED pair are determined to cause the peak radiation intensity incident upon the sensor 60 (as captured in intensity distribution $IM_{LED\_PAIR}$) to be equal to the nominal brightness level.

Once the nominal brightness level has been achieved, processing passes to step S212, where it is determined if the selected LED pair is the last LED pair. If not, processing returns to step S207, where a new LED pair is selected. The processing steps S208 to S212 are then repeated until an appropriate adjusted nominal drive level has been determined for each LED pair. Data indicating the corrected drive intensity for each LED is stored in a data structure $LED_{CORRECT\_NOMINAL}$. It will be appreciated, of course, that in some embodiments alternative LED adjustment routines may be performed.

At this point, the brightness profile calibration N2 is complete and processing passes to step S213, which is the first step of the pixel normalisation N3. At step S213, all of the LEDs are driven at the determined nominal intensity $LED_{CORRECT\_NOMINAL}$.

It will be expected that the LEDs towards the outside of the array are required to be driven at a higher intensity than the more central LEDs. This is because the image sensor will receive a higher proportion of the radiation emitted by the LEDs in the centre of the array than the LEDs towards the outside of the array. In particular, the central LEDs are closer to, and pointing directly towards the sensor 60 (as indicated by radiation path $r_c$), whereas the outer LEDs are slightly further away from the sensor, and directed in a path perpendicular to the direction in which the array extends ($r_o$).

Processing then passes to step S214 where the image capture block 62 is operated to capture a full width intensity distribution $IM_{NOMINAL}$ from the image sensor 60. The captured intensity distribution $IM_{NOMINAL}$ comprises a respective data item indicative of the radiation intensity incident upon each of the 256 pixels.

Processing then passes to step S215 where a set of normalisation scaler values $IM_{NORM}$ are generated. The normalisation scaler values $IM_{NORM}$ comprise a scaler value for each pixel of the sensor 60, each scaling value being a value which must be applied to the intensity value detected by the respective pixel in order to generate a scaled image having a uniform and maximum intensity. These normalisation scaler values $IM_{NORM}$ are stored for use in subsequent image processing.

At this point, the pixel normalisation N3 is complete and processing passes to step S216, which is the first step of the background radiation profile capture N4. At S216 the LEDs 50 are driven at a reduced intensity (e.g. 30% of the corrected nominal drive intensity $LED_{CORRECT\_NOMINAL}$).

Process then passes to step S217 where a full width intensity distribution $IM_{BG\_NO\_RIBBON}$ is captured from the image sensor 60. The captured image comprises a data item indicative of the radiation intensity incident upon each of the 256 pixels.

Given the adjustment performed at step S211, the image obtained at step S217 is expected to include reduced levels of intensity fluctuation as compared with an image obtained where there is an equal drive current supplied to each of the LEDs 50. However, it will be appreciated that there is likely to still be some intensity deviation across the image. The captured intensity distribution $IM_{BG\_NO\_RIBBON}$ is stored, and may be referred to as a background intensity distribution, or alternatively, a background spatial distribution of radiation intensity.

When it is detected that a cassette holding ribbon is inserted into the printer, processing passes to step S218, where the LEDs 50 are driven at the corrected nominal drive intensity $LED_{CORRECT\_NOMINAL}$. All of the LEDs are driven simultaneously.

Processing then passes to step S219 where a further full width intensity distribution $IM_{RIBBON}$ is captured from the image sensor 60 and stored. The captured data comprises a data item indicative of the radiation intensity incident upon each of the 256 pixels.

Processing then passes to step S220 where it is determined, from the ribbon intensity distribution $IM_{RIBBON}$, if ribbon is present at each region within the image. The presence or absence of ribbon may, for example be detected by applying a threshold level to the ribbon intensity distribution $IM_{RIBBON}$. Alternatively, an edge detection algorithm may be applied to the ribbon intensity distribution $IM_{RIBBON}$ to identify any ribbon edges.

As noted above with reference to the background intensity distribution $IM_{BG\_NO\_RIBBON}$. It is expected that there will be some intensity deviation across the image. However, it will also be appreciated that the presence of ribbon at the imaging location $L_I$ will cause the radiation intensity to be reduced in some regions. The optical transmittance of the ribbon 2 at the imaging location will result in amount of radiation incident upon the detector being reduced in comparison to the amount if no ribbon were present. However, where there is no ribbon present, the optical intensity upon the detector will be high (e.g. approximately 90% of maximum sensor output signal levels).

In addition to the significant differences in image intensity due to the presence or absence of ribbon at each location of the imaging location $L_I$, there will also be a more subtle variation in the image intensity as a result of the non-ideal behaviour of the emitters and detectors, and other factors such as alignment. The obtained intensity distribution $IM_{RIBBON}$ will thus contain intensity fluctuations within a first part associated with the areas of ribbon, and also within a second part (or parts) where the radiation is not blocked by ribbon.

In the first part, the intensity recorded with ribbon present is processed at step S221 to generate background intensity distribution $IM_{BG}$ to replace that obtained during step S217. It will be understood that while the background intensity distribution $IM_{BG\_NO\_RIBBON}$ provides useful information regarding the relative difference between the brightness of different image regions, no account is taken of the type of ribbon actually installed in the printer. For example, depending on the type and/or colour of ribbon installed, there may be significant variations in transmittance.

Thus, by using data extracted from the intensity distribution $IM_{RIBBON}$ (rather than $IM_{BG\_NO\_RIBBON}$)) it is possible to generate improved background data which takes into account both non-ideal system behaviour and ribbon transmittance characteristics. Thus, for the first part, where ribbon is present, the relevant pixels of the intensity distribution $IM_{BG}$ are populated with data extracted from the intensity distribution $IM_{RIBBON}$. In an embodiment, the value stored in each of the pixels of the intensity distribution $IM_{BG\_NO\_RIBBON}$ corresponding to a location where ribbon is present is replaced by the value stored in the corresponding pixels of the intensity distribution $IM_{RIBBON}$.

In an alternative embodiment, the value stored in each of the pixels of the intensity distribution $IM_{BG\_NO\_RIBBON}$ corresponding to a location where ribbon is present is scaled by a scaling factor determined to cause the scaled value to be equal to the value stored in the corresponding pixels of the intensity distribution $IM_{RIBBON}$.

Given that the ribbon is generally not as wide as the imaged width at the imaging location $L_I$, no improved background data will exist for parts where no ribbon is present. As such, improved background data for the regions where ribbon is not present is generated at a further processing step S222 based upon the ribbon intensity distribution $IM_{RIBBON}$ obtained at step S219, and the background intensity distribution obtained with no ribbon present $IM_{BG\_NO\_RIBBON}$ at step S217 to provide appropriate background data for the locations where ribbon is not present.

In particular, to populate the relevant pixels of the improved background intensity distribution $IM_{BG}$ (i.e. those pixels corresponding to locations where ribbon is not present), the corresponding pixels of the ribbon intensity distribution $IM_{RIBBON}$ are scaled by an amount equal to the average adjustment applied at step S221 to the pixels where ribbon is present.

In this way, the pixels of the improved background intensity distribution $IM_{BG}$ corresponding to locations where ribbon is not present are populated with values which take into account both non-ideal system behaviour, and expected ribbon transmittance characteristics.

FIGS. 13 and 14 provide an illustration of background data generation. The various data sets generated and relationships therebetween is illustrated in FIG. 13. In FIG. 14, the horizontal axis shows pixel location (with 32 pixels shown in this example), while the vertical axis shows the pixel intensity. A first line shows the background intensity distribution obtained with no ribbon present $IM_{BG\_NO\_RIBBON}$ captured at step S217. It can be seen that this line includes an apparently random noise profile, with no clear features or trend visible across the image width.

A second line shows the ribbon intensity distribution $IM_{RIBBON}$ captured at step S219. It can be seen that in the centre part of the image (i.e. where ribbon is present), the intensity is around 35-45%, whereas at the image edges (i.e. where no ribbon is present), the intensity is around 80-90%. However, across the image, the same characteristic noise profile as seen in the background intensity distribution obtained with no ribbon present $IM_{BG\_NO\_RIBBON}$ is observed.

Finally, a third line shows the improved background intensity distribution $IM_{BG}$. Where ribbon is present, this is simply the same as the ribbon intensity distribution $IM_{RIBBON}$. However, at the image edges, where no ribbon is present, the ribbon intensity distribution $IM_{RIBBON}$ has been scaled such the intensity distribution $IM_{BG}$ is at approximately the same level across the width of the image, with the noise profile seen in $IM_{BG\_NO\_RIBBON}$ still present.

Of course, alternative adjustments having a similar effect may be made. For example, the parts of the intensity distribution $IM_{BG\_NO\_RIBBON}$ where ribbon is not present may be scaled (while retaining the relative differences between pixels) such that the average value of those pixels is equal to the average intensity value in the regions of the ribbon intensity distribution $IM_{RIBBON}$ where ribbon is present.

In this way, background intensity distribution $IM_{BG}$ is generated for the full width of the imaging location $L_I$ based upon the background intensity distribution obtained with no ribbon present $IM_{BG\_NO\_RIBBON}$ and the intensity distribution obtained with ribbon present $IM_{RIBBON}$.

While the data generated for parts where no ribbon is present may not precisely match the data that would have been obtained if ribbon were present, it is considered to provide a sufficiently reliable indication of the expected intensity when ribbon is present to allow appropriate image compensation to be performed if the ribbon position moves during subsequent imaging operations.

It will be appreciated that various additional or alternative processing steps may be performed, or that processing steps described above may be omitted. For example, in an embodiment, in an additional processing step may be performed between stages N2 and N3 in which all LEDs are driven at the corrected nominal intensity $LED_{CORRECT\_NOMINAL}$. Then, image data may be obtained from the camera 15 and a further adjustment may be made to the LED drive intensities to avoid over or under exposure of particular sensor regions (and thus parts of ribbon). For example, any image data obtained which indicates that intensity saturation is occurring (e.g. a completely flat, and maximum intensity level) can be used to reduce the intensity of LEDs corresponding to that region of the sensor. On the other hand, if the image data obtained indicates that the intensity fails to approach the maximum intensity level, this information can be used to increase the intensity of LEDs corresponding to that region of the sensor. Such processing may reduce data loss (for example by overexposure) or image bleeding (where data from one pixel bleeds into an adjacent pixel).

The processing described above is primarily concerned with image intensity adjustments to compensate for non-uniformities in the sensor and emitter configuration, and differences between transmittance of different ribbons. Moreover, the processing described makes use of one-dimensional data arrays captured by a one-dimensional sensor.

However, in operation, the camera 15 is intended to provide two-dimensional imaging, so as to allow captured image data to be compared with intended printed image data, thereby allowing printing quality to be assessed. Thus, further processing may be performed in order to accurately calibrate the length, width, and/or position of captured image data, so as to allow for proper image registration, and thus region by region image comparison. When two-dimensional images are captured from the camera, a one-dimensional line scan (i.e. a one-dimensional distribution of radiation intensity) is captured each time the ribbon is determined to have moved by an amount which corresponds to the size of one pixel in an imaging direction. A two-dimensional image is built by assembling a plurality of one-dimensional image array, or image slices, each image slice being associated with a particular region of ribbon.

However, it will be appreciated that the capture of a two-dimensional image by a one-dimensional sensor requires an effective pixel dimension to be determined in the imaging direction. That is, the one-dimensional array has a length in a direction perpendicular to the ribbon travel direction, with each pixel representing a region which is a proportion of that length. However, while it may be assumed that each pixel is square, unless the ribbon transport past the imaging location is accurately controlled, and that control calibrated, it may be that the effective length of each pixel in the direction of ribbon transport (i.e. not the imaging direction) is different from that in the direction in which the sensor extends.

Moreover, if equivalent image regions are to be compared between captured images and expected data, it is important for the relationship between the size of each imaged pixel and corresponding regions of the expected image to be known. It may be preferable for the pixels in the compared images to have a similar size. In practice the region of ribbon corresponding to each of the captured pixels in a two-dimensional image may be substantially square.

A process by which the camera is calibrated for this purpose is now described with reference to FIG. 15. Processing starts at step S300, where the printer is controller to begin printing a calibration pattern $P_{CAL}$ on a substrate. FIG. 16 shows schematically a portion of ribbon 2 upon which the calibration pattern $P_{CAL}$ has been printed. During the printing, the ribbon is advanced in the direction indicated by arrow D from the printing location to the imaging location. The calibration pattern $P_{CAL}$ has known dimensions, and may, for example, be a solid rectangle having a length $L_{CAL}$ in the direction D, and a width $W_{CAL}$ in a direction perpendicular to the direction of ribbon movement. The dimension of the calibration pattern $P_{CAL}$ may be pre-selected based upon the ribbon width, before step S300. It will be appreciated that for narrower ribbon, a calibration pattern $P_{CAL}$ with a smaller dimension may be used. For example, the calibration pattern $P_{CAL}$ may extend for a predetermined percentage of the ribbon width.

During the printing of the pattern $P_{CAL}$, the ribbon is advanced past the printing location $L_P$ so as to move the ribbon 2 past the printhead 11, which remains stationary. The substrate 12 is also advanced past the printhead 11. During this movement, the number of pulses moved by the encoder associated with the take up spool motor 7 is monitored continually.

As the ribbon is advanced the camera 15 continually captures images of each portion of ribbon at the imaging location $L_I$. The captured images are monitored for the leading edge of the negative image of the calibration pattern $P_{CAL}$ on the ribbon at the imaging location $L_I$. If the edge is not detected, more ribbon is advanced past the camera 15 (and the printhead 11).

Once the leading edge is detected by the camera 15, processing passes to step S301 where the distance moved by the ribbon between the printing location $L_P$ and the imaging location $L_I$ is determined.

In particular, the number of pulses moved by the take-up spool encoder 35 during the movement of the ribbon (both during and after the printing of the calibration pattern $P_{CAL}$) is first converted to a corresponding angular movement of the take-up spool motor shaft 7*a* (based upon the known characteristics of the encoder 35). The angular movement is then converted, by reference to the known diameter of the take-up spool 5, into a linear distance of ribbon moved. Of course, this linear distance may be determined in any convenient way, such as, for example, directly based upon a known relationship between the encoder pulses and linear distance moved by the ribbon at the current spool diameter.

In this way, the distance moved by the ribbon between the printing location $L_P$ and the imaging location $L_I$ is determined. As noted above, this distance may be referred to as an imaging distance $D_I$. The imaging distance $D_1$ may not correspond to a straight-line distance within the printer 1. Rather, the distance $D_I$ is indicative of a linear distance travelled by the ribbon between the printing location $L_P$ and the imaging location $L_I$.

It will, of course, be understood that during intermittent printing, this distance changes during operation as the printhead is scanned along the length of an image. Further, even in continuous printing the distance is subject to changes in configuration (e.g. changes in the position of the printhead in the ribbon movement direction). However, the distance $D_I$ determined as described above may be used as a reference distance. In subsequent processing, the offset between the current printhead position and the printhead position when the distance $D_I$ was determined can be used to allow the distance between current printhead position and the imaging location $L_I$ to be known at that time, for example to enable accurate ribbon tracking and image registration. Processing then passes to step S302 where ribbon is advanced by a further distance (which may, for example, correspond to at least the known length $L_{CAL}$ of the calibration pattern $P_{CAL}$). During this ribbon advance, the camera continues to obtain images of the ribbon at the imaging location $L_I$, the images being combined into a captured calibration image $IM_{CAL\_CAPTURE}$.

Processing then passes to step S303, where apparent width $W_{CAL\_APPARENT}$ of the calibration pattern $P_{CAL}$ is determined. That is, the image data captured by the camera 15 at step S302 is processed to determine the apparent width $W_{CAL\_APPARENT}$ of the calibration pattern $P_{CAL}$ in a direction perpendicular to the direction of ribbon movement past the printhead 11. The location of the calibration pattern $P_{CAL}$ may also be determined. That is, the image data captured by the camera 15 at step S302 may be processed to determine an apparent position of the calibration pattern $P_{CAL}$ in a direction perpendicular to the direction of ribbon movement past the printhead 11.

The apparent width $W_{CAL\_APPARENT}$ is determined by reference to the number of image pixels which the image of the calibration pattern $P_{CAL}$ covers. The pattern edges may be detected by identifying a block of contiguous ink which has been removed (thus causing more radiation to be transmitted in that region) close to the expected position of the calibration pattern $P_{CAL}$ on the ribbon (based upon the known ribbon width and known position parameters). A predetermined portion of the captured calibration image $IM_{CAP\_CAPTURE}$ may be processed to determine the apparent width $W_{CAL\_APPARENT}$. For example, an image line after the beginning of the image may be used (e.g. a $6^{th}$ line of the image after the leading edge was detected). Alternatively, an average position across a plurality of imaging lines may be used.

It will be understood that the focusing optics (i.e. lens assembly 61), and vertical separation (as seen in FIG. 11) between the imaging location $L_I$ and the sensor 60 will result in there being a predetermined size of the region of ribbon imaged by each pixel of the sensor 60. Thus, by printing the calibration pattern $P_{CAL}$ having a known width (the width of the image on the ribbon in the direction perpendicular to the direction of ribbon movement past the printhead 11 being controlled by energisation of a predetermined number of pixels, each pixel having a predetermined size), it is possible to calibrate this aspect of the imaging system.

Thus, processing passes to step S304 where an image scaling factor $IM_{SCALE}$ is generated. The image scaling factor $IM_{SCALE}$ is generated based upon the ratio between the known width $W_{CAL}$ of the calibration pattern $P_{CAL}$ and the apparent width $W_{CAL\_APPARENT}$ determined at step S303.

The scaling factor $IM_{SCALE}$ allows captured images to be compared to equivalently sized expected images which are generated based upon the printing data. Of course, given the system geometry factors described above, one of the images must be scaled so as to 'fit' the other. The scaling factor $IM_{SCALE}$ is stored and used in subsequent image processing steps.

A second scaling factor may be generated based upon the ratio between the known length $L_{CAL}$ of the calibration pattern $P_{CAL}$ and an apparent length $L_{CAL\_APPARENT}$ of the same pattern. The apparent length $L_{CAL\_APPARENT}$ is the distance moved by the ribbon in a time window between the moment when the leading edge of the calibration pattern $P_{CAL}$ is detected by the camera and the moment the trailing edge of the calibration pattern $P_{CAL}$ is detected by the camera.

Similar to the determination of the imaging distance $D_I$, the number of pulses moved by the take-up spool encoder 35 during the time window is first converted to a corresponding angular movement of the take-up spool motor shaft 7*a* (based upon the known characteristics of the encoder 35). The angular movement is then converted, by reference to the known diameter of the take-up spool 5, into a linear distance of ribbon moved so as to determine the apparent length $L_{CAL\_APPARENT}$. Of course, this apparent length $L_{CAL\_APPARENT}$ may be determined in any convenient way, such as, for example, directly based upon a known relationship between the encoder pulses and linear distance moved by the ribbon at the current spool diameter.

The second scaling factor allows the captured images to be compared to equivalently sized expected images along the ribbon movement direction D. It has been found that the friction between the printhead and the ribbon during printing may drag the ribbon along a direction opposite to the ribbon movement direction D, such that the length of the ribbon used for printing may be slightly shorter than the length of the printed image. For example, if the length of the printed image (and thus the nominal expected negative image on the ribbon) is 70 mm, the length of the actual negative image on the ribbon may be around 69 mm. As such, the size of the expected negative image on the ribbon may be adjusted by the second scaling factor to compensate for this effect. As noted above, this effect may be taken into account by the ribbon transport system to avoid unnecessary wastage of ribbon.

It has also been found that the extent of the stretch may vary in dependence upon the print speed. For example, the extent of the stretch may increase with increasing print speed. This may result from the printhead tending to apply a larger dragging force to the ribbon at higher print speeds than at lower print speeds. The second scaling factor allows the stretching deformation of the ribbon to be compensated for, thereby allowing the captured images to be more accurately registered to the expected images.

Adjustments to the second scaling factor to account for speed may be determined empirically and appropriate scaling factor adjustment values stored in a lookup table in a memory associated with the controller 10. For example, scaling factor adjustment values may be established during laboratory testing, and an appropriate one of the stored values accessed during operation based upon the print speed. Of course, it will be understood that alternative techniques may be used. For example, a small number of adjustment values may be stored and intermediate values determined by interpolation. Alternatively, or additionally, the scaling factor value may be determined and adjusted based upon the apparent length $L_{CAL\_APPARENT}$ of a calibration pattern as described above, with a calibration pattern being printed at an appropriate speed.

Processing performed at step S304 also generates data indicative of a relative position of the image of the calibration pattern $P_{CAL}$ with respect to an expected position within the full image width. In particular, an image position $IM_{POSITION}$ is generated which indicates a relative position of the calibration pattern $P_{CAL}$. The image position $IM_{POSITION}$ may, for example, indicate the distance of a feature (e.g. an edge) the calibration pattern $P_{CAL}$ from the edge of the captured image. Alternatively, the image position $IM_{POSITION}$ may, for example, indicate a deviation of the distance of a feature (e.g. an edge) the calibration pattern $P_{CAL}$ from an expected position from the edge of the captured image (e.g. ± a number of image pixels).

Although FIG. 16 illustrates the calibration pattern $P_{CAL}$ as a continuous pattern, it will be appreciated that if the pattern is printed using an old printhead which includes a few malfunctioning heating elements, the printed calibration pattern $P_{CAL}$ is likely to include corresponding dead pixels, such that the printed calibration pattern $P_{CAL}$ becomes non-continuous. The dead pixels may be "filtered" out by the processes at steps S301 and S303 in order to correctly identify the leading/trailing edges, the apparent dimensions, and the image position $IM_{POSITION}$ of the pattern.

Alternatively, the calibration pattern may be modified based upon knowledge of defective printing elements. In a further alternative, adjustments may be made to the expected capture image based upon knowledge of any defective printing elements.

Generally speaking, it will be understood that the calibration pattern may comprise a plurality of features, which may be discontinuous. For example, the pattern may comprise several printed sub-regions which are separated by regions of non-printed ribbon (whether intentionally arranged that way, or caused by defective printing elements).

It will further be appreciated that since the ribbon width is generally smaller than the width of the light source 16, light tends to leak around edges of ribbon 2. This can lead to difficulties in accurately imaging the calibration pattern $P_{CAL}$ on the ribbon. For example, leaked light may saturate the sensor with light, making accurate determination of features of the calibration pattern $P_{CAL}$ difficult.

In some embodiments, a first total expected light level received at the sensor 60 may be determined based upon the ribbon width for a situation where there has been no printing performed using the imaged section of ribbon (i.e. ink is present across the full ribbon width). The first total expected light level may include regions where light passes around the sides of the ribbon (e.g. where the ribbon is narrower than the light source 16 and/or sensor 60). A second total expected light level received at the sensor 60 may be determined based upon the ribbon width for a situation where a known pattern (e.g. the calibration pattern) has been printed using the imaged section of ribbon (i.e. ink is present across only some of the full ribbon width). The second total expected light level may also include regions where light passes around the sides of the ribbon (e.g. where the ribbon is narrower than the light source 16 and/or sensor 60). It will be understood that the second total expected light level will typically be higher than the first total expected light level. A threshold level may be determined based on the first and second expected light level values. The threshold level may then be used to identify the position of the leading edge of the calibration pattern $P_{CAL}$ in the direction of ribbon movement. Thus, rather than examining precisely the region of ribbon in which the calibration pattern $P_{CAL}$ is expected to appear, this technique allows an aggregate or total received light level to be used to identify approximately where the calibration pattern $P_{CAL}$ is located on the ribbon as the ribbon is transported past the sensor 60.

The calibration and normalisation processes described above may be performed each time any configuration change is made, so as to ensure that any changes are properly reflected in the calibration settings. For example, each time the ribbon cassette is removed it is possible to obtain new background intensity distribution $IM_{BG\_NO\_RIBBON}$.

However, it has been observed that in some circumstances, when a cassette has been removed, various items may obstruct the radiation path between the light source 16 and the camera 15. For example, a user may try to clean the surface of the light source 16 so as to remove debris (e.g. ink flakes). Alternatively, a ribbon cassette may be only partially removed/installed (i.e. not sufficiently installed to trigger a ribbon installation detector, but sufficiently installed that ribbon obstructs part of the radiation path).

Thus, when the ribbon cassette is removed, the normalisation routine (i.e. steps S200 to S222 described above with reference to FIG. 12) may be run. However, prior to performing these steps, a check may be performed to determine if the radiation path is obstructed.

This check is now described with reference to FIG. 17. The processing begins at step S400 when it is detected that the ribbon cassette has been removed, and passes immediately to step S401. At step S401 a processing delay (e.g. 2 seconds) is inserted to allow for full removal of the cassette. Once the delay has passed, processing passes to step S402 where the light source 16 is illuminated and an intensity distribution ID1 is captured by the camera 15. It will, of course, be understood that rather than detecting the removal of a cassette, any signal indicative that ribbon is no longer present at the imaging location $L_I$ may be used.

The obtained intensity distribution ID1 is then processed at step S403 to generate an average intensity value indicative of the average intensity upon the active areas of the sensor 60. For example, the first and last eight pixels of the sensor may be disregarded for this process, on the basis that they may be partially blocked by mechanical arrangements, and therefore may receive less radiation than other regions of the sensor.

Processing then passes to step S404, where it is determined if the average intensity value satisfies a predetermined criterion. In an embodiment the average intensity value is compared to a threshold, such as, for example one third of the maximum intensity value. If the average value exceeds this threshold, processing passes to step S405.

At step S405 the obtained intensity data is processed to determine how many (if any) pixels appear to be blocked within the active region (i.e. excluding the peripheral pixels). Such a determination may be made by simply applying a brightness threshold of, for example, two thirds of the nominal intensity (nominal intensity being, for example 230/255 of the maximum intensity). Any pixel having an intensity below this threshold is considered to be obscured, while any pixel above this is considered to be un-obscured.

Data indicative of the obscured or un-obscured nature of each pixel is then processed at step S406 to determine if there are fewer than a minimum number of obscured pixels (e.g. four).

If there are fewer than the minimum number of obscured pixels, processing passes to step S407, where the sensor is indicated as being in good working order, and the testing process terminates. The normalisation process described above with reference to FIG. 12 may then be run.

However, if there are four or more obscured pixels, processing passes to step S408, where, a maximum number of contiguous obscured pixels is determined. Processing then passes to step S409.

At step S409, a highest ratio between the obscured pixels and good pixels is determined. This ratio may, for example, be determined by considering pixels one by one from the cassette end of the image (i.e. the end furthest from the baseplate 16). Only the portion of the image relating to the expected ribbon width is considered (e.g. where a 30 mm ribbon is used, with an imaging width of around 63 mm, around half of the image is considered only). As each pixel is considered in turn, a ratio is kept of good pixels (i.e. over the two-thirds nominal brightness) to obscured pixels. In order to prevent a small number of pixels at the image edge from distorting the output, the ratio, the maximum ratio is only considered once 24 pixels (or around 6 mm of sensor width) have been considered. Thereafter, the process continues to consider each of the remaining pixels (until the currently configured ribbon width is reached), and the ratio is calculated after each pixel has been considered. Once the currently configured ribbon width is reached, the maximum ratio is recorded.

Processing then passes to step S410, where it is determined if the maximum number of contiguous obscured pixels (as determined at step S408) is greater than a threshold (e.g. 21 pixels, equivalent to around 5 mm), or if the maximum ratio (as determined at step S409) is greater than a further threshold (e.g. 33%). If either of these is yes, processing passes to step S411, where the sensor is indicated as being obstructed.

If neither of these thresholds are met, processing passes to step S412 where the sensor is indicated as being dirty. Processing proceeds from step S412 to step S413 where it is determined if there have been three consecutive 'dirty' results. If no, processing passes to step S414, where a short delay (e.g. ⅓ second) is inserted, before processing returns to step S402, and the process described above is repeated.

On the other hand, if there have been three or more consecutive dirty readings, processing passes to step S415, where a 'dirty sensor' warning is generated for a user. The warning may, for example, be an on-screen warning and/or an audible warning. Processing then proceeds to step S416 where a delay of two seconds is inserted (e.g. to allow a user to clean the sensor) before processing again returns to step S402, and the process described above is repeated.

The processing described above is configured to identify blockages that might be caused by printed or un-printed ribbon being present in front of the sensor (e.g. due to a partially removed cassette). Un-printed ribbon being present may result in a large number of contiguous obscured pixels (e.g. greater than 5 mm blocks) or a low average intensity. The processing described may also identify printed ribbon being present in front of the sensor. For example, printed ribbon may be expected to have less than 33% of pixels used, and would thus result in an average obscured ratio of around 67%. However, this ratio may be lower in some regions (as print will not be uniformly distributed). Hence a threshold of 33% provides some margin of error. It is noted that the threshold is selected so as to prevent dirt being detected as printed ribbon. Dirt is expected to accumulate gradually, and therefore would take considerable time to trigger the 33% threshold.

When the average intensity is determined to be too low at step S404, processing also passes to step S411, and the sensor is indicated as being obstructed. At step S411 (which may be reached from either of steps S404 or S410), processing passes to step S416 where a delay of two seconds is inserted (e.g. to allow a user to clear the obstruction) before processing returns to step S402, and the process described above is repeated.

This processing continues until either a good sensor result is determined (i.e. step S407) or the cassette is re-inserted into the printer.

It will be understood that a contiguous block of a large number of obscured pixels at the centre of the image may be considered to be indicative of a large and temporary blockage (e.g. an operator's finger, or cleaning apparatus). Similarly, a contiguous block of a large number of obscured pixels adjacent to the side of the sensor which corresponds to the outward facing side of the printer may be considered to be indicative of a partially removed (or partially replaced) ribbon cassette. If either of these categories (or other similar categories of fault) is detected, the normalisation routine cannot be properly conducted. Therefore, the processing at steps S403, S408 or S409 allow these scenarios to be identified at one of steps S404 or S410.

On the other hand, if the obscured pixels are considered to be indicative of dirt on the light source or the sensor, it may be possible for this dirt to be removed by cleaning. For example, if a small number (although greater than four in the above example) of obscured pixels are identified, and are distributed across the image, it is considered likely that these obstructions are dirt (e.g. flakes of ink or particles of dust) that have fallen and settled on the light source 16. If so, and if repeated tests produce the same indication, a user warning may be generated. It has been realised that while it may be possible for accumulations of dirt to form which do obstruct a large number of pixels, such accumulations take time, and are not likely not have formed between the times at which ribbon is removed and the re-normalisation routine is run.

Thus, while any large obstruction is likely to be caused by some other mechanical blockage, which will need to be removed before continued operation of the printer, small and distributed blockages may indicate dirt, which will impair the imaging performance (although may still allow the device to operate). Such blockages, if left uncleaned, will gradually accumulate until imaging is no longer possible. As such, by prompting a user to clean the light source, it is possible to maintain reliable imaging performance for an extended period of time.

The processing described above allows the normalisation process described with reference to FIG. 12 to be repeated at regular intervals (i.e. each time a ribbon cassette is removed) so as to ensure that the normalisation data in use is current. However, rather than being disrupted by incorrect data if temporary obstructions (e.g. a partially inserted cassette) are present, the pre-normalisation routine provides a robust qualification routine to prevent normalisation data being generated based upon shadows cast by temporary obstructions. It will be understood that if normalisation data was generated based upon shadows cast by temporary obstructions, this could lead to significant errors in subsequent processing, and could significantly reduce the prospects of correctly identifying degraded printing quality.

Once suitable intensity normalisation and image calibration have been performed, it is possible to obtain high quality images form the ribbon negatives, and to compare these to expected image data, so as to generate print quality data. A process by which the image data and comparison procedures are carried out is now described with reference to FIG. 18. FIG. 18 illustrates schematically various processing tasks which are carried out by the controller 10. The connection between processing blocks is intended to illustrate the flow of data within the system, and the various blocks are intended to illustrate particular processes. However, it will be understood that the various processes described can be implemented in any convenient way any may not be executed sequentially. Moreover, some processing steps may be omitted entirely, while others can be added as required.

When each image is printed by the printer 1, image data used to energise the print head (absent any correction which may be applied to compensate for printing history or printhead temperature) is used to generated an expected image $IM_{EXP}$1, which is stored in a memory location at processing step S500.

Processing then passes to step S501, where the resolution of the expected image $IM_{EXP}$1 is adjusted to form a reduced resolution expected image $IM_{EXP}$2 that has a resolution corresponding to the resolution of the camera 15 (e.g. 256 pixels across the full width of an image). The processing at step S501 may be triggered by an image of the region of ribbon corresponding the to the print operation being captured by the camera 15 (as described below with reference to step S504). When the image has been captured, the expected image $IM_{EXP}$1 may be retrieved from a memory location. In this way, processing can be performed on the captured image data and expected image data in parallel.

It will be understood that the image length and width may vary depending on the nature of the images being printed. The print data resolution may, for example be around 12 dots per mm across a 53 mm printed image width, resulting in up to around 640 pixels in total across the image width. However, in many cases, the reduced resolution expected image $IM_{EXP}$2 will not contain data corresponding to a full ribbon width. A printed image may, for example, only be 10 mm wide (i.e. around 118 printed pixels, or around 47 image pixels).

Thus, in conversion to the reduced resolution expected image $IM_{EXP}$2, each of the reduced resolution pixels is generated based upon approximately 2.5 expected image pixels in each direction. Such a conversion may be carried out by generating a greyscale image from the corresponding binary print data.

Processing then passes to step S502, where the reduced resolution expected image $IM_{EXP}$2 is adjusted so as to scale and position the expected image such that the image dimensions correspond to that of the data captured from the camera 15.

In particular, for each image line, background intensity distribution $IM_{BG}$ (as generated at steps S221 and S222) is inserted until the expected image start position $IM_{POSITION}$ is reached. From that pixel location, the content of each pixel of $IM_{EXP}$2 is adjusted by scaling factor $IM_{SCALE}$ such that it corresponds to an expected equivalent pixel of the captured image. It will be understood that this will likely require data for each pixel of the $IM_{EXP}$2 image to be mapped across adjacent pixels. The scaling factor may, for example be around 0.86, such that for each eight pixels of the image $IM_{EXP}$2 approximately seven new pixels will be generated.

It will be appreciated that the expected image start position $IM_{POSITION}$ (i.e. a position of the image in a direction perpendicular to the direction of ribbon movement past the printhead 11 and the camera 15) may vary over time. As such, whereas the expected image start position $IM_{POSITION}$ may be determined during a calibration routine as described above, this position may be adjusted during ongoing printing operations. For example, the expected image start position $IM_{POSITION}$ may be adjusted before printing each image of a print job. This approach allows the image processing techniques described herein to accommodate ribbon drift across the printhead 11.

Such an adjustment may be made by analysing the last printed image (or a recently printed image) and identifying a positional shift. Such a shift may be identified, for example, by checking if both detected edges of the printed image have moved relative to expected position by same amount in the same direction. Such a determination will reject or at least minimise any effects caused by poor printing. The determined offset may then be used to modify the image start position $IM_{POSITION}$ as determined during calibration (as described above). In this way, it is possible to adjust the position of the expected image data to correspond to the actual image position taking into account any ribbon drift which has occurred since calibration during printing operations.

Once the expected image data $IM_{EXP}$2 has been inserted into each image line, the line is filled with data derived from the background intensity distribution $IM_{BG}$ as required so as to provide a full image line (i.e. 256 pixels of image data). Finally, where ribbon edges have been detected, any image data (i.e. ones of the 256 pixels outside of the detected ribbon edges) are set to zero values (rather than the background intensity distribution $IM_{BG}$ or image data), on the basis that if there is no ribbon present, there will be a high brightness signal. That is, zero intensity signal will correspond to a region in which no ribbon is present, whereas a low intensity signal will indicate that ribbon is present, but that no ink has been transferred to the substrate. On the other hand, a high intensity signal, will indicate that ink has been transferred to the substrate.

In this way, each line of expected image data is shifted, scaled and packed out so as to generate a respective line of a scaled and re-positioned image $IM_{EXP}$3, which corresponds, pixel for pixel, to a line of a captured image.

Performing scaling and re-positioning in this way provides a robust method of printing fault detection. In particular, it has been realised that by applying scaling and re-positioning to the expected image data, rather than the captured image data it is possible preserve more of the detail in the capture image, without risk that that data becomes compromised. That is, the captured image data is inherently noisy, and may be the limiting factor in the ability to determine print quality. Any scaling or re-positioning of the captured image data may cause errors in the captured data, as features of the image are mapped from one pixel size or location to another.

Processing then passes to step S503, where the resolution of the scaled and re-positioned image $IM_{EXP}$3 is again adjusted to form a reduced resolution intensity adjusted expected image $IM_{EXP}$4 that has a convenient resolution for subsequent processing. For example the reduced resolution intensity adjusted expected image $IM_{EXP}$4 may have a resulting providing a full image width of 63 pixels.

In generating the reduced resolution intensity adjusted expected image $IM_{EXP}$4 having a width of 63 pixels, each of the 63 pixels in each row of the image is generated based upon 8 pixels in each direction (64 pixels in total), with each one of the new 63 pixels overlapping with the adjacent new pixel by 50%. Further, each pixel is based upon a weighted average of the intensity of the 64 pixels around the new pixel location. For example, in an embodiment the central 2×2 pixels are each weighted at 100%, while the ring of pixels immediately surrounding this 2×2 block are weighted at 60% (12 pixels). A next ring of pixels around the central 4×4 block are weighted at 20% (20 pixels). A final ring of pixels around the central 6×6 block are weighted at 10% (28 pixels). The newly generated pixel value is then scaled, such that the overall intensity remains constant (i.e. if all 64 pixels are at maximum intensity, the newly generated pixel will also be at maximum intensity).

It will be understood that each pixel of the original image will contribute to several new pixels. For example, each of the central four pixels (i.e. those pixels in the central 2×2 block of pixels of the original image), will contribute at 100% weighting to the new pixel centred on that region, and will also contribute at 10% weighting to each of several new pixels immediately adjacent to the new pixel. Of course, different weighting distributions may be used as required.

Each pixel of reduced resolution intensity adjusted expected image $IM_{EXP}$4 thus comprises a greyscale value indicative of the weighted average intensity of 64 pixels of the intensity adjusted expected image $IM_{EXP}$3. Moreover, each pixel includes contributions from overlapping areas.

This additional reduction in resolution provides a degree on insensitivity to alignment errors. It has been realised that while such processing may cause a loss in detail (i.e. as image features become blurred), it may improve the ability to compare equivalent parts of the expected image data and the captured image data, especially where the ribbon position with respect to the camera in a direction perpendicular to ribbon movement has changed slightly during operation.

Similarly, the expected and captured image positions may vary with respect to each other in the direction of ribbon movement due to inaccurate ribbon control, for example due to eccentricities in the ribbon spools. Thus, by blurring the images across several pixels, it is possible to examine the correspondence, on average, of each region of the images. The extent to which the resolution is reduced at this stage is a compromise between, on the one hand, a desire to reduce sensitivity to tracking errors, and on the other, a desire to maintain sufficient image detail.

In parallel to the processing described above, at step S504 data is captured by the camera 15 as the ribbon advances past the imaging location $L_I$. A series of one-dimensional line scans are captured and assembled into a two-dimensional image $IM_{CAPT}$1 of the region of ribbon used to print a single image on the substrate.

As described above, a one-dimensional line scan (i.e. a spatial distribution of intensity) is captured each time the ribbon is determined to have moved by an amount which corresponds to the size of one pixel in the imaging direction. That is, for an imaging system having an image width of 63 mm at the imaging location $L_I$, and comprising 256 pixels, each pixel represents approximately 0.25 mm of ribbon in the direction extending perpendicular to the direction of ribbon travel. However, given the known scaling relationship between the camera and the imaging location, in order to provide approximately square captured pixels, a new image is captured each time the ribbon is advanced by a distance of approximately 0.208 mm.

This advance of ribbon is determined by the take-up spool encoder, which, in an embodiment, provides 4096 pulses for every full revolution. In fact, by operating the encoder in quadrature mode, 16384 steps may be provided per revolution, each quadrature step being equivalent to approximately 0.022 degrees of angular rotation (which corresponds to a ribbon advance of between approximately 0.006 mm and 0.02 mm depending on the spool diameter). A similar image is captured and stored for each printing operation. The stored images are each associated with a region of ribbon, as described in more detail below.

Of course, it will be appreciated that ribbon advance distance which corresponds to a pixel may be varied in some circumstances. For example, as noted above, the ribbon may become stretched during printing, resulting in a negative image on the ribbon being slightly smaller than the printed image. Moreover, the extent to which a region of ribbon is stretched during printing may vary in dependence upon various printing parameters, such as, for example, printing pressure, print speed, and/or characteristics of the ribbon and substrate.

Processing then passes to step S505 where each pixel of the captured image $IM_{CAPT}$1 is adjusted to generate an intensity adjusted captured image $IM_{CAPT}$2 by scaling each pixel intensity by the corresponding $IM_{NORM}$ value (as generated at step S315). This ensures that each pixel should, on average, have approximately the same intensity (subject to any features detected from the ribbon).

Processing then passes to step S506 where edges of the ribbon in the normalised captured image $IM_{CAPT}$2 are identified. This edge detection may, for example, be performed by analysing the region of each image where the ribbon edges are expected to be, and identifying the pixel position close to that location at which an abrupt change in image intensity is observed. The edge detection process may be performed for each image line. The output of this process is passed to step S502, where the actual ribbon location is used to construct and position the expected image.

Processing then passes to step S507, where the resolution of the normalised captured image $IM_{CAPT}$2 is adjusted to form a reduced resolution captured image $IM_{CAPT}$3 that has a convenient resolution for subsequent processing, and the same as the resolution of the reduced resolution image $IM_{EXP}$4 generated at step S503. For example the reduced resolution captured image $IM_{CAPT}$3 may have a resolution resulting in there being 63 pixels defining a width of the image (rather than 256 pixels).

In generating the reduced resolution captured image $IM_{CAPT}$3 having a width of 63 pixels, each of the 63 pixels in each row of the image is generated based upon 8 pixels in each direction (64 pixels in total), as described above with reference to step S503. Each pixel of the reduced resolution captured image $IM_{CAPT}$3 thus comprises a greyscale value indicative of the (weighted) average intensity of 16 pixels of the captured image $IM_{CAPT}$2.

In parallel to the processing described above with reference to steps S500 to S503, and S504 to S507, a further process is performed at step S508 to generate a background only image. This image $IM_{BG}$1 is based upon the one-dimensional background intensity distribution $IM_{BG}$, but extended to form an image having the same length as each of $IM_{CAPT}$3 and $IM_{EXP}$4. Moreover, in the background image $IM_{BG}$1, data outside of the detected ribbon edges (as detected at step S506), is set to zero.

This background image $IM_{BG}$1 is resolution adjusted at step S509 to generate a resolution adjusted background image $IM_{BG}$2 which has a resolution equal to that of each of $IM_{CAPT}$3 and $IM_{EXP}$4, by a similar process to that described above with reference to steps S503 and S507.

Processing then passes from each of steps S503, S507 and S509 to step S510, where the reduced resolution captured image $IM_{CAPT}$3 and the reduced resolution expected image $IM_{EXP}$4 are compared to one another. The processing described above results in images having the same number of pixels, and relating to the same area of ribbon. Moreover, the use of the intensity adjustment processes described above mean that the images $IM_{CAPT}$3 and $IM_{EXP4}$ should, if printing is performed correctly, closely resemble one another.

At step S510 the comparison performed generates output truth data $IM_{TRUTH}$, which comprises an image having the same dimensions as each of $IM_{CAPT}$3 and $IM_{EXP4}$ and in which each pixel corresponds to the difference in data values between corresponding pixels in $IM_{CAPT}$3 and $IM_{EXP}$4. In this way, the truth data $IM_{TRUTH}$ provides an indication of how close each imaged pixel is to the expected output. The truth data $IM_{TRUTH}$ may be referred to as an error map.

For example, the captured image $IM_{CAPT}$3 may be subtracted from the expected image $IM_{EXP}$4. The truth data $IM_{TRUTH}$ may be thus have positive and negative values, the positive values being indicative of less ink being removed from the ribbon than expected, and that the captured image $IM_{CAPT}$3 is lighter than the expected image $IM_{EXP}$4 (where high values indicate a darker pixel). On the other hand, negative values in the difference indicate that more ink has been removed from the ribbon than expected, and that the captured image $IM_{CAPT}$3 is darker than the expected image $IM_{EXP}$4.

Alternatively, in an embodiment, it may be identified that the printing intensity is incorrect in a way which is characteristic of a known printing fault, for example by comparing a sum, average, or integral of one or more regions of the printed image with an equivalent sum, average, or integral of the expected image.

Prior to the comparison at step S510, the background image $IM_{BG}$2 may be removed from each of the expected and captured images $IM_{EXP}$4 and $IM_{CAPT}$3. In this way, the effect of any unprinted regions of the image can be minimised. It will be understood that the background image $IM_{BG}$2 can be omitted, but where a small proportion of the ink on an imaged area is printed, the remaining ink can dominate any subsequent processing. Thus, by removing the background image $IM_{BG}$2, it is possible to maximise the sensitivity to any deviations in the printed regions.

Processing then passes to step S511, where the resolution of the truth data $IM_{TRUTH}$ is adjusted to a lower resolution to generate $IM_{TRUTH\_DERES}$. Each pixel of the reduced resolution truth data $IM_{TRUTH\_DERES}$ comprises a greyscale value indicative of the average intensity of 8×8 pixels of the truth data $IM_{TRUTH}$.

Processing then passes to step S512 where the reduced resolution truth data $IM_{TRUTH\_DERES}$ is used to identify various predetermined printing fault conditions. The higher resolution truth data $IM_{TRUTH}$ is also passed to step S512, allowing some errors to be detected at a higher resolution.

The truth data $IM_{TRUTH}$ and/or the reduced resolution truth data $IM_{TRUTH\_DERES}$ may each be used to identify various image defects. For example, it may be identified that the printing intensity is incorrect in a way which is characteristic of a known printing fault, for example by comparing a sum, average, or integral of one or more regions of the truth data to reference data, the reference data being indicative of a particular printing fault.

For example, the reduced resolution truth data $IM_{TRUTH\_DERES}$ may be used to identify that the printhead has overprinted on previously used regions of ribbon, for example due to additional ink being removed at the top or bottom of the image (due to that ink being used for printing a different image). Alternatively or additionally, it may be identified that the printing surface is worn, for example due to one or more light patches (or missing patches) appearing in the image.

On the other hand, the full resolution truth data $IM_{TRUTH}$ may be used to identify that no image has been printed. Alternatively or additionally, it may be identified that the printhead is misaligned, for example due to printing appearing to be too light on one side of the image. Alternatively or additionally, it may be identified that there are dirty printing elements, for example due to one or more unprinted lines running through the printed image in the direction of ribbon transport. Alternatively or additionally, it may be identified that the ribbon is creased, for example due to one or more unprinted lines running through the image. Alternatively or additionally, it may be identified that the printing darkness setting is incorrect, for example due the printed image being too light or containing smeared characters.

For each of these (or other) identified printing faults, a warning may be generated for a user. It will be understood that some faults may be treated differently than others. For example, a "no image printed" fault may cause the printer to be taken offline, whereas other less severe faults may cause a warning to be generated while allowing operation to continue. Alternatively, a single fault or a small predetermined number of consecutive faults may be permitted before any action is taken.

The processing described above thus allows for print errors to be detected in a robust way, and for the printer to be operated in a way that prevents unprinted items passing the print station un-detected. In addition to the processing described above, various additional techniques may be performed to further improve the imaging reliability (and thus robustness of fault detection). More generally, data indicating the amount of ink removed from the ribbon during a printing operation is used to provide print error detection and reduction.

For example, it will be understood that the ribbon positioning algorithms used to control the ribbon to enable precise printing control are effectively the master ribbon position controllers. As the ribbon is moved, each portion of ribbon is imaged as it passes the imaging location $L_I$. Thus, for each portion of ribbon that is used to print an image on a substrate at the printing location, an image of that portion of ribbon can subsequently be captured by the camera 15. However, given the ribbon control required for printing, the delay between printing and capture for a particular region of ribbon will depend upon the printing speed, image length and printing frequency. Indeed, at any given point in time, the camera 15 may be imaging a region of ribbon which was used to perform a printing operation several printing cycles previously.

Moreover, it will be understood that, rather than the ribbon being controlled to advance gradually past the imaging location $L_I$ at a uniform rate, allowing a full image to be captured, sub-regions of each printed image may be captured at different times and subsequently re-assembled to form an image of a single print region. For example, an image relating to a single printing operation (i.e. a date code applied to a particular region of a substrate) may be assembled from image data captured during more than one subsequent printing operation.

Thus, for each region of ribbon printed upon and imaged, the controller tracks the progress of that region of ribbon between the printing location $L_P$ and the imaging location $L_I$. This tracking is performed by a ribbon tracking controller and enables the processing described at step S510 above to compare data relating to equivalent regions of ribbon. The ribbon tracking controller may be a process running on the controller 10. In more detail, for each region of ribbon that is printed upon, the expected image data is tracked as it progresses to the imaging location $L_I$. Similarly, for each region of ribbon that is imaged at the imaging location $L_I$ the image data is associated with a region of ribbon.

In some embodiments, data indicative of the printhead position (which causes deflection of the ribbon 2) can be provided as an input to the ribbon tracking controller. In a similar manner to that described above with reference to the use of data indicative of the printhead position data $PH_{POS}$ as an input to the feed correction block 41, the ribbon tracking controller can use the printhead position data $PH_{POS}$ to modify the apparent offset between the printing location and the imaging location. That is, the calibration process described above with reference to FIG. 15 provides a printhead reference position (with respect to the imaging location $L_I$), with any deviation from that position being determined based upon the printhead position data $PH_{POS}$.

In particular, during intermittent printing, printhead position data $PH_{POS}$ may be used to track the movement of the printhead during the printing process and thus account for the changing printing location $L_P$ in subsequent image processing. The provision of accurate printhead position data $PH_{POS}$, for example as described above with reference to FIG. 9, thus allows this process to be based upon accurate printhead position data $PH_{POS}$, rather than an estimate which may be inaccurate. More generally, any change in printhead position (e.g. due to changes in printhead angle, printhead pressure, platen distance, printing position) which results in the printhead being caused to move from the reference position used for printing the calibration pattern $P_CA$ L can result in a different printing location $L_P$ to imaging location $L_I$ distance $D_I$. These changes can be monitored with reference to the printhead encoder 36, and fed into the image tracking system as required.

During routine operation, the camera 15 may only need to be operated when a region of ribbon upon which a negative image appears is at the imaging location $L_I$. Thus, rather than capturing image data at all times (and possibly capturing images of un-printed regions of ribbon, and also capturing images of some regions of ribbon several times), the camera may be operated only when required. Such control of the camera may be based upon a ribbon tracking system (which may, for example comprise a process running on the controller 10). As noted above, the ribbon tracking system can use the output of the encoder 36 and the printhead position $PH_{POS}$ to accurately track the position on the ribbon of each negative image. Thus, during ribbon movement, as the start of each negative image reaches the imaging location $L_I$ capture may commence, with capture stopping when the end of each negative image reaches the imaging location $L_I$.

It will, of course, be understood that there is no requirement that a complete negative image is captured during a single capture operation. Indeed, it is likely that a complete negative image will be assembled from a plurality of partial captures, each partial capture comprising a plurality of image slices (or intensity distributions). Of course, alternative capture and tracking routines may be used. For example, the camera may be operated at all times, with data stored or discarded based upon a ribbon tracking system.

It will be understood that during some printing operations, especially during continuous printing, it is likely that regions of ribbon which are printed upon will pass the imaging location $L_I$ several times after having been printed upon. For example, as described in more detail above, during a typical printing process in which the substrate is traveling at a constant velocity (i.e. continuous printing), after each printing phase has been completed, the ribbon is decelerated and then driven in the reverse direction so that the used region of the ribbon is on the upstream side of the printhead 11. Then, in a subsequent printing phase, as the next region of the substrate to be printed approaches, the ribbon 2 is accelerated back up to the normal printing speed the ribbon 2 is positioned so that an unused portion of the ribbon 2 close to the previously used region of the ribbon is located between the printhead 11 and the substrate 12 when the printhead 11 is advanced to the printing location $L_P$.

Thus, depending on the length of each printed image, and the amount of ribbon required to be reversed in each printing cycle, each region of ribbon may pass the imaging location several times. During this movement (as with all ribbon movements), it will be understood that each portion of the ribbon is tracked by the controller.

In some embodiments, however, image data is captured from each region of the ribbon the first time it passes the imaging location $L_P$. This may be during a phase of the printing cycle where there are significant rates of acceleration or deceleration, and thus significant tension changes and ribbon distortions may be present (as described above with reference to the ribbon feed controller 40). However, it has been realised that it may be beneficial to capture image data from each region of ribbon only during a predetermined phase of the printing cycle. For example, rather than capturing image data during the deceleration phase at the end of a printing cycle (which is likely to be the first time many regions of ribbon pass the imaging location $L_I$) it may be preferred to capture image data during a constant speed phase.

FIG. 19 illustrates the speed and position (or displacement) of a portion of ribbon during a series of movements across several printing cycles. In each printing cycle there is an acceleration phase A1, A2, A3, a constant speed printing phase P1, P2, P3, and a deceleration phase D1, D2, D3. It will be understood that overall, during each printing cycle, the ribbon advances by an amount which corresponds to the length of the printed image (i.e. the distance travelled during the constant speed printing phases P1, P2, P3). It is noted that in each of the deceleration phases D1, D2, D3 a constant negative acceleration rate is applied as the ribbon decelerates from the printing speed until it is moving in opposite direction at a speed equal to the printing speed (but in the opposite direction). Once this reverse speed is reached, the acceleration direction is reversed again. The described ribbon speed profile is for illustrative purposes only. It will, of course, be appreciated that, in use, the ribbon speed profile is determined by factors such as substrate speed, print speed, image length, maximum acceleration rates as well as other factors.

In the illustrated example, assuming that a particular portion of ribbon for starts at the printing location (position value 0) at the start of the time period shown, and that it moves according to the speed profile shown, the portion of ribbon in question will move around distance 28 units (by around time 10), before reversing by around 16 units (by around time 18), before advancing a further 28 units (by around time 28), and so on.

However, considering a fixed reference point pi, which is a fixed distance from the starting location (e.g. 25 distance units), it can be seen that the same region of ribbon passes that point five times during the illustrated profile at times a, b, c, d, and e. At each of times a, c, and e, the ribbon is moving in the forward direction, whereas at times b and d, the ribbon is moving in the reverse direction. Moreover, at times a and b the ribbon is in the deceleration phase D1 and at times d and e the ribbon is in the acceleration phase A3. Thus, time c, which falls within the constant speed printing phase P2, is the only one of the five occurrences when the ribbon is moving forwards at a constant speed.

It will be understood that different motion profiles will be used as required. However, in general terms, it has been realised that it may be advantageous to image ribbon only when it is moving forwards at a substantially constant speed. During continuous printing, this may occur while printing is carried out. Moreover, due to the desire to avoid wasted ribbon, it is likely that substantially all regions of ribbon will, at some point during operation, move past the imaging location at a substantially fixed speed (i.e. the printing speed). Thus, this provides a convenient time at which to perform imaging.

In addition to detecting faulty printing as described above, it is possible to improve printing quality using data indicating the amount of ink removed from the ribbon during a printing operation. For example, parameters such as printhead position, pressure, energisation level, angle, ribbon position, ribbon speed etc. may be optimised based upon data indicative of print quality determined by processing described herein.

Where references have been made herein to detecting radiation incident upon a camera, it will be understood that an alternative form of sensor may be used. Moreover, it should be appreciated that other forms of electromagnetic radiation could be used in some embodiments. That is, there is no requirement that the sensor detects visible light. Moreover, the terms 'light' and 'radiation' are used interchangeably herein. Similarly, where references are made to 'radiation intensity', where visible light is used, this may be understood to be a light intensity, which may also be referred to as a light level.

Where references have been made to processing involving dimensions, scaling factors, thresholds and other numerical values, it will be understood that the described examples are not intended to be limiting. That is, different numerical values can be used where appropriate.

Where references have been made herein to generating data based upon properties of the ribbon sensed after printing, in some embodiments such data may be generated based upon properties of the printed image (i.e. the image printed onto a substrate). That is, data may be generated from the substrate after printing has been carried out. Such data may then be used analogously to that obtained from the ribbon after printing, as has been described herein (where appropriate). In particular, where reference has been made herein to generating data indicating and/or based upon a quantity of ink remaining on ribbon after printing, similar data can be generated indicating and/or based upon a quantity of ink deposited on the substrate after printing.

References have been made herein to determining the quantity of ink remaining on the ribbon after printing using optical methods. Other methods can also be used. For example, in some embodiments, a quantity of ink remaining on the ribbon after printing may be determined using a capacitive sensor arranged to generate data from the ribbon.

References have been made to monitoring of an optimization of print quality. Such print quality can be monitored in any convenient way, and various ways have been described herein. In particular, print quality may be defined based upon a number of pixels printed which correspond to the pixels intended to be printed. Alternatively or additionally print quality may be defined by comparing a total number of pixels printed in an image with a number of pixels intended to be printed. In some embodiments a print quality metric may be based upon a relative darkness of the printed image (or relative "lightness" of ribbon after printing).

Where references have been made to stepper motors herein, it will be appreciated that motors other than stepper motors could be used in alternative embodiments. Indeed, stepper motors are an example of a class of motors referred to position-controlled motors. A position-controlled motor is a motor controlled by a demanded output rotary position. That is, the output position may be varied on demand, or the output rotational velocity may be varied by control of the speed at which the demanded output rotary position changes. A stepper motor is an open loop position-controlled motor. That is, a stepper motor is supplied with an input signal relating to a demanded rotation position or rotational velocity and the stepper motor is driven to achieve the demanded position or velocity.

Some position-controlled motors are provided with an encoder providing a feedback signal indicative of the actual position or velocity of the motor. The feedback signal may be used to generate an error signal by comparison with the demanded output rotary position (or velocity), the error signal being used to drive the motor to minimise the error. A stepper motor provided with an encoder in this manner may form part of a closed loop position-controlled motor.

An alternative form of closed loop position-controlled motor comprises a DC motor provided with an encoder. The output from the encoder provides a feedback signal from which an error signal can be generated when the feedback signal is compared to a demanded output rotary position (or velocity), the error signal being used to drive the motor to minimise the error.

It will be appreciated from the foregoing that various position controlled motors are known and can be employed in embodiments of a printing apparatus. It will further be appreciated that in yet further embodiments conventional DC motors may be used.

While various disclosures herein describe that each of two tape spools is driven by a respective motor, it will be appreciated that in alternative embodiments tape may be transported between the spools in a different manner. For example a capstan roller located between the two spools may be used. Additionally or alternatively, the supply spool may be arranged to provide a mechanical resistance to tape movement, thereby generating tension in the tape.

In general terms, ribbon is caused to advance between the spools in a controlled manner, so as to allow a predetermined portion of ribbon to be provided at the printing location and/or the imaging location at a particular point in time (e.g. during printing and/or imaging operations.

Techniques described above relating to motor control compensation based upon printhead position data may be applied tape drives comprising to a single motor, or to a single motor of a tape drive.

The terms ribbon and tape may be used interchangeably. For example, where the techniques described are applied to a transfer printer (such as a thermal transfer printer) the tape may be a ribbon. However, it will be understood that tape drive control techniques described herein may also be applied to a tape drive for transporting other forms of tape.

The controller 10 has been described in the foregoing description (particularly with reference to FIG. 4). It will be appreciated that the various functions attributed to the controller 10 can be carried out by a single controller or by separate controllers as appropriate. It will further be appreciated that each described controller function can itself be provided by a single controller device or by a plurality of controller devices. Each controller device can take any suitable form, including ASICs, FPGAs, or microcontrollers which read and execute instructions stored in a memory to which the controller is connected.

The described and illustrated embodiments are to be considered as illustrative and not restrictive in character, it being understood that only the preferred embodiments have been shown and described and that all changes and modifications that come within the scope of the inventions as defined in the claims are desired to be protected. In relation to the claims, it is intended that when words such as "a," "an," "at least one," or "at least one portion" are used to preface a feature there is no intention to limit the claim to only one such feature unless specifically stated to the contrary in the claim. When the language "at least a portion" and/or "a portion" is used the item can include a portion and/or the entire item unless specifically stated to the contrary.

The invention claimed is:

1. A method for calibrating an image capture system arranged to capture images from a ribbon of a thermal transfer printer, comprising:

determining a first characteristic of an image capture system, the first characteristic comprising a spatial distribution of radiation intensity with a first part and a second part corresponding to respective first and second regions of an imaging location of the image capture system, wherein the ribbon is not positioned in the first and second regions when determining the first characteristic;

obtaining a second characteristic of the image capture system, the second characteristic comprising a modified spatial distribution of radiation intensity with a first part and a second part corresponding to the respective first and second regions of the imaging location, wherein the ribbon is positioned in the first region when obtaining the second characteristic; and adjusting the second part of the second characteristic based upon the second part of the first characteristic and a relationship between the first part of the second characteristic and the first part of the first characteristic.

2. The method according to any claim 1, wherein adjusting the second part of the second characteristic based upon the second part of the first characteristic and the relationship between the first part of the second characteristic and the first part of the first characteristic comprises:

obtaining the second part of the first characteristic corresponding to the second part of the second characteristic;

generating an adjustment factor based upon the relationship between the first part of the second characteristic and the first part of the first characteristic;

applying the adjustment factor to the second part of the first characteristic; and generating the second part of the second characteristic based upon the adjusted second part of the first characteristic.

3. The method according to claim 1, wherein the image capture system comprises a capture location and the imaging location, wherein radiation intensity at the capture location is indicative of a property of the imaging location.

4. The method according to claim 3, wherein the spatial distribution of radiation intensity and/or the modified spatial distribution of radiation intensity comprises data indicative of a radiation intensity at a plurality of capture regions of the capture location.

5. The method according to claim 4, wherein the radiation intensity at each one of the plurality of capture regions of the capture location is indicative of a property at a corresponding one of a plurality of regions including the first and second regions of the imaging location.

6. The method according to claim 1, wherein the second characteristic comprises a background spatial distribution of radiation intensity.

7. The method according to claim 1, wherein the first characteristic comprises a spatial distribution of radiation intensity at a first radiation emission intensity.

8. The method according to claim 7, wherein the second characteristic comprises a background spatial distribution of radiation intensity at a second radiation emission intensity.

9. The method according to claim 7, wherein the first characteristic comprises a spatial distribution of radiation intensity in a first ribbon condition.

10. The method according to claim 9, wherein the second characteristic comprises a spatial distribution of radiation intensity in a second ribbon condition.

11. The method according to claim 1, where the second part of the second characteristic is indicative of a ribbon not being present at the second region of the imaging location.

12. The method according to claim 1, wherein the first part of the second characteristic is indicative of a ribbon being present at the first region of the imaging location.

13. The method according to claim 1, wherein the method comprises:

obtaining, by the image capture system, the first characteristic;

positioning the ribbon at least one of the regions of the imaging location;

obtaining, by the image capture system, the second characteristic; and adjusting the second part of the second characteristic.

14. A transfer printer configured to transfer ink from a printer ribbon to a substrate which is transported along a predetermined substrate path adjacent to the printer comprising:

a tape drive for transporting ribbon between first and second ribbon spools along a ribbon path;

a printhead being displaceable towards and away from the predetermined substrate path and being arranged to, during printing, contact one side of the ribbon to press an opposite side of the ribbon into contact with a substrate on the predetermined substrate path, and a printing surface;

an image capture system configured to capture images of the ribbon at an imaging location; and a controller arranged to:

determine a first characteristic of the image capture system, the first characteristic comprising a spatial distribution of radiation intensity with a first part and a second part corresponding to respective first and second regions of an imaging location of the image capture system, wherein the ribbon is not positioned in the first and second regions when determining the first characteristic;

obtain a second characteristic of the image capture system, the second characteristic comprising a modified spatial distribution of radiation intensity with a first part and second a part corresponding to the respective first and second regions of the imaging location, wherein the ribbon is positioned in the first region when obtaining the second characteristics; and adjust the second part of the second characteristic based upon the second part of the first characteristic, and a relationship between the first part of the second characteristic and the first part of the first characteristic.

15. The transfer printer according to claim 14, wherein the tape drive comprises two tape drive motors and two tape spool supports on which the spools of ribbon may be mounted, each spool being drivable by a respective one of the motors.

16. The transfer printer according to claim 14, further comprising a monitor arranged to generate an output indicative of movement of the printhead relative to the printing surface.

17. The transfer printer according to claim 14, wherein the image capture system comprises a radiation detector.

18. The transfer printer according to claim 17, wherein the image capture system further comprises a radiation emitter, a radiation path being formed between the radiation emitter and the radiation detector.

19. The transfer printer according to claim 14, wherein the image capture system is configured to generate data indicative of a characteristic of the image capture system, the characteristic comprising a spatial distribution of radiation intensity.

20. A computer program comprising computer readable instructions arranged to:

determine a first characteristic of an image capture system of a transfer printer, the first characteristic comprising a spatial distribution of radiation intensity with a first part and a second part corresponding to respective first and second regions of an imaging location of the image capture system, wherein the ribbon is not positioned in the first and second regions when determining the first characteristic;

obtain a second characteristic of the image capture system, the second characteristic comprising a modified spatial distribution of radiation intensity with a first part and a second part corresponding to the respective first and second regions of the imaging location, wherein the ribbon is positioned in the first region when obtaining the second characteristics; and;

adjust the second part of the second characteristic based upon the second part of the first characteristic, and a relationship between the first part of the second characteristic and the first part of the first characteristic.

* * * * *